US008300504B2

(12) United States Patent
Kataoka et al.

(10) Patent No.: US 8,300,504 B2
(45) Date of Patent: Oct. 30, 2012

(54) SWITCH DEVICE, INFORMATION PROCESSING DEVICE, AND REPRODUCTION DEVICE

(75) Inventors: Yoshinori Kataoka, Tokorozawa (JP); Youichi Yamada, Tokorozawa (JP); Yoshiyuki Kakuta, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1011 days.

(21) Appl. No.: 11/793,600

(22) PCT Filed: Dec. 20, 2005

(86) PCT No.: PCT/JP2005/023320
§ 371 (c)(1),
(2), (4) Date: Dec. 12, 2007

(87) PCT Pub. No.: WO2006/068114
PCT Pub. Date: Jun. 29, 2006

(65) Prior Publication Data
US 2008/0110970 A1   May 15, 2008

(30) Foreign Application Priority Data

Dec. 20, 2004 (JP) ................... 2004-368180
Dec. 20, 2004 (JP) ................... 2004-368181
Dec. 20, 2004 (JP) ................... 2004-368182
Dec. 20, 2004 (JP) ................... 2004-368183
Dec. 20, 2004 (JP) ................... 2004-368184

(51) Int. Cl.
*G06F 17/00* (2006.01)
(52) U.S. Cl. ................... 369/30.03; 369/30.05
(58) Field of Classification Search ........... 369/30.03, 369/30.05, 30.07, 30.1
See application file for complete search history.

(56) References Cited

U.S. PATENT DOCUMENTS
2003/0223334 A1* 12/2003 Hori ................... 369/53.3

FOREIGN PATENT DOCUMENTS
| JP | 2002-125011 | 4/2002 |
| JP | 2004-086958 | 3/2004 |
| JP | 2004-087192 | 3/2004 |
| WO | 2003/032538 | 4/2003 |

OTHER PUBLICATIONS

International Preliminary Report on Patentability issued for counterpart PCT Patent Application No. PCT/JP2005/023320.

* cited by examiner

*Primary Examiner* — Hoa T Nguyen
*Assistant Examiner* — Andrew Sasinowski
(74) *Attorney, Agent, or Firm* — Kratz, Quintos & Hanson, LLP

(57) ABSTRACT

An operation signal corresponding to an input operation on a rotating body by a user is output to an information-processing unit 400 and the operation signal is processed by a processing condition in accordance with the condition of the input operation. Based on the information property such as sound volume processed based on the operation signal and output by the output unit 200 or a setting position such as a cue point that is set by the input operation on the switch section 340 and at which a reproducing position is changed by a processing unit 440 in accordance with a pressing operation on the rotating body 600, the location of the reproducing position that is moved in accordance with the condition of the input operation on the rotating body 600 is recognized. And the rotating body 600 is operated (conducting click-like movement restriction, vibration and the like) in accordance with output condition corresponding to the condition of the input operation based on the property. A touch such as the movement restriction and vibration can be provided in accordance with the input operation and the property of the information, thereby providing efficient information-processing by the input operation.

7 Claims, 35 Drawing Sheets

SWITCH DEVICE, INFORMATION PROCESSING DEVICE, AND REPRODUCTION DEVICE

TECHNICAL FIELD

The present invention relates to a switch device, an information processing device and a reproduction device that have having an operation unit to which input operation is conducted, the input operation changing output condition of information and setting the processing condition of the information.

BACKGROUND ART

Various switch devices such as button-type and volume-type have been known as a control device for controlling electric signal. The various switch devices are selectably used for various electronic devices in terms of the type of electric signals to be controlled, control mode and design.

On the other hand, DJ playing has been known in playing music, where a record player is used as a reproducing device and a player, called as a disc jockey, plays dance music and the like. The DJ playing is a style for effectively playing music information recorded on a phonorecord as dance music and the like. Specifically, a disc jockey manually controls a rotation of a turntable of a record player on which a phonorecord is mounted to play and stop music information recorded on the phonorecord, or to conduct repeated playing of the same phrase of the music information and cueing to a position at which music start is desired.

A reproduction device has recently been developed, the reproduction device employing recording media such as CD (Compact Disc) and DVD (Digital Versatile Disc) on which audio information such as sound and music and image information such as video are recorded as digital data is used to reproduce music contents such as dance music and image contents (see Patent Document 1 and Patent Document 2). The devices disclosed in the Patent Documents 1 and 2 imitate operational feeling of an analog record player, where rotation of a turntable is manually pseudo-controlled to control reproducing condition of sound information. Specifically, a ring-shaped rotary drive is provided on a base in a manner movable in a toward-and-away direction (axial direction). A disc-shaped jog table is rotatably mounted on the rotary drive. The base is provided with a rotation sensor to which the rotation of the jog table is transmitted to detect the rotation of the jog table, and a touch sensor and (5-4) tape-switch provided along the circumference of the base at a position opposing to the rotary drive to detect approaching movement of the rotary drive toward the base by the pressing operation of the jog table to detect the pressing of the jog table.

Patent Document 1: Japanese Patent Laid-Open Publication No. 2004-86958 (P.8 to P.21)
Patent Document 2: Japanese Patent Laid-Open Publication No. 2004-87192 (P.6 to P.15)

DISCLOSURE OF THE INVENTION

Problems to be Solved by the Invention

Conventional record players employ an arrangement where rotary drive of an electric motor is transmitted through an endless belt to rotate a turntable in one direction and to play a phonorecord mounted on the turntable. Accordingly, relatively small resistance is felt during an operation for rotating in the rotary direction of the turntable in DJ playing. On the other hand, when the turntable is rotated in a direction reverse to the rotary direction of the turntable, relatively great resistance is felt by a player.

However, in a conventional arrangement such as those described in the above Patent Documents 1 and 2, since the jog table are merely disposed in a rotatable manner, it is difficult to obtain operational feeling in accordance with operating mode. It is especially true in view of variation in DJ playing in recent years, where a demand for a reproduction device capable of giving operational feeling similar to an operational feeling in stopping rotation of turntable of a conventional record player has been increased.

On the other hand, the above-described reproduction of music contents and image contents using a conventional reproduction device such as those described in the above-described patent documents 1 and 2 is conducted in a dance hall and club, where the reproduction device is operated as if it is an electric music instrument. Accordingly, DJ playing is conducted in relatively large sound volume and under special illumination space. However, since reproducing condition of conventional arrangements such as those described in Patent Documents 1 and 2 are checked with a headphone, small display and the like, it is difficult to recognize the reproducing condition of music contents and image contents by DJ playing.

In view of the above, an object of the present invention is to provide a switch device capable of efficiently conducting input operation for information processing in accordance with input operation, efficiently processing information by the input operation and recognizing information-processing condition, an information processing device and a reproduction device.

Means for Solving the Problems

A switch device according to an aspect of the present invention is for setting processing condition of information processed by an information-processing unit for processing information output by an output unit, which comprises: an operating device having a first operation unit movable by an input operation, the operating device outputting an operation signal in accordance with the input operation on the first operation unit, the operation signal being received by the information-processing unit so that the information is capable of being reproduction-processed by the information-processing unit in a predetermined processing condition; a movement generating unit that drives the first operation unit in accordance with at least one of a property of the information that is processed by the information-processing unit based on the operation signal of the first operation unit and output by the output unit and a condition of the input operation based on the operation signal of the first operation unit; and a movement controller for controlling to drive the first operation unit by the movement generating unit before temporary suspension of the reproduction-processing of the information based on the property of the information.

An information-processing device according to another aspect of the present invention includes: the switch device according to the above aspect of the present invention; and an information-processing unit that processes the information in a predetermined output condition of the output unit in accordance with the operation signal.

An information-processing device according to still another aspect of the present invention is for processing information output by an output unit, the information-processing device including: an information acquiring unit for acquiring the information; an operating device having a first operation unit movable by an input operation, the operating device outputting an operation signal in accordance with the input operation on the first operation unit; an information recognizing unit for recognizing at least one of a property of the acquired information and a condition of the input operation based on the operation signal of the first operation unit; a processing unit for reproduction-processing the information so that an output condition of the information output by the output unit is changed in accordance with the operation signal of the first operation unit; a movement generating unit for driving the first operation unit of the operating device in accordance with at least one of the property of the recognized information and the condition of the input operation based on the operation signal of the first operation unit; and a movement controller for controlling to drive the first operation unit by the movement generating unit before temporary suspension of the reproduction-processing of the information based on the property of the information.

A reproduction device according to further aspect of the present invention includes: an information-processing device according to the above aspect of the present invention; and an output unit for outputting the information processed by the information-processing device.

The switch device according to the above aspect of the present invention may preferably arranged so that the movement generating unit drives the operation unit in accordance with a property of the information that is processed by the processing unit and output by the output unit based on the operation signal.

The information-processing device according to the above aspect of the present invention may preferably arranged so that the movement generating unit drives the operation unit in accordance with a property of the information that is processed by the processing unit and output by the output unit based on the operation signal.

The information-processing device according to the above aspect of the present invention may preferably be arranged so that the information recognizing unit is a property recognizing unit for recognizing the property of the acquired information, the processing unit reproduction-processes the acquired information so that the information is output by the output unit in a predetermined output condition in response to the operation signal, and the movement generating unit drives the first operation unit based on the property of the recognized information.

A reproduction device for a disc jockey according to still further aspect of the present invention includes: a switch device according to the above aspect of the present invention; and an information processing unit that processes the information in a predetermined output condition of the output unit in accordance with the operation signal output by the operating device of the switch device, in which the operation unit of the operating device is a rotating body rotatably provided by a rotary operation, the vibration generating unit of the switch device vibrates the rotating body in accordance with at least one of properties including tempo, rhythm and sound volume of the information at a position of the information processed by the information processing unit specified by the rotary operation of the rotating body.

A reproduction device according to still further aspect of the present invention includes: the information-processing device or the reproduction device for a disc jockey according to the above aspect of the present invention; and an output unit for outputting the information processed by the information-processing device or the reproduction device for a disc jockey.

The information-processing device according to the above aspect of the present invention may preferably arranged so that the operating device comprises a plurality of operation units on which an input operation is conducted, the operating device outputting different operation signals in accordance with the input operation on the operation units, the processing unit processes the acquired information so that the information is output by the output unit in different predetermined output conditions in response to the operation signals, and the movement generating unit drives the operation unit in response to a processing condition of the information by the processing unit based on the operation signal.

A reproduction device for a disc jockey according to still further aspect of the present invention is for processing information to be output by an output unit, the device including: an information acquiring unit for acquiring the information; an operation device having a second operation unit on which an input operation is conducted and a first operation unit capable of rotary operation, the operating device outputting different operation signals in accordance with the input operation on the first operation unit and the second operation unit, a processing unit that reproduction-processes the acquired information so that the information is output by the output unit in different predetermined output conditions in response to the respective operation signals; movement generating unit for driving the first operation unit in accordance with the processing condition of the information by the processing unit based on the respective operation signals; and a movement controller for controlling the movement of the first operation unit by the movement generating unit, in which the processing unit specifies a predetermined position of the information based on the operation signal in response to the input operation on the second operation unit and changes the reproduction position for processing the information to be output by the output unit based on the operation signal in response to the rotary operation of the first operation unit, and the movement generating unit vibrates the first operation unit when the position of the information changed by the processing unit is the specified predetermined position of the information, the movement controller driving the first operation unit by the movement generating unit based on the property of the recognized property of the information when the reproduction-processing of the information is temporarily suspended.

A reproduction device according to still further aspect of the present invention includes: the information-processing device or the reproduction device for a disc jockey according to the above aspect of the present invention; and an output unit for outputting the information processed by the information-processing device or the reproduction device for a disc jockey.

The switch device according to the above aspect of the present invention may preferably arranged so that the movement generating unit is a vibration generating unit that vibrates the operation unit in response to an output condition determined based on the property of the information processed by the information-processing unit and output by the output unit, the property being processed by the information-processing unit and output by the output unit in accordance with the operation signal.

The information-processing device according to the above aspect of the present invention may preferably arranged so that the movement generating unit is a vibration generating unit that vibrates the operation unit in response to an output condition determined based on the property of the information processed by the information-processing unit and output by the output unit, the property being processed by the information-processing unit and output by the output unit in accordance with the operation signal.

The information-processing device according to the above aspect of the present invention may preferably be arranged so that the information recognizing unit is a property recognizing unit for recognizing the property of the acquired information, the processing unit processes the acquired information so that the information is output by the output unit in a predetermined output condition in response to the operation signal, and the movement generating unit is a vibration generating unit that vibrates the operation unit in response to an output condition determined based on the property of the information processed by the information-processing unit and output by the output unit.

A reproduction device for a disc jockey according to still further aspect of the present invention includes: a switch device according to the above aspect of the present invention; and an information processing unit that processes the information in a predetermined output condition of the output unit in accordance with the operation signal output by the operating device of the switch device, in which the first operation unit is a rotating body rotatably provided by a rotary operation, and the vibration generating unit of the switch device vibrates the rotating body in accordance with the output condition of the property of the information at the position of the information specified by the rotary operation of the rotating body and processed by the information-processing unit being processed by the processing unit and output by the output unit, the property of the information including at least one of tempo, rhythm and sound volume.

A reproduction device according to still further aspect of the present invention includes: an information-processing device or a reproduction device for a disc jockey according to the above aspect of the present invention; and an output unit for outputting the information processed by the information-processing device or the reproduction device for a disc jockey.

The switch device according to the above aspect of the present invention may preferably arranged so that the movement generating unit drives the operation unit in accordance with the output condition of the information that is processed by the processing unit and output by the output unit based on the operation signal.

The switch device according to the above aspect of the present invention may preferably arranged so that the movement generating unit drives the operation unit in accordance with the output condition of the information that is processed by the processing unit and output by the output unit based on the operation signal.

The information-processing device according to the above aspect of the present invention may preferably be arranged so that the information recognizing unit is a property recognizing unit for recognizing the property of the acquired information, the processing unit processes the acquired information so that the information is output by the output unit in a predetermined output condition in response to the operation signal, and the movement generator is a vibration generator that vibrates the operation unit in response to an output condition determined based on the output condition of the information processed by the information-processing unit and output by the output unit based on the property of the information and the operation signal.

A reproduction device for a disc jockey according to still further aspect of the present invention includes: a switch device according to the above aspect of the present invention; and an information processing unit that processes the information in a predetermined output condition of the output unit in accordance with the operation signal output by the operating device of the switch device, in which the operation unit of the operating device is a rotating body rotatably provided by a rotary operation, and the vibration generating unit of the switch device vibrates the rotating body in accordance with the output condition of the information output by the output unit at the position of the information specified by the rotary operation of the rotating body to be processed by the information-processing unit.

A reproduction device according to still further aspect of the present invention includes: an information-processing device or a reproduction device for a disc jockey according to the above aspect of the present invention; and an output unit for outputting the information processed by the information-processing device or the reproduction device for a disc jockey.

BRIEF EXPLANATION OF DRAWINGS

FIG. 22 illustrate how a load is generated in a rotary movement in the first embodiment with reference to reproducing position and a property position, in which FIG. 22(A) is a timing chart showing the load condition generated by the rotary operation and FIG. 22(B) is an illustration showing an area where rotation is restricted with reference to positional relationship between a movement locus of reproducing position corresponding to the rotary movement of the rotating body and the property position;

FIG. 23 are timing charts showing processing condition of music data and vibrating condition of a vibrating motor in the first embodiment, in which FIG. 23(A) is a waveform chart showing a change in the sound volume of the music data and FIG. 23(B) is a waveform chart showing a change in electric current value of electric power supplied to the vibrating motor;

FIG. 24 are timing charts showing processing condition of music data and vibrating condition of a vibrating motor in the first embodiment, in which FIG. 24(A) is a waveform chart showing a change in the sound volume of the music data and FIG. 24(B) is a waveform chart showing a change in electric current value of electric power supplied to the vibrating motor;

FIG. 25 are timing charts showing processing condition of music data and vibrating condition of a vibrating motor in the first embodiment, in which FIG. 22(A) is a waveform chart showing a change in the sound volume of the music data and FIG. 22(B) is a waveform chart showing a change in electric current value of electric power supplied to the vibrating motor;

| EXPLANATION OF CODES | |
| --- | --- |
| 100 | reproduction system (reproduction device) |
| 200 | output unit |
| 300 | information-processing device (DJ playback unit) |
| 347 | cue button (operation unit: second operation unit) |
| 400 | information-processing unit |
| 410 | information recognizing unit |
| 411 | operation signal recognizer |
| 412 | property recognizing unit |
| 420 | information acquiring unit |
| 431 | restriction controller |
| 432 | vibration controller |
| 440 | processing unit |
| 450 | display controller |
| 500 | switch device |
| 600 | rotating body (operation unit: first operation unit) |
| 900 | restricting unit (a part of movement generating unit) |
| 920 | restricting gear (contact member) |
| 930 | rotary drive unit |
| 950 | vibrating motor (a part of movement generating unit) |

BEST MODE FOR CARRYING OUT THE INVENTION

First Embodiment

Arrangement of Reproduction System

An arrangement of a reproduction system as a reproduction device according to an embodiment of the invention will be described below with reference to attached drawings. Incidentally, the switch device of the invention may be used in any switch arrangement other than those used for a reproduction system and those for processing any information.

Figure 1:
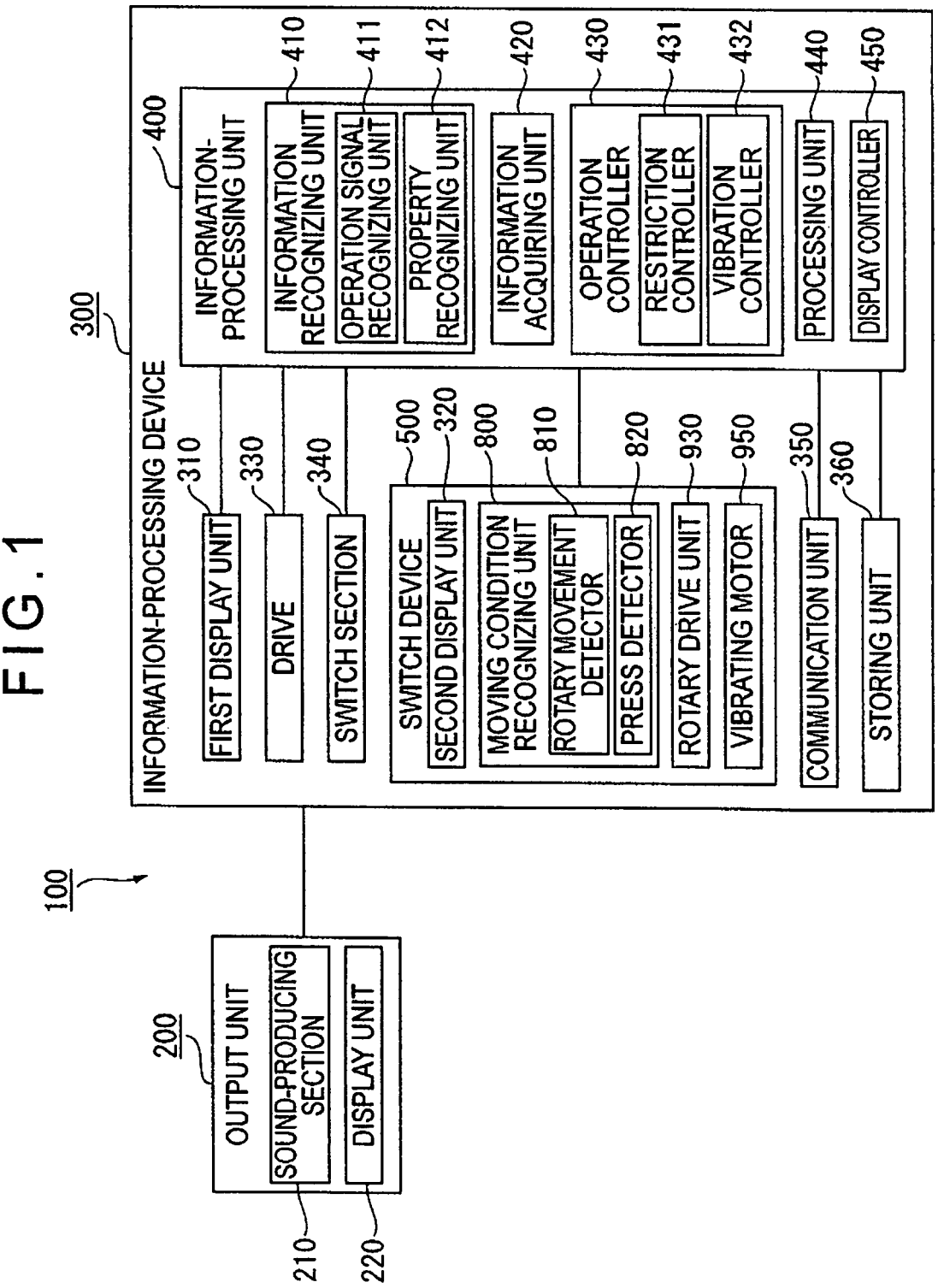
FIG. 1 is a block diagram showing a reproduction system according to a first embodiment of a reproduction device of the invention.

In FIG. 1, 100 denotes a reproduction system, which reproduces information such as sound information relating to sound and music and image information relating to image and video. The reproduction system 100 includes an output unit 200 and an information-processing device 200.

The output unit 200 output sound, music, image and video based on a signal output from the information-processing device 300. The output unit 200 includes a sound-producing section 210 and a display unit 220. The sound-producing section 210 includes a speaker (not shown). When the sound-generating unit 210 receives a signal corresponding to sound information from the information-processing device 300, the sound-generating unit 210 vocalizes and outputs the signal from the speaker after applying some processing such as amplification. On the other hand, after receiving signal corresponding to image information from the information-processing device 300, the display unit 220 processes and outputs the signal as an image or video on a display. The display unit 220 is, for instance, liquid crystal display panel, organic EL (Electro-Luminescence) panel, PDP (Plasma Display Panel), CRT (Cathode-Ray Tube), FED (Field Emission Display), electrophoresis display and the like.

The information-processing device 300 is a so-called DJ playback unit, which processes information recorded on a recording medium (not shown) in a manner capable of outputting by the output unit. Here, the "process" refers to information-processing corresponding to, for instance, an operation similar to playing music information on a phonorecord using a record player by a musician called a "disc jockey" (DJ). The recording medium includes detachable component including optical discs such as CD-DA (Compact Disc-Digital Audio), CD-ROM (Compact Disc-Read Only Memory), DVD-ROM (Digital Versatile Disc-Read Only Memory), DVD-R (Digital Versatile Disc-Recordable) and DVD-RW (Digital Versatile Disc-Rewritable), magnetic disc such as magneto-optical (MO) disc and hard-disc, memory card and IC (Integrated Circuit) card as well as semiconductor memory.

Figure 2:
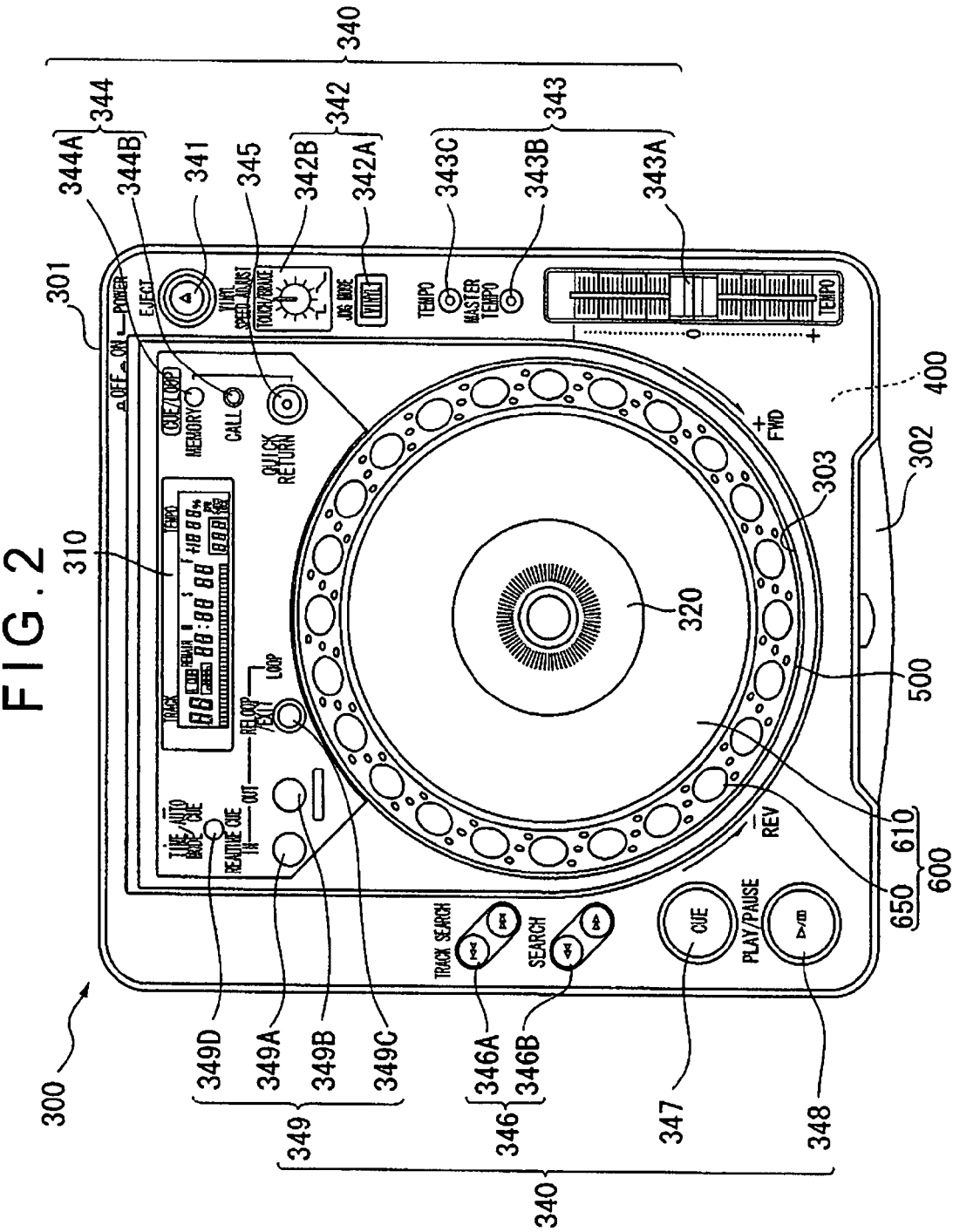
FIG. 2 is a plane view showing an information-processing device according to the first embodiment.
Figure 3:
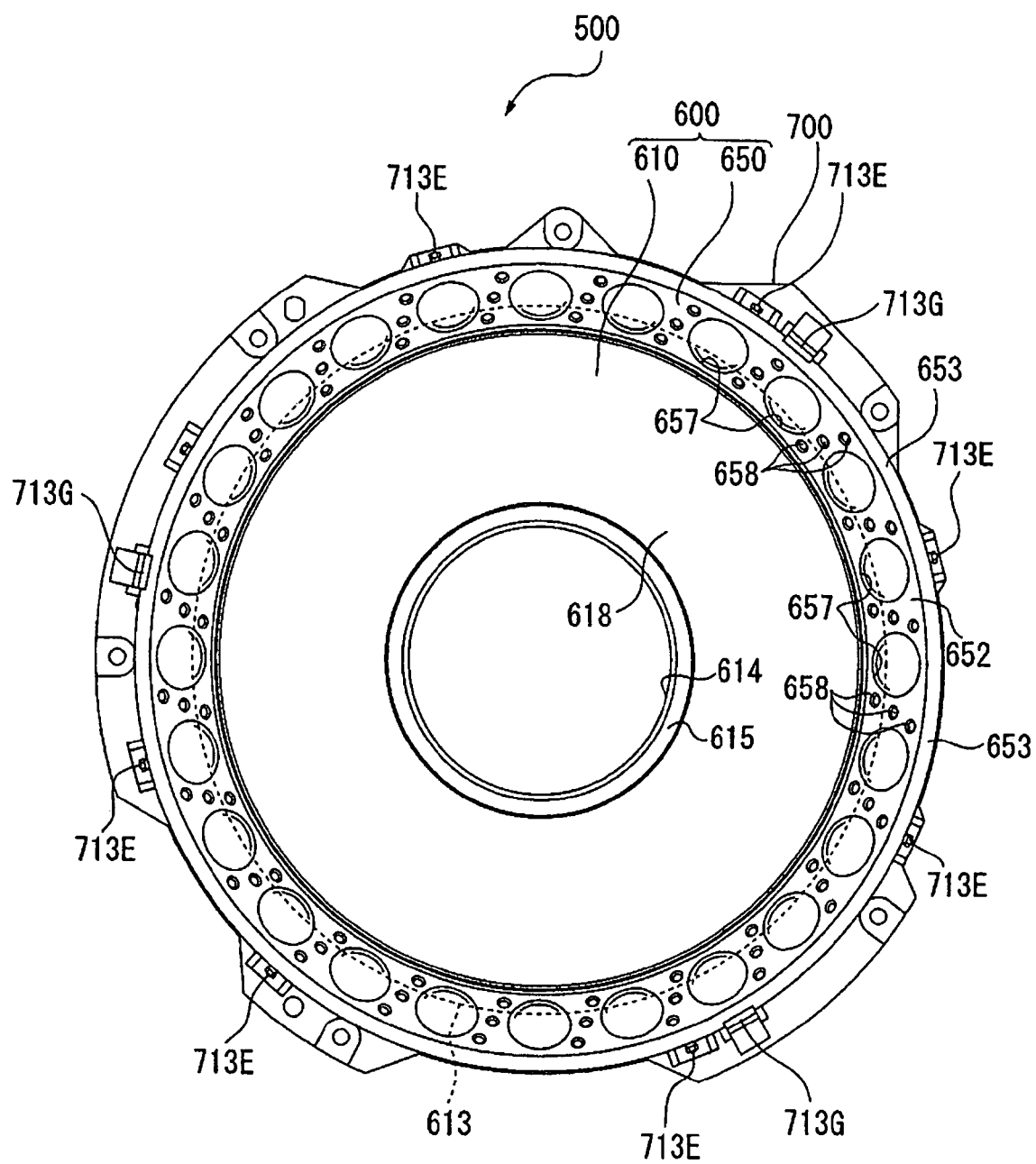
FIG. 3 is a plane view showing the switch device according to the first embodiment.
Figure 4:
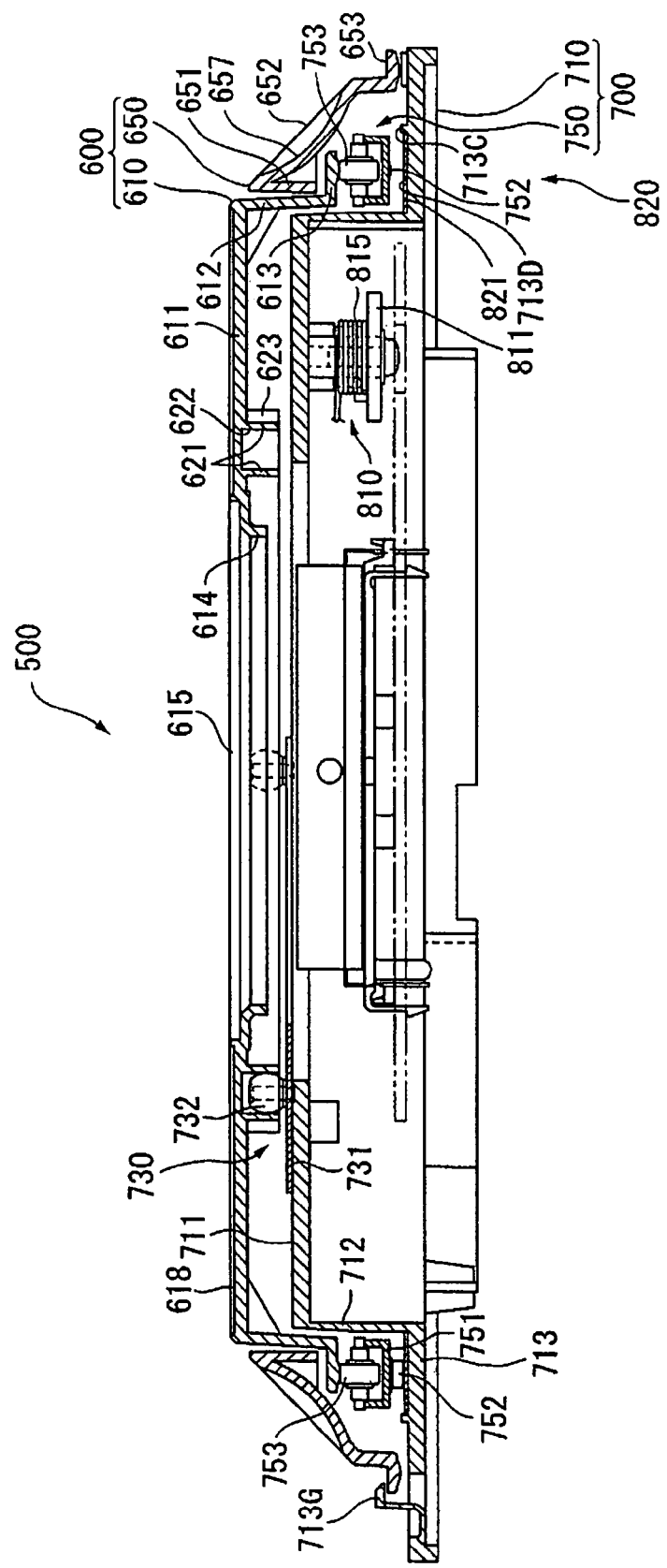
FIG. 4 is a sectional side elevation showing the switch device according to the first embodiment.

The information-processing device 300 has, as shown in FIG. 2, a body case 301 made of ABS (Acrylonitrile-Butadiene-Styrene) resin in substantially rectangular shape. An information-processing unit 400 for reproduction-processing, i.e. reading the information stored in the recording medium and outputting the information by the output unit 200, is provided in the body case 301. An insertion slot 302 opened in lateral direction is provided on a front side (first side: lower side in FIG. 2) of the body case 301. The insertion slot 302 is configured so that the recording medium is inserted thereinto to be loaded to the inside and the outside of the body case 301. The number of the insertion slot 302 may not be one and a plurality of the insertion slots may be provided corresponding to the type of different recording medium where available. A substantially circular switch opening 303 is opened approximately at the center of a flat top side (the side shown in FIG. 2) of the body case 301 exposing large switch device 500 constituting the information-processing device of the present invention together with the information-processing unit 400. Also provided on the top side of the body case 301A are a plurality of various operation components for setting and inputting processing condition of the information-processing unit 400 and a first display unit 310 for showing processing condition of information.

(Arrangement of Switch Device)

Next, the switch device 500 according to the invention will be described below with reference to the drawings.

As shown in FIGS. 2 to 5, the switch device 500 is formed in a shape simulating a turntable of a record player for playing a phonorecord. The switch device 500 variably sets processing condition of information in accordance with input operation of a user. Specifically, when music information is processed for reproduction, the processing condition is variably set so that the reproducing condition of the music information such as reproducing speed, reproducing direction and stopping and restarting the reproduction of the music information is varied. The switch device 500 includes a rotating body 600 (operation unit constituting operating device), a support base 700, a moving condition recognizing unit 800, a restricting unit 900 constituting a movement generating unit and a vibrating motor 950 constituting the movement generating unit.

As shown in FIGS. 2 to 6, the rotating body 600 includes a jog table 610 (moving section) and a jog ring 650 (peripheral cover as a part of support section). The jog table 610 and the jog ring 650 are made of, for instance, ABS resin having relatively high mechanical strength and being widely used for household electrical appliances and the like.

As shown in FIGS. 2 to 7, the jog table 610 is shaped substantially in a disc, which includes continuous arrangement of an approximately circular table plate 611 (top side section), a substantially cylindrical body section 612 having upper periphery continuous with the periphery of the table plate 611 and a flange 613 as a projection projecting outward in radial direction from the lower end of the body section 612. A substantially circular display window 614 is opened approximately at the center of the table plate 611. The display window 614 of the table plate 611 is covered with a translucent protection plate 615. On the top side of the table plate 611 of the jog table 610, an antislip component 618 made of, for instance, relatively frictional component such as ring-shaped polycarbonate plate, rubber plate and the like is provided on the outer side of the protection plate 615. A pair of guide ribs 621 projects on a side of the jog table 610 (i.e. lower side of the table plate 611) to which the body section 612 projects in a double structure coaxially with the display window 614. A guide groove 622 partitions the guide ribs 621. A first gear 623 (rack) is provided on the outer circumference of the guide rib 621 located on the outer side. A plurality of stopper ribs 625 are provided in the circumferential direction on the outer circumference of the body section 612 of the jog table 610.

Further, the jog ring 650 is provided with an insertion cylinder 651, an operation surface 652 and an engaging flange 653, which is formed substantially in a ring. The insertion cylinder 651 is approximately in a cylinder having an inner diameter capable for the body section 612 of the jog table 610 to be inserted and incapable for the flange 613 of the jog table 610 to be inserted. A plurality of engaging cuts 654 for the engaging ribs 625 of the jog table 610 to be engaged is provided on the lower end in the axial direction of the insertion cylinder 651 in a manner corresponding to the position of the engaging ribs 625. The operation surface 652 is continuously formed obliquely outward and downward from an upper end of the insertion cylinder 651 to cover the insertion cylinder 651. Approximately spherical operation dents 657 are provided on the outer circumference of the operation surface 652 approximately at regular interval. A plurality of (three, for instance) approximately linearly-arranged cylindrical operation bulges 658 are provided on the outer circumference of the operation surface 652 at a position between the operation dents 657. The engaging flange 653 continuously extends from the lower end of the operation surface 652 to the outside to be projected.

On the other hand, the support base 700 includes a mount 710 and a rotating section 750 as shown in FIGS. 2 to 5 and 8 to 10. The mount 710 rotatably supports the rotating body 600. The rotating section 750 smoothly guides the rotation of the rotating body 600 supported by the mount 710.

The mount 710 is made of, for instance, ABS resin having relatively high mechanical strength and being widely used for household electrical appliances and the like. The mount 710 is shaped substantially in a disc, which includes continuous arrangement of an approximately circular top board 711, a substantially cylindrical cylinder section 712 having upper periphery continuous with the periphery of the top plate 711 and a flange 713 projecting outward in radial direction from the lower end of the cylinder section 712.

Approximately square opening 721 is opened approximately at the center of the top plate 711 of the mount 710 and a rotation detecting window 722A and rotation restricting window 722B are opened around the periphery of the top plate 711. A plurality of board attaching ribs 724 that projects downward and receives a circuit board 723 are provided on the lower side of the top plate 711. A second display unit 320 coupled with the information processing unit 400 to display the information-processing condition is installed on the circuit board 723 so that display surface thereof is aligned with the opening 721 of the top plate 711.

A rotary guide 730 for guiding the rotation of the jog table 610 of the rotating body 600 is provided on the upper side of the top plate 711 at a corner of the opening 721.

The rotary guide 730 is made of highly corrosion-resisting metal plate of stainless steel and the like and has an approximately L-shape having longitudinal direction approximately in perpendicular direction. The rotary guide 730 is provided with an attachment plate 731 to be positioned and attached at a predetermined position on the top plate 711. Approximately spherical rollers 732 made of brass and the like are respectively rotatably supported on both ends of the longitudinal direction of the attachment plate 731. The rotary guide 730 is attached and fixed on the top plate 711 so that a position where the distance from the rotation center of the rollers 732 is equal coincides with the position corresponding to the center of the table plate 611 of the jog table 610. For instance, the rotary guide 730 is attached so that the apex of isosceles right triangle having hypotenuse of segment connecting the rotation centers of the roller 732 is located at the center of the top plate 711.

Further, the rollers 730 of the rotary guide 730 engage with the guide groove 622 of the jog table 610, thereby rotatably supporting the jog table 610 in a manner that the rotation center of the rotating body 600 is located at the center of the mount 710. Incidentally, the attachment plate 731 may not be stainless steel plate but may be made of any metal plate, which is preferably corrosion-resisting metal or corrosion-resistance processed metal. Further, the attachment plate 731 may not be metal but synthetic resin having high mechanical strength such as engineering plastic may be used. The rotary guide 730 may be arranged in any manner as long as the rotating body 600 can be rotatably supported, where the roller 732 may be directly supported by the top plate 711 without employing the attachment plate 731, a plurality of the rollers 732 may be provided instead of the pair of rollers 732, and a plurality of rollers may be provided in a manner having rotation axis in radial direction relative to the top plate 711.

A plurality of recessed portions 712A are provided on the outer circumference of the cylinder section 712 of the mount 710. Further, a wiring window 712B intercommunicating the inner circumference of the cylinder section 712 to the outer circumference thereof is provided on the cylinder section 712. A screw stopper rib 713A and a guide pin 713B are provided on the flange 713 of the mount 710 within the dent 712A. A wiring rib 713D that projects along the circumference of the cylinder section 712 for partitioning a dented wiring groove 713C against the circumference of the cylinder section 712 is provided on the flange 713. A plurality of first rollers 713E are coaxially arranged on the flange 713 in a manner rotatably supported so that rotation axis direction radially extends relative to the center of the cylinder section 712. A plurality of abutting ribs 713F are concentrically disposed and projected from the flange 713. The abutting rib 713F projects from the upper side of the flange 713 at a height lower than a plane constituted by an outer circumference of the plurality of first rollers 713E. The engaging flange 653 of the jog ring 650 abuts onto the outer circumference of the first roller 713E so that the jog ring 650 is rotatably supported on the plurality of first rollers 713E together with the jog table 610 while the rotation center thereof is located at the center of the mount 710. Incidentally, the engaging flange 653 of the jog ring 650 does not usually abuts onto the abutting rib 713F and the like, which is in contact with the abutting rib 713F in accordance with deformation of respective components when strong force is applied from the above and the like. Accordingly, the damage on the respective components on account of strong external force can be prevented. Further, a plurality of guide claws 713G is concentrically provided on the flange 713 to be engaged with the outer periphery of the engaging flange 653 of the jog ring 650 to prevent detachment from the mount 710.

The rotating section 750 rotatably supports the jog table 610 of the rotating body 600. The rotating section 750 is formed approximately in a ring corresponding to the wiring groove 713C of the mount 710. On a side opposing to the flange 713 of the mount 710 of the rotating section 750, a plurality of pressing bulges 751 bulging substantially spherically in the opposing direction, and a plurality of elastically deformable cushion members 752 made of rubber, high-density micro-cell urethane foam, coil spring member and the like. Further, a plurality of second rollers 753 having outer circumference abutting to the lower side of the flange 613 of the jog table 610 of the rotating body 600 with the rotation center thereof being radially located to support the jog table 610 is provided on the rotating section 750. The rotating section 750 also has a plurality of support pieces 754 that project from the inner edge toward inside in a tongue-shape corresponding to the recessed portion 712A of the mount 710. The support pieces 754 are screwed to the screw-stopper rib 713A and the guide pin 713B of the mount 710 in a manner penetrating in the axial direction and incapable of detachment on account of restoration force of coil spring 713H (biasing unit) and the like disposed on the screw-stopper rib 713A. When attached, the cushion member 752 and the pressing bulge 751 are not in contact with the flange 713 of the mount 710. The cushion member 752 is brought into contact by the pressing operation of the rotating body 600 for elastically deforming the coil spring 713H, and further pressing operation brings the pressing bulge 751 into contact.

On the other hand, the moving condition recognizing unit 800 recognizes the moving condition of the rotating body 600 such as inclination and press-down movement in accordance with input operation such as rotation and pressing by a user. The moving condition recognizing unit 800 is coupled with the information-processing unit 400 and the like to output the signal relating to the recognized moving condition to the information-processing unit 400. The output unit 800 includes a rotary movement detector 810 and a press detector 820.

As shown in FIGS. 8 to 12, the rotary movement detector 810 is disposed on the lower side of the top plate 711 of the mount 710 confronting the rotation detecting window 722A. The rotary movement detector 810 includes an attachment base plate 811, a detecting gear 812 (pinion), a rotation-detecting plate 813 and a rotation-detecting sensor 814 (detecting unit).

The attachment base plate 811 is an elongated plate having one end in longitudinal direction being supported on the lower side of the top plate 711 and the other end in the longitudinal direction being rotatably supported. The detecting gear 812 is rotatably supported on the other end of the attachment base plate 811 in the longitudinal direction so that rotary shaft thereof is aligned with the thickness direction of the attachment base plate 811. When the attachment base plate 811 is placed on the top plate 711, the detecting gear 812 is exposed from the rotation detecting window 722A to the upside of the top plate 711 to be engaged with the first gear 623 of the jog table 610 to be rotated in accordance with the rotation of the jog table 610. The rotation-detecting plate 813 is a disc of translucent synthetic resin having diameter greater than the diameter of the detecting gear 812, on which a plurality of band scales 813A are printed. The band scale 813A are dual-partitioned into inner side and an outer side in radial direction, in which the inner side and the outer side are circumferentially displaced. The rotation-detecting plate 813 is integrally attached on the detecting gear 812 in substantially coaxial manner.

The rotation-detecting sensor 814 includes an optical sensor 814A that detects the band scale 813A of the rotation-detecting plate 813 and a detection circuit board 814B on which a circuit for acquiring the output signal from the optical sensor 814A and outputting a predetermined detection signal (operation signal) corresponding to the operation is provided. The rotation-detecting sensor 814 is attached on the attachment base plate 811 to be aligned with the thickness direction of the rotation-detecting plate 813 so that the optical axis of the optical sensor 814A is located on the outer part of the rotation-detecting plate 813 on which the band scale 813A is printed (the outer side and the inner side). Specifically, the rotation-detecting sensor 814 detects the rotary speed and the rotary direction of the rotation-detecting plate 813 in a digital biphase mode. The rotation-detecting sensor 814 outputs the detection signal as an indication of the movement of the rotating body 600 toward the information-processing unit 400. The rotary movement detector 810 is disposed in a manner that, when an abrupt rotation is applied onto the detecting gear 812 from the first gear 623 on account of rapid rotation of the jog table 610, the other end in the longitudinal direction of the attachment base plate 811 is rotated outward from the first gear 623 against the biasing of the torsion coil spring 815 to escape the detection gear 812.

Incidentally, it is possible to arrange the rotation-detecting sensor 814 in any manner other than those described above. For instance, it is possible to employ any arrangement as long as the rotary condition of the rotating body 600 can be detected, where the band scale 813A of the rotation-detecting plate 813 is printed with a magnetic ink and a magnetic sensor for detecting magnetic force is employed, the rotation of the detecting gear 812 is directly detected with an optical sensor 814A and a magnetic sensor by providing a reflector member or a magnet on a part of the outer circumference of the detecting gear 812 without employing the rotation-detecting plate 813, or alternatively, without employing the first gear 623 and the detecting gear 812, reflector member or magnet is provided on the jog table 610 and the rotating condition of the jog table 610 is directly detected with the optical sensor 814A or a magnetic sensor.

As shown in FIGS. 9, 10 and 15 to 18, the press detector 820 of the moving condition recognizing unit 800 includes a tape switch 821 disposed in the wiring groove 713C of the mount 710. The tape switch 821 includes a plurality of switches 821A (membrane switch and the like) at a position opposing to the press bulge 751 of the rotating section 750. The press detector 820 recognizes pressing movement of the rotating section 750 when the rotating body 600 is pressed and the switch 821A is closed by the pressing bulge 751 of the rotating section 750 that is pressed down together with the jog table 610 against the restoration force of the coil spring 713H and the cushion member 752, thereby recognizing the input operation of the pressing by the information-processing unit 400 coupled thereto. Incidentally, it is possible to employ any arrangement for the press detector 820 other than a contact-point type having the switch 821A as long as the pressing of the jog table 610 pressed down by a more than predetermined pressing operation of the rotating body 600, which includes an arrangement having a pressure-sensitive sensor or piezoelectric element, an arrangement having a plurality of sensors at a position opposing to the pressing bulge 751 and an arrangement having a plurality of pressure-sensitive sensors or piezoelectric elements on the table plate 611 of the jog table 610. Further, it is possible that voltage corresponding to the pressing force during the press input operation is output toward the information-processing unit 400 with the use of piezoelectric elements, thereby also recognizing pressing condition.

Figure 8:
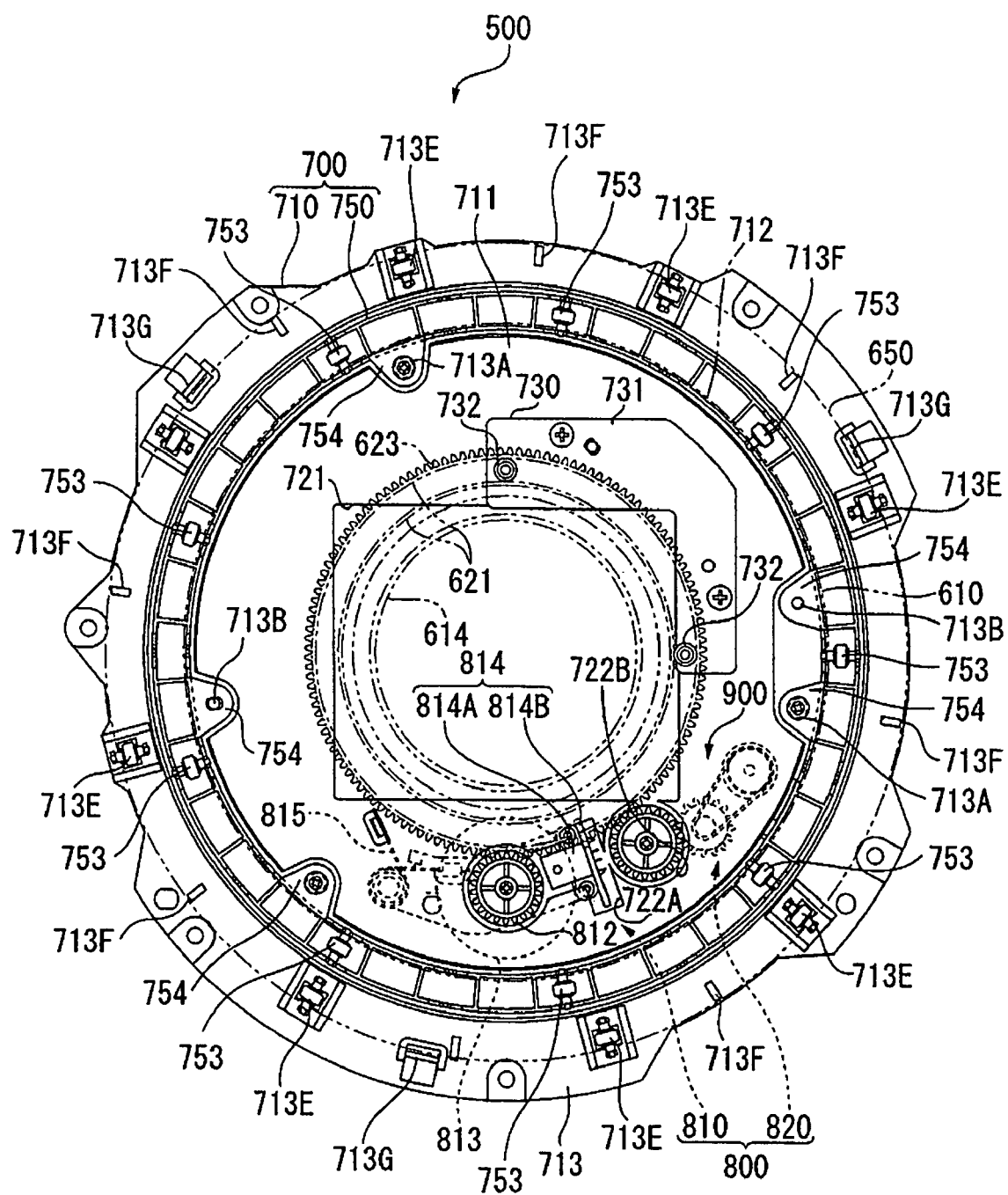
FIG. 8 is a plane view showing a relationship between the rotating body and a rotary movement detector in the first embodiment with reference to the condition in which the rotating body is detached.
Figure 9:
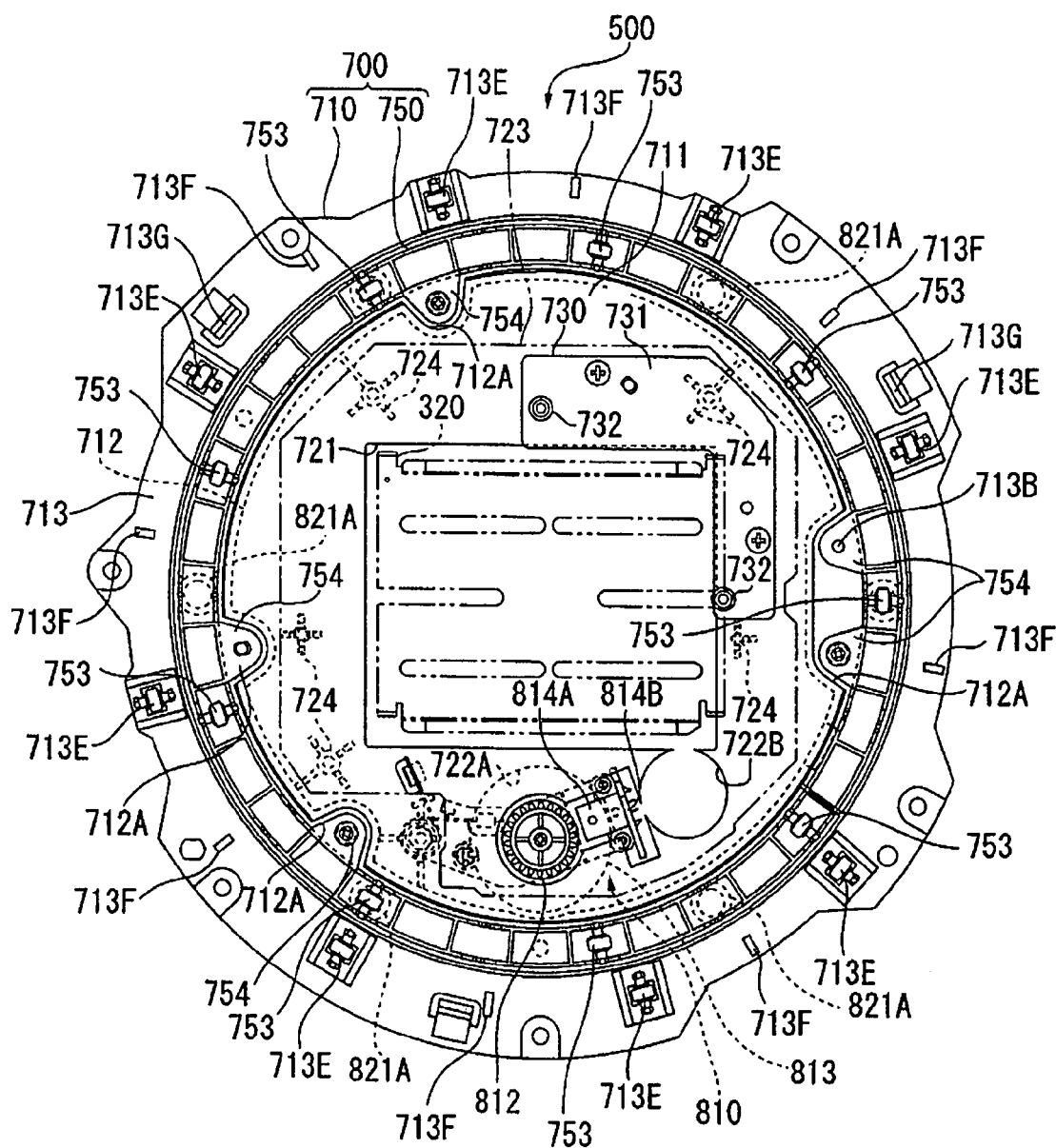
FIG. 9 is a plane view showing an arrangement of a circuit board in the first embodiment with reference to the condition in which the rotating body is detached.
Figure 10:
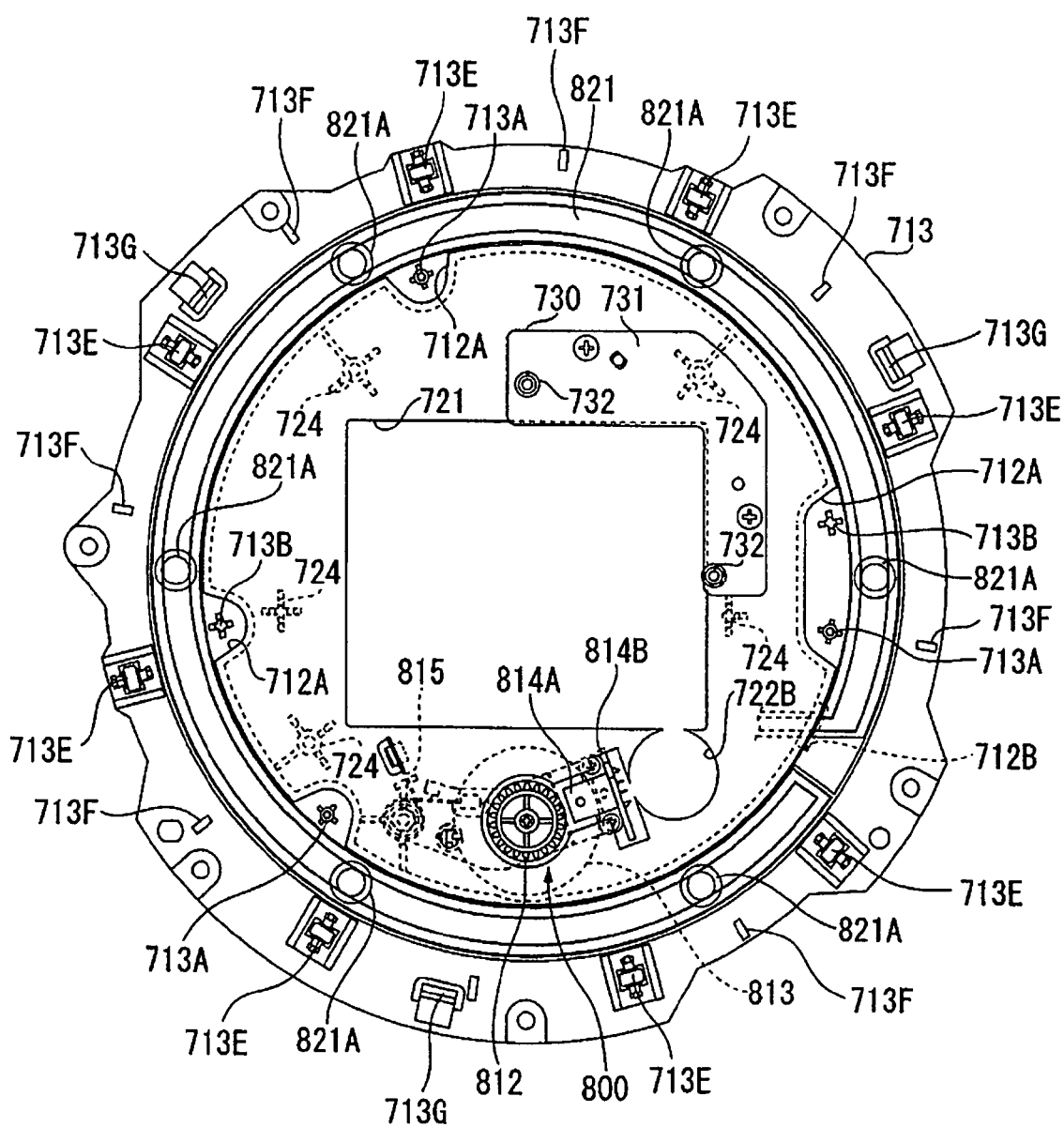
FIG. 10 is a plane view showing a switch device in the first embodiment with reference to the condition in which the rotating body and a rotating section are detached.
Figure 11:
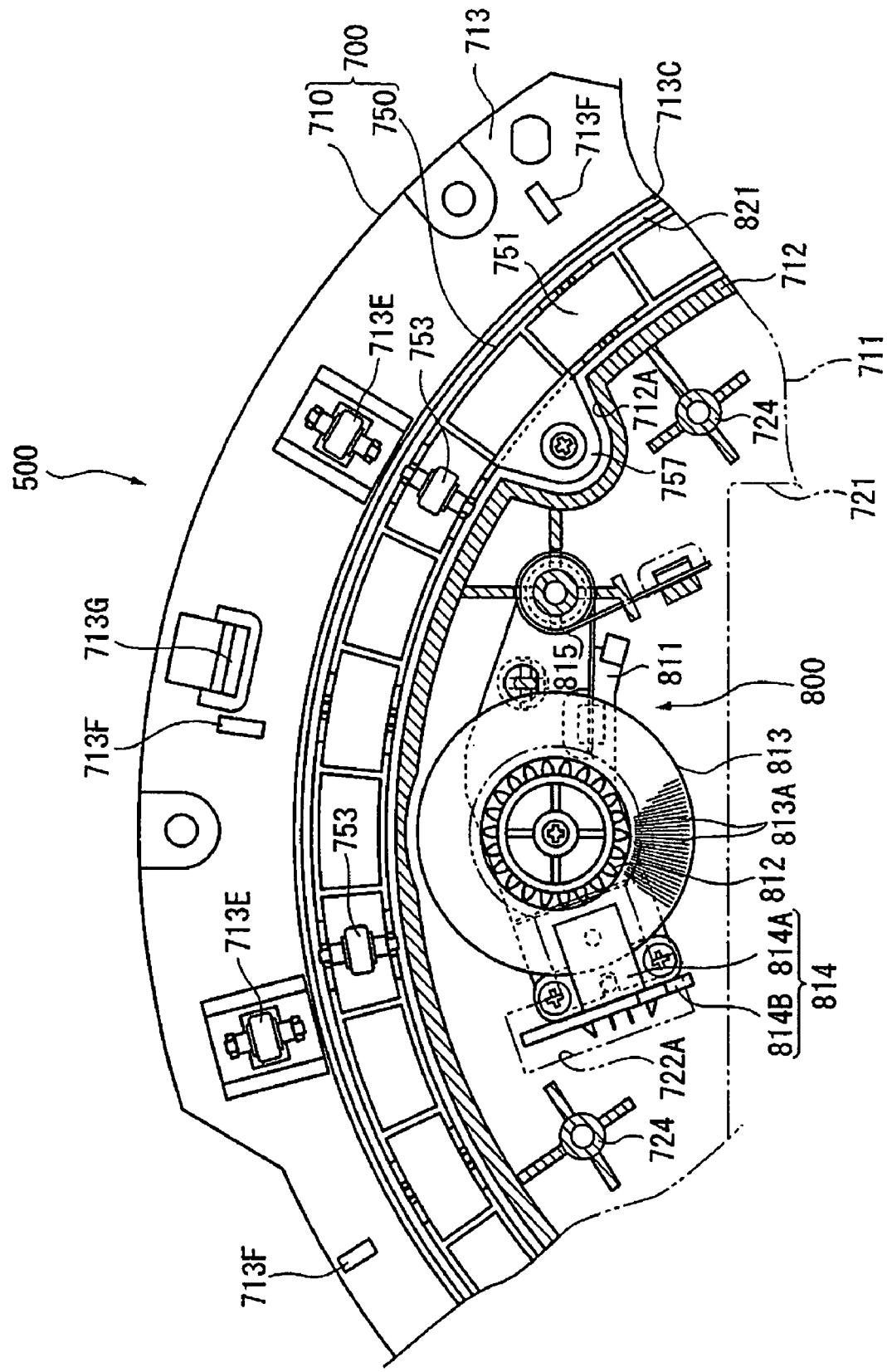
FIG. 11 is a plane sectional view showing a part near the rotary movement detector in the first embodiment with reference to the condition in which the rotating body of the switch device is detached.
Figure 12:
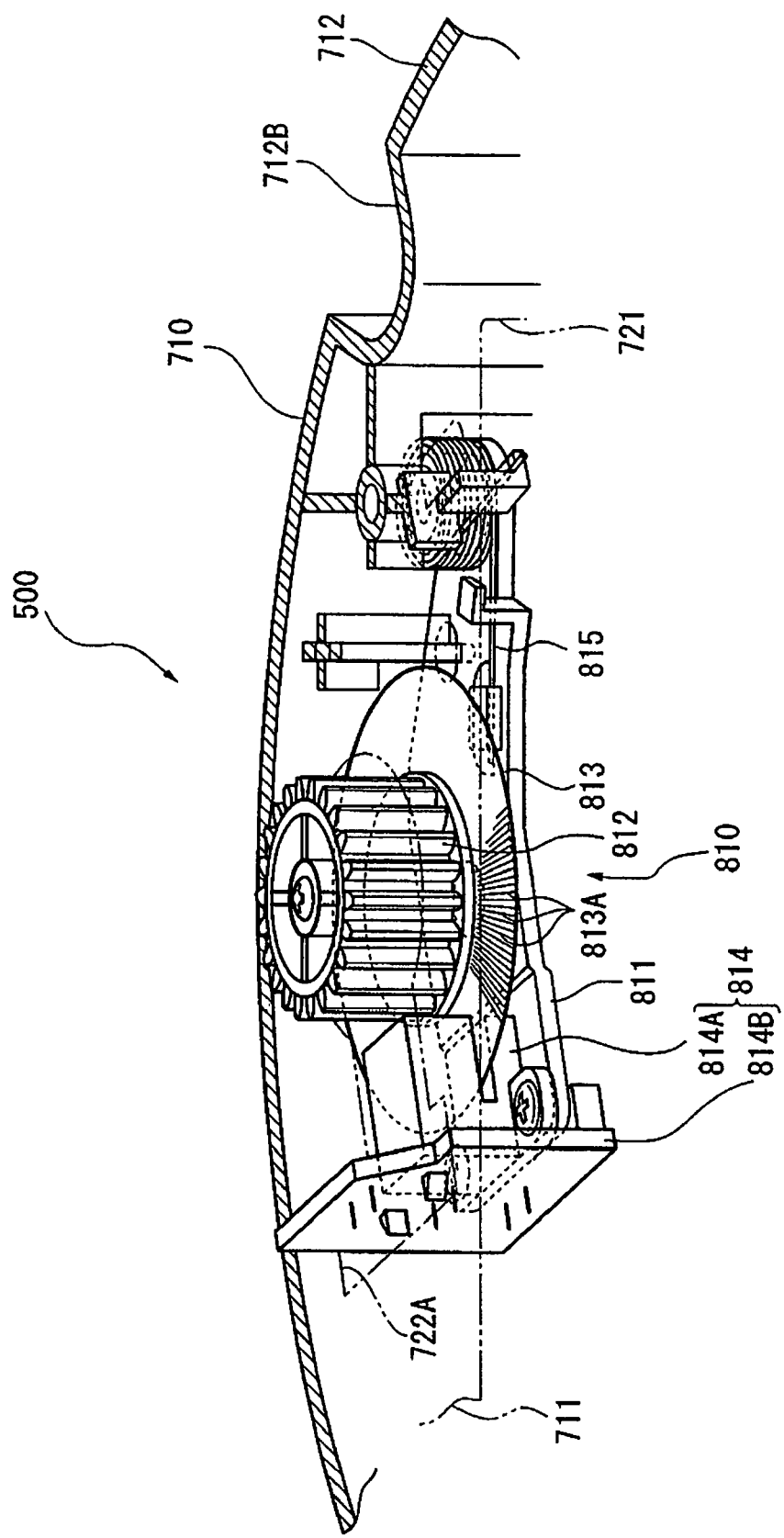
FIG. 12 is a perspective view showing a part near the rotary movement detector in the first embodiment with reference to the condition in which the rotating body of the switch device is detached and the base is cut out.
Figure 13:
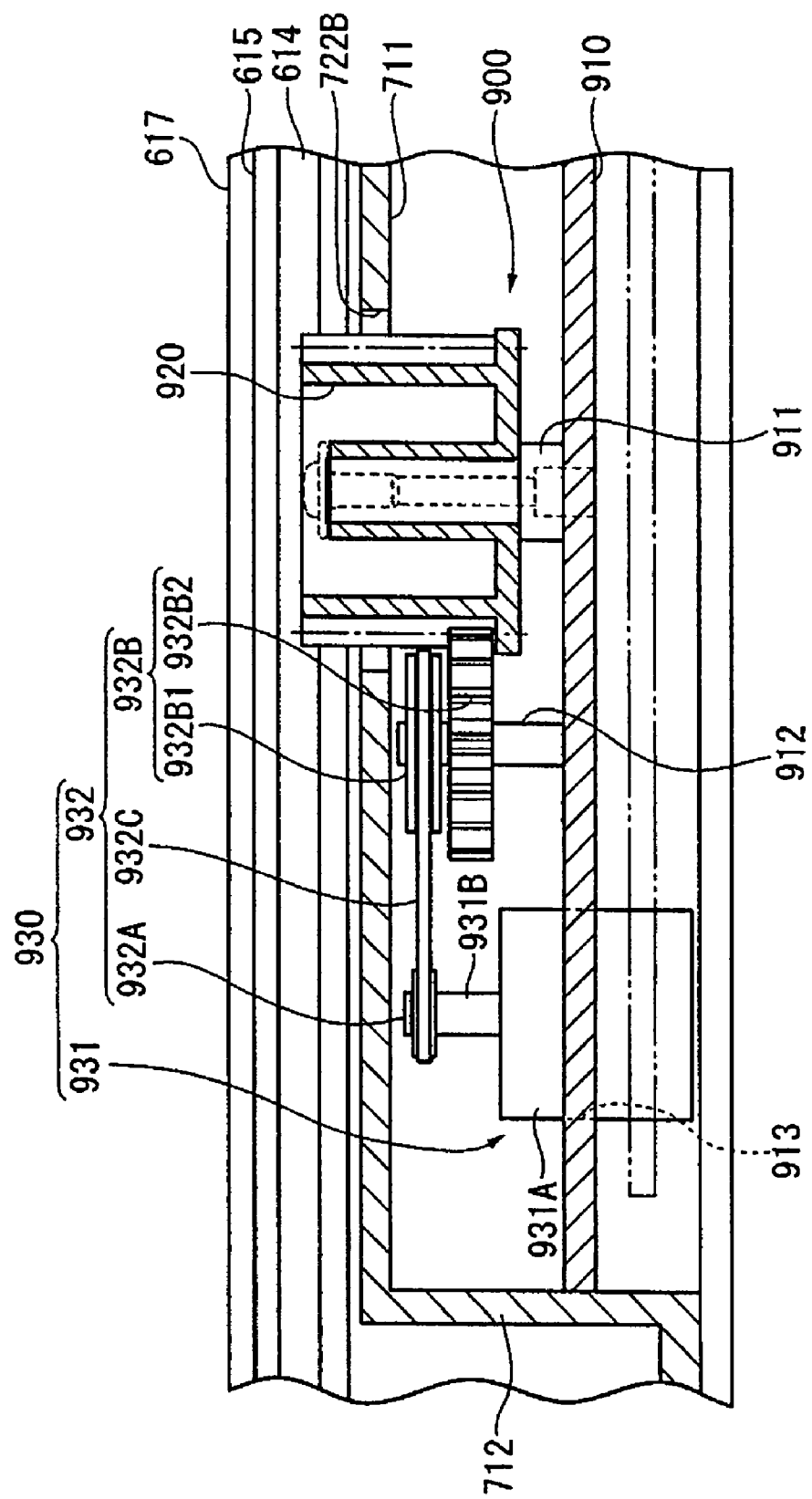
FIG. 13 is a sectional side elevation taken at a position of a restricting unit of the switch device according to the first embodiment.
Figure 14:
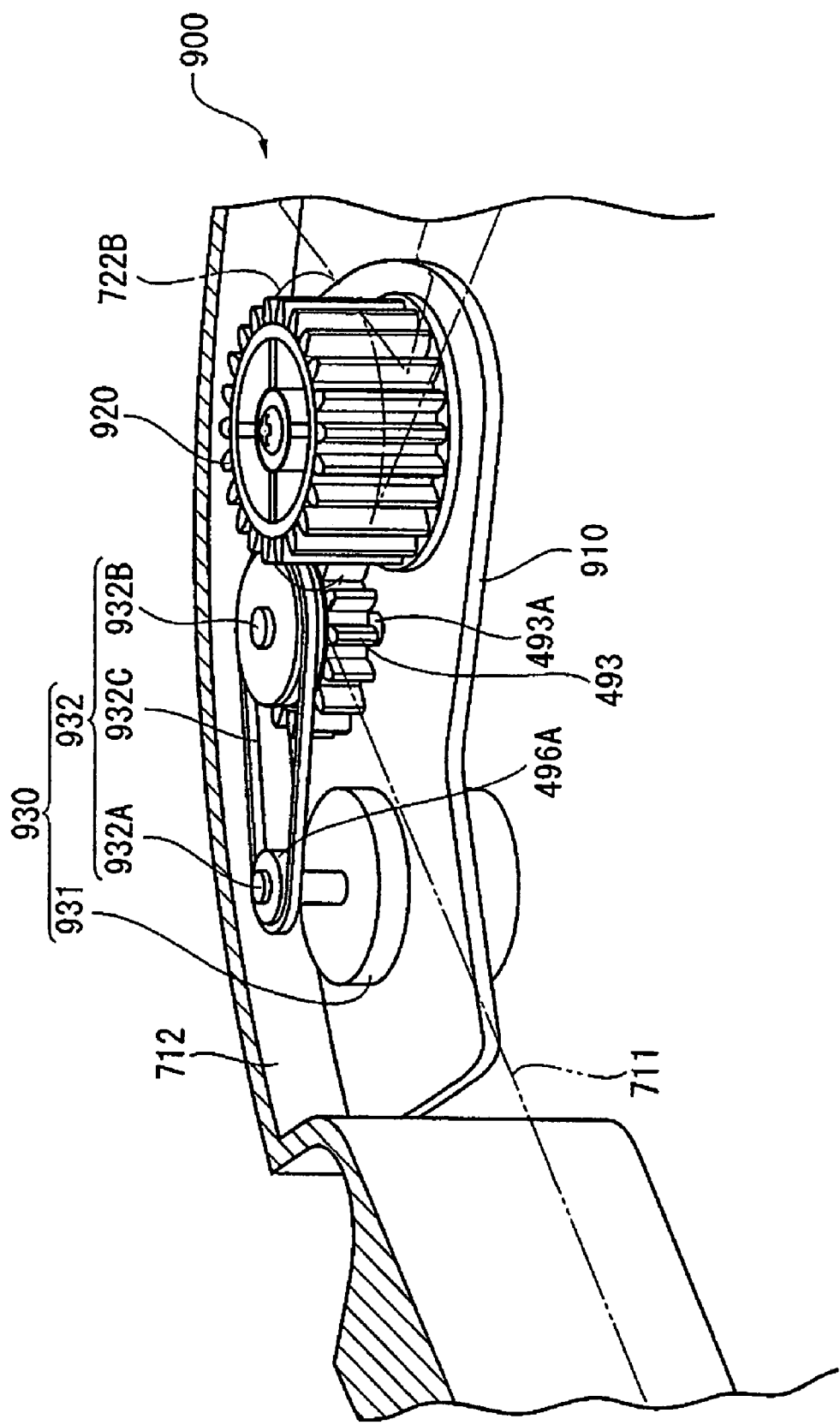
FIG. 14 is a perspective view showing a part near the restricting unit in the first embodiment with reference to the condition in which the rotating body of the switch device is detached and the base is cut out.
Figure 15:
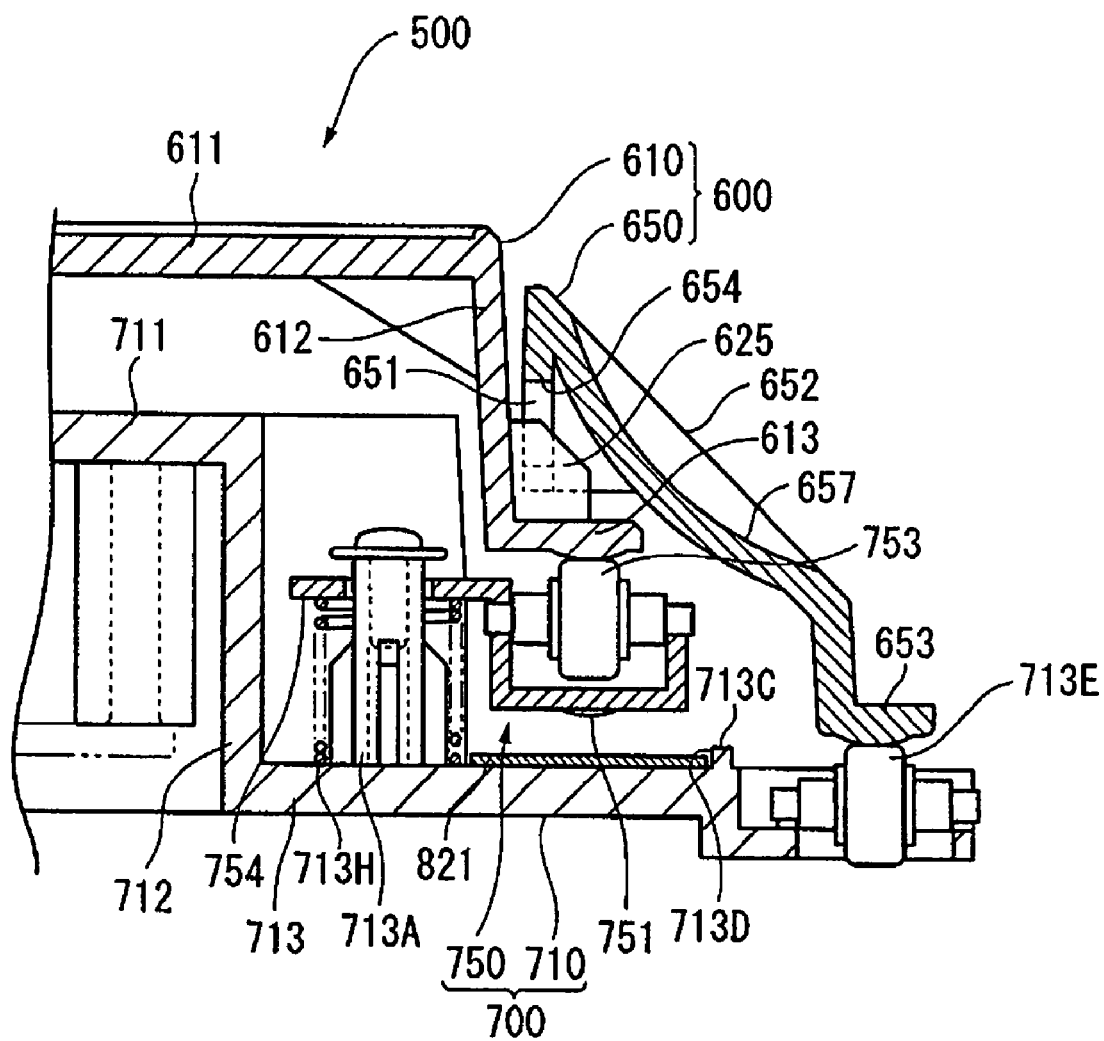
FIG. 15 is a sectional side elevation showing a part near a screw-stopping rib of the switch device according to the first embodiment.
Figure 16:
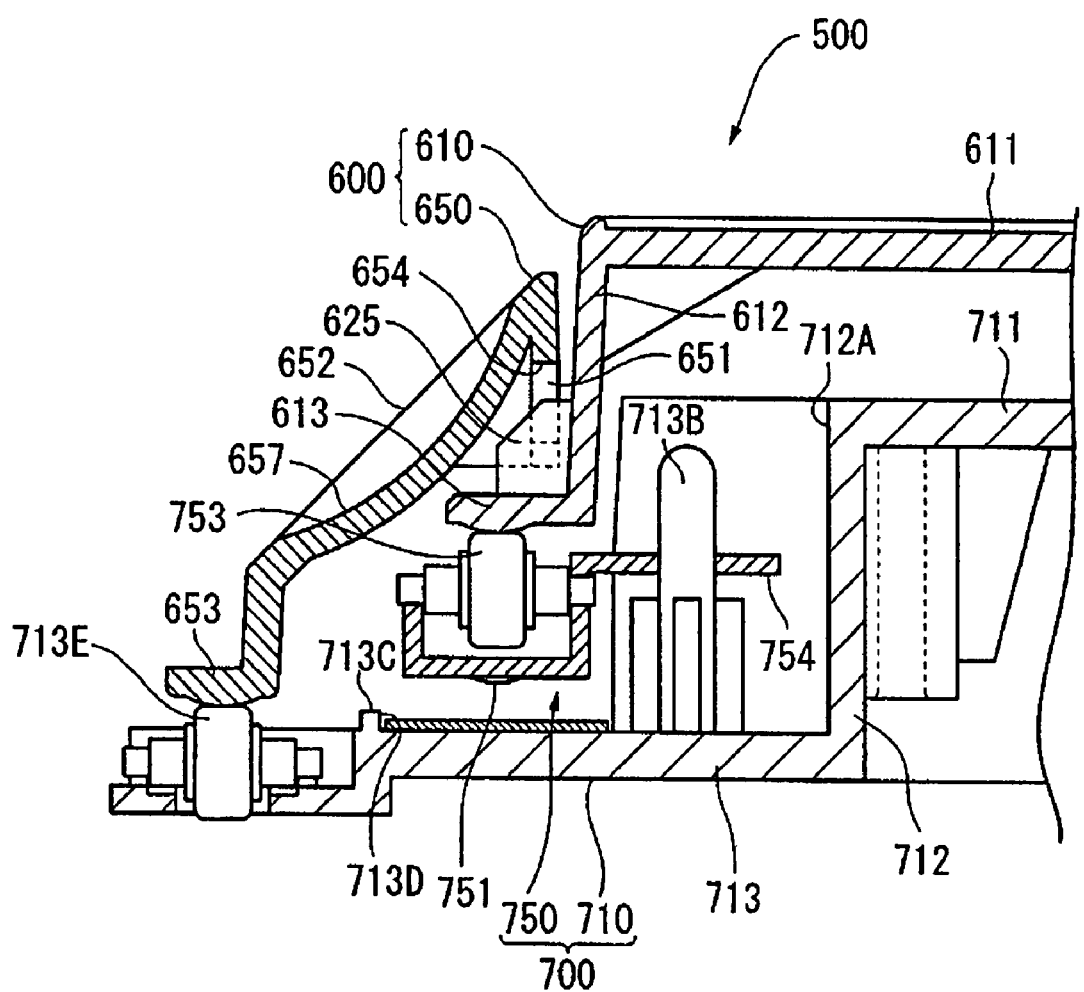
FIG. 16 is a sectional side elevation showing a part near a guide pin of the switch device according to the first embodiment.
Figure 17:
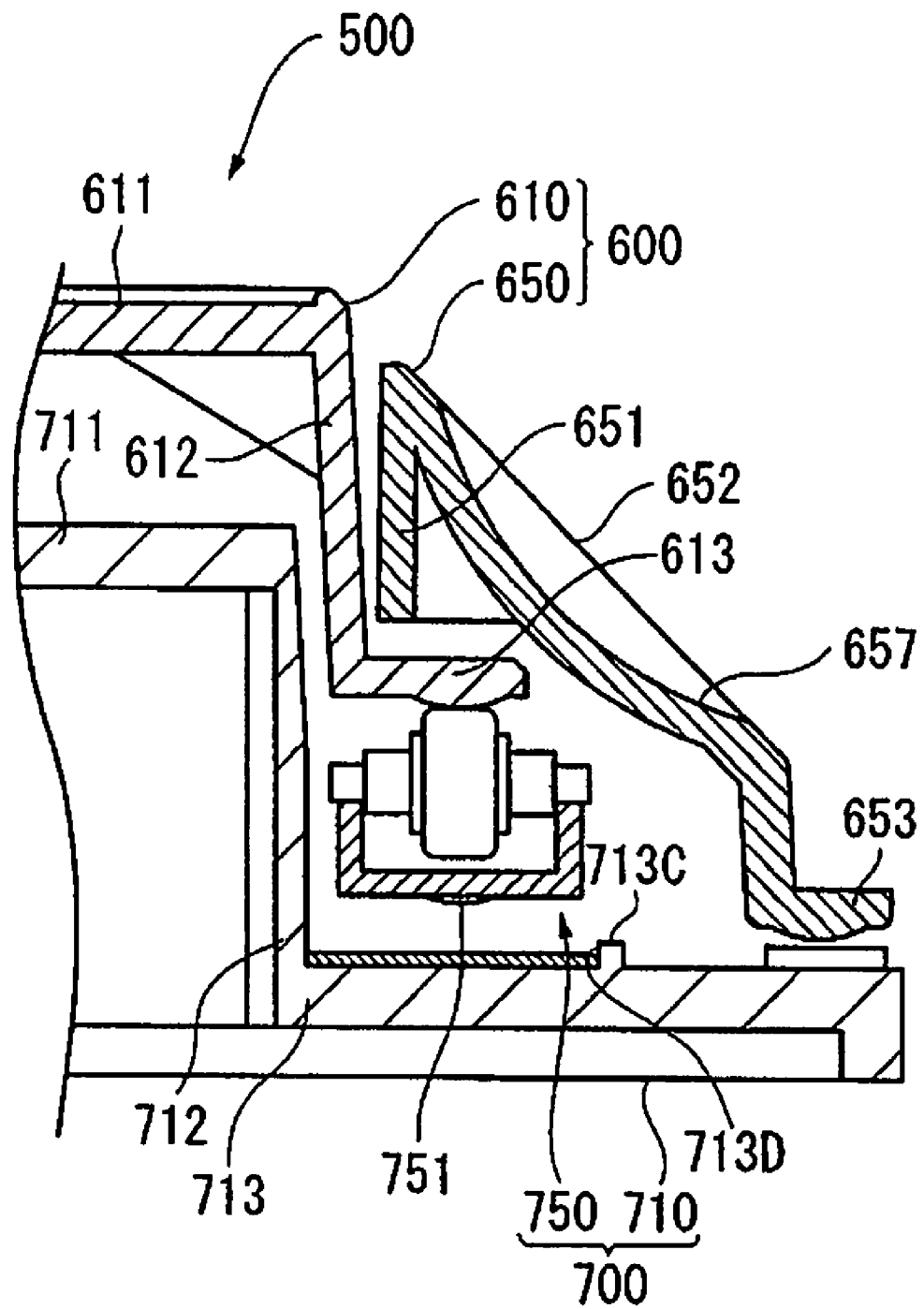
FIG. 17 is a sectional side elevation showing a part near a pressing bulge of the switch device according to the first embodiment.
Figure 18:
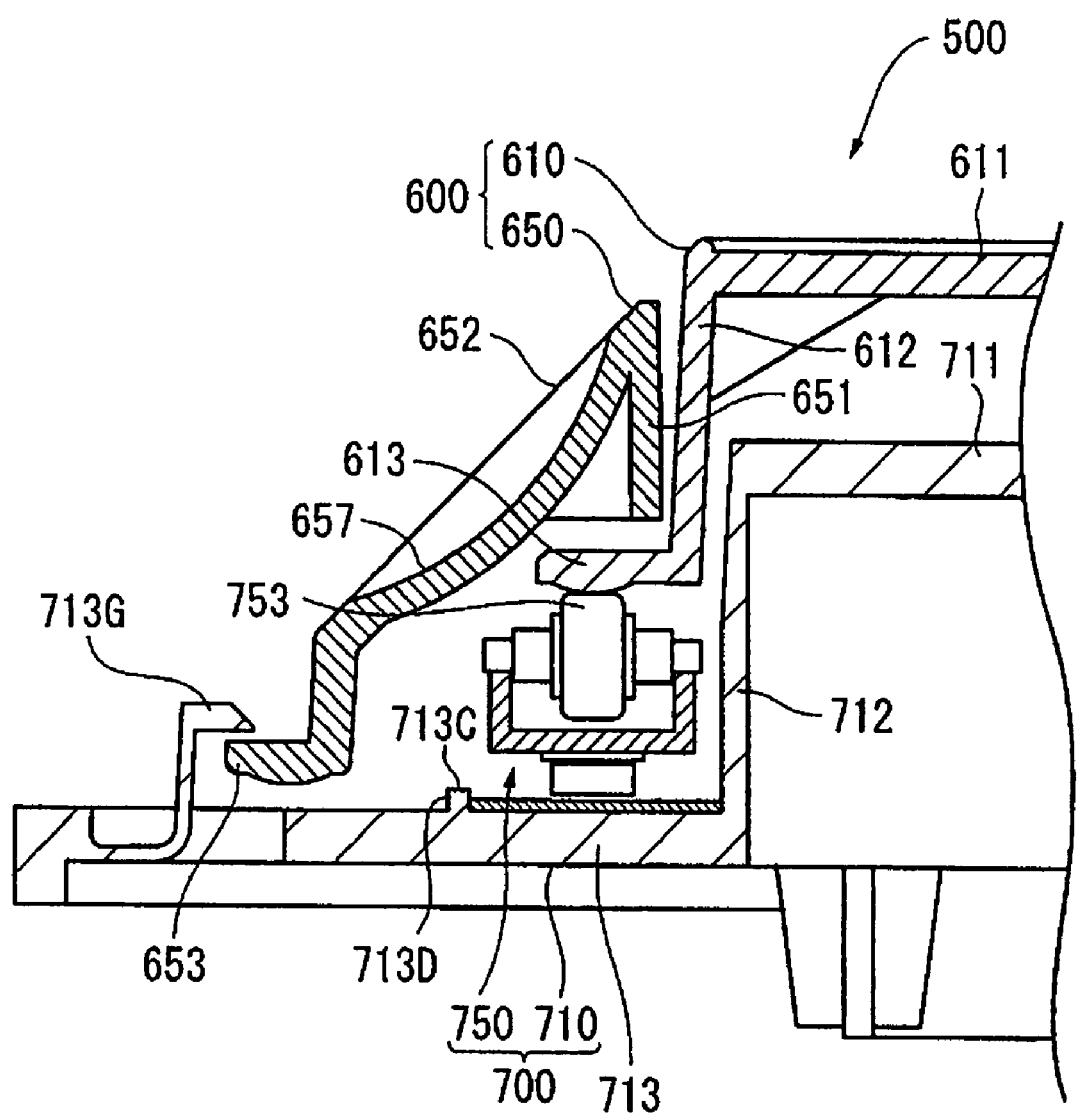
FIG. 18 is a sectional side elevation showing a part near a cushion member of the switch device according to the first embodiment.

As shown in FIG. 8 and FIGS. 13 and 14, the restricting unit 900 is disposed on the lower side of the top plate 711 of the mount 710 confronting the rotation restricting window 722B. The restricting unit 900 is coupled with the information-processing unit 400 to restrict the rotary movement of the rotating body 600 rotated by an input operation in accordance with the control by the information-processing unit 400. The restricting unit 900 includes an attachment base 910, a restricting gear 920 (contact member) and a rotary drive unit 930. The rotary drive unit 930 includes an electric motor 931 and a drive transmitter 932. The drive transmitter 932 includes an output pulley 932A, an intermediate rotating body 932A and an endless belt 932C.

The attachment base 910 is a longitudinal plate, which is attached and fixed on the lower side of the top plate 711 of the mount 710. Project from the attachment base 910A is a first support shaft 911 that is located on an end in the longitudinal direction and having an axial direction aligned with the thickness direction of the attachment base 910 and a second support shaft 912 that is located on the middle portion in the longitudinal direction and having an axial direction approximately parallel to the first support shaft 911. A penetrating hole 913 is provided on the other end in the longitudinal direction of the attachment base 910. A restricting gear 920 is rotatably supported on the first support shaft 911 of the attachment base 910. An intermediate rotating body 932B is supported on the second support shaft 912 in a rotatable manner. The intermediate rotating body 932B is configured by coaxially and integrally connecting an intermediate pulley 932B1 and an intermediate gear 932B2. A main body 931A of the electric motor 931 is fitted and fixed into the through hole of the attachment base 910. The endless belt 932C is wound on the intermediate pulley 932B1 of the intermediate rotating body 932B and the output pulley 932A integrated with an output shaft 931B of the electric motor 931 and having diameter smaller than the intermediate pulley 932B1.

Figure 5:
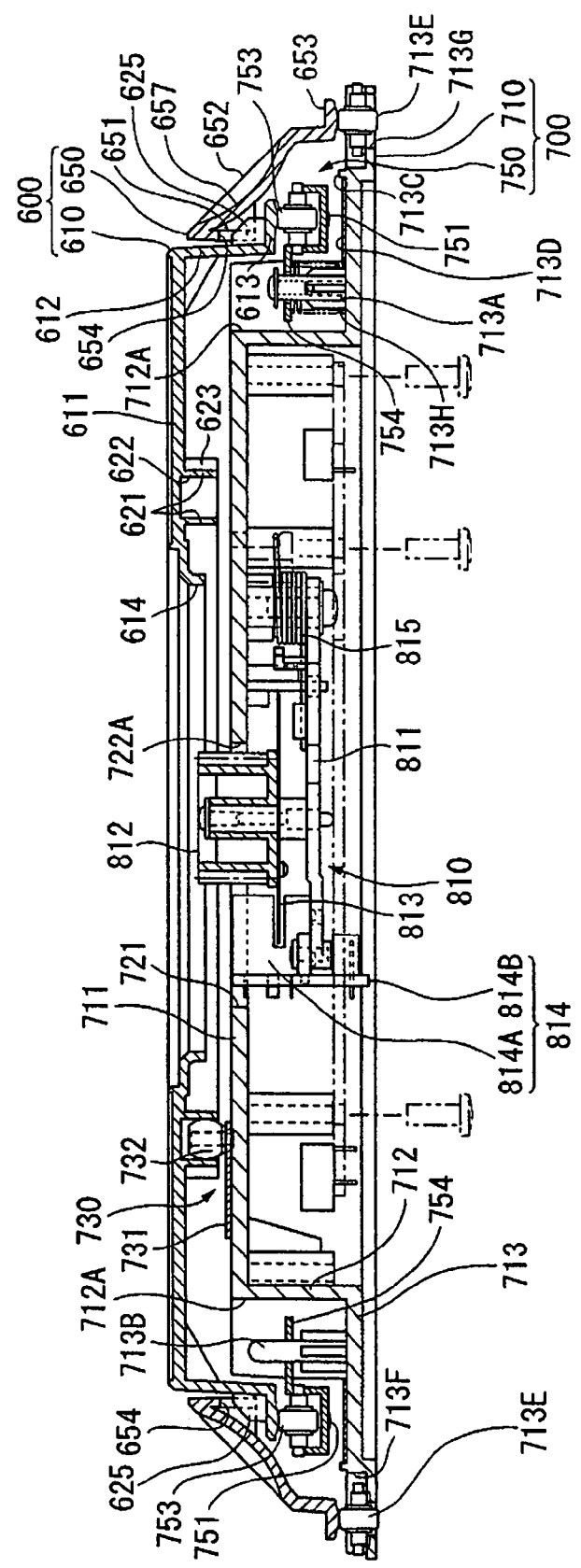
FIG. 5 is a sectional side elevation showing the switch device of the first embodiment, in which a position for a rotary drive unit to be disposed is cut out.
Figure 6:
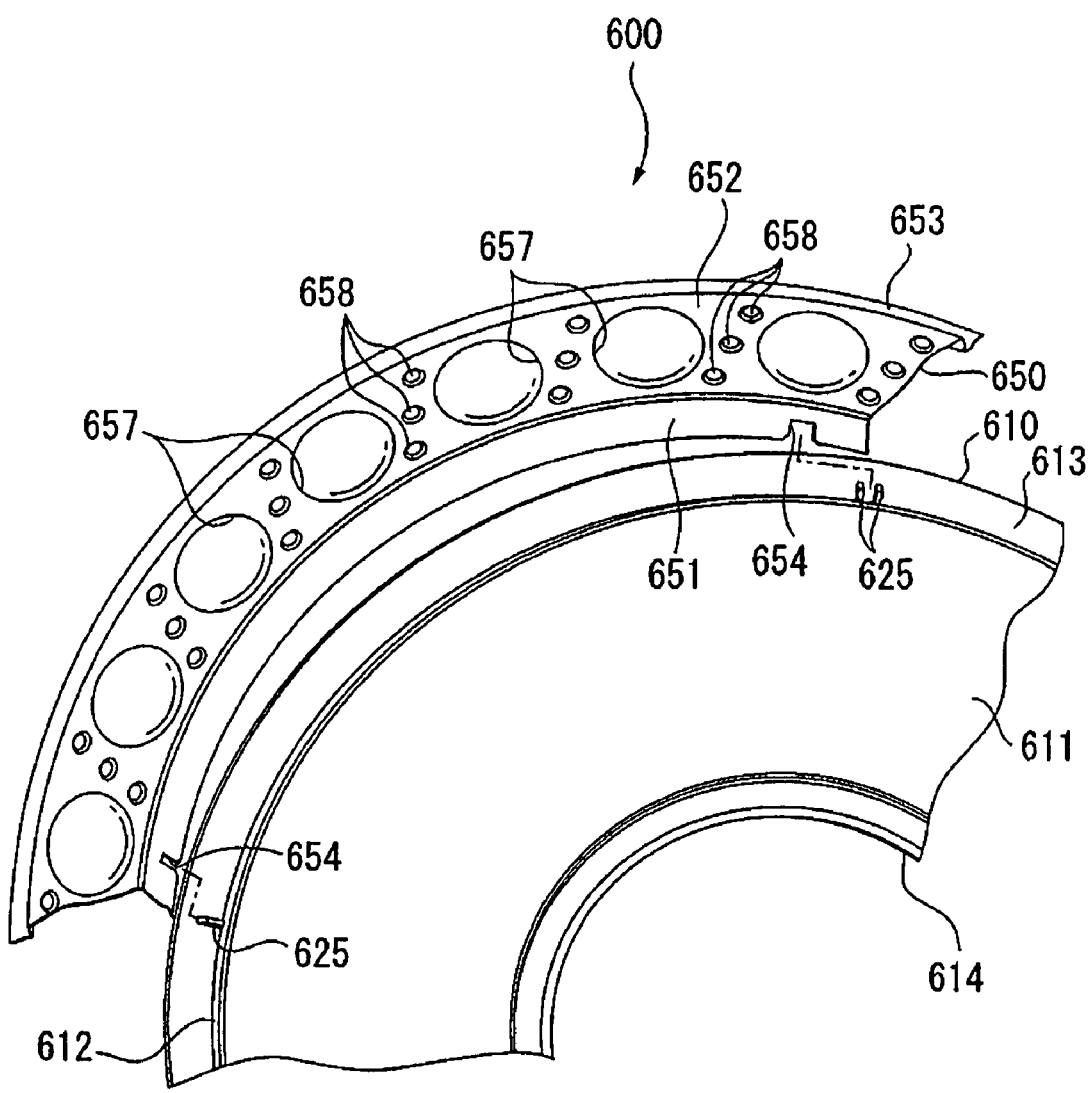
FIG. 6 is an exploded perspective view showing a part of a rotating body of the first embodiment.
Figure 7:
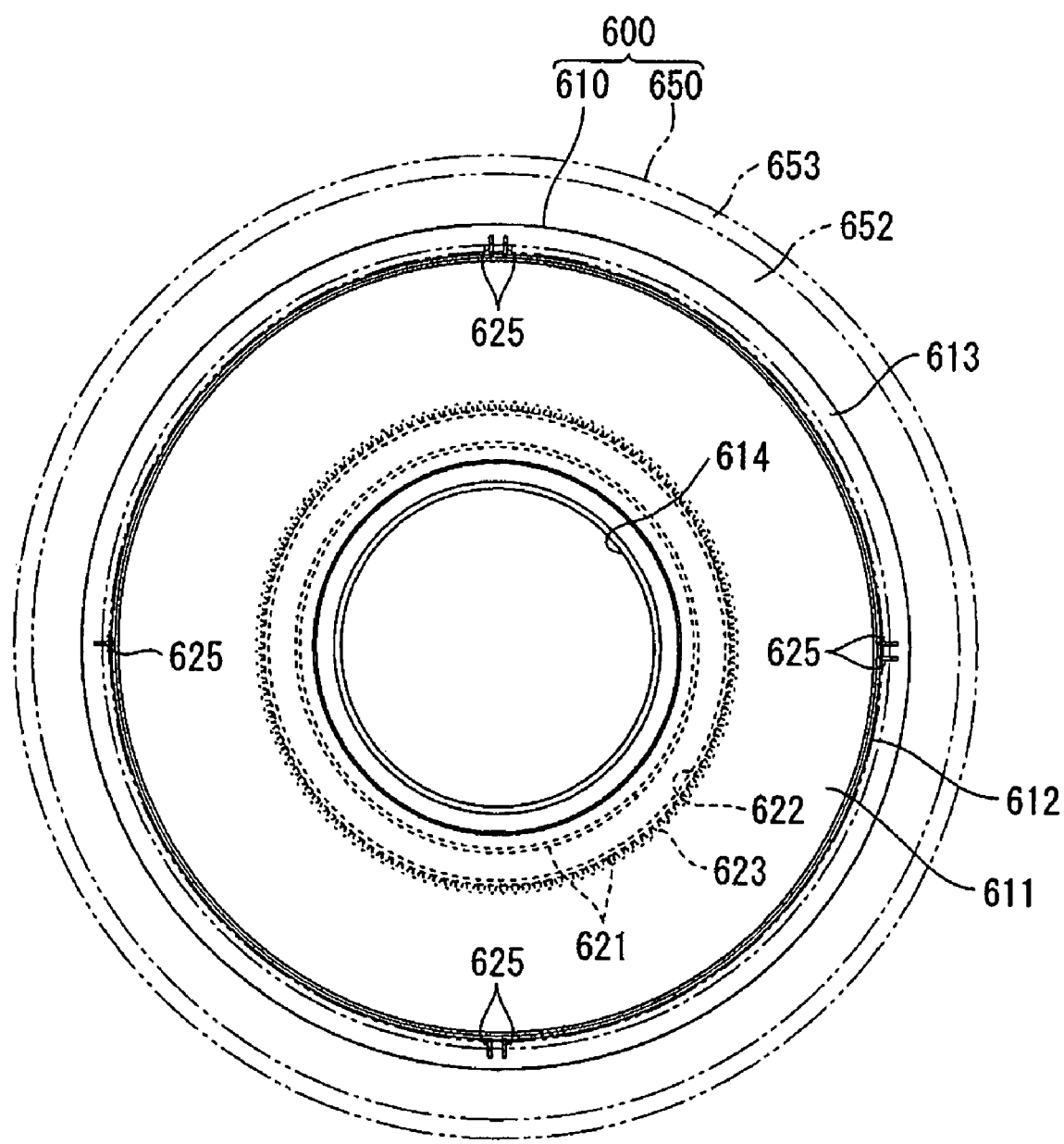
FIG. 7 is a plane view showing a jog table according to the first embodiment.

An arrangement for preventing idling rotation, i.e. irregularities and the like is preferably provided on the outer circumference of the inner circumference of the endless belt 932C and the outer circumference of the intermediate pulley 932B1. Though the intermediate pulley 932B1 having diameter smaller than that of the intermediate gear 932B2 is illustrated in FIGS. 5 and 13 for the convenience of explanation, other arrangement is possible. For instance, the intermediate rotating body 932B may be arranged by providing the intermediate pulley 932B1 and the intermediate gear 932B on both sides of the attachment base 910, where the restricting gear 920 is engaged on one side and the endless belt 932C is wound on the other side. According to such an arrangement, the diameter of the intermediate pulley 932B1 can be made larger than that of the intermediate gear 932B2, so that an arrangement can be easily attained where the rotation number of the output shaft 931B of the electric motor 931 is increased relative to the rotation number of the restricting gear 920.

The electric motor 931 is coupled with the information-processing unit 400 and the output shaft 931B is rotated by the electric power supplied by the information-processing unit 400. The rotary drive of the output shaft 931B of the electric motor 931 is transmitted to the restricting gear 920 through the drive transmitter 932 to be transmitted to the first gear 623 to which the restricting gear 920 is engaged, thereby applying a drive force for rotating the rotating body 600 by the restricting unit 900. Specifically (though details will be described below), when the rotating body 600 is rotated by the input operation of a user, the output shaft 931B of the electric motor 931 or the endless belt is idly rotated to apply a load during the input operation in accordance with the rotating condition detected by the rotary movement detector 810.

On the other hand, the vibrating motor 950 is disposed on the lower side of the top plate 711 of the mount 710. The vibrating motor 950 is coupled with the information-processing unit 400 and is vibrated while controlling the magnitude of the current value of the supplied power by the information-processing unit 400 to vibrate substantially the entire rotating section 600 so that the vibration is transmitted to a user who conducts input operation on the rotating section 600. In the present embodiment, though the vibrating motor 950 is used for vibrating the rotating section 600, any component including a piezoelectric element and the like may be used while controlling the voltage value of the applied voltage for vibrating the rotating section 600.

(Internal Arrangement of Information-Processing Unit)

Next, an internal arrangement of the above-described information-processing unit will be described below with reference to the drawings.

As described above, the information-processing device 300 includes the first display unit 310, the drive 330, the switch section (operation unit) 340, the communication unit 350, the storing unit 360, and the information-processing unit 400.

The first display unit 310 is coupled with the information-processing unit 400 to display information properties, processing condition and the like in accordance with the control signal output by the information-processing unit 400. Specifically, when a plurality of music data stored on CD-DA (music CD) is processed as information, the number of songs in the music data stored in CD-DA, the track number (order of music data to be processed), reproduction time including total reproduction time of all of the stored music data, reproduction time for each music data and reproduction time of the music data now being played, tempo of reproducing music data, sound volume at and around the reproducing position of the music data, low-pitched sound volume lower than a predetermined frequency, speed ratio of now-played music data relative to ordinary playing speed and the like are displayed thereon. The display unit 310 is, for instance, liquid crystal display panel, organic EL (Electro-Luminescence) panel, PDP (Plasma Display Panel), CRT (Cathode-Ray Tube), FED (Field Emission Display), electrophoresis display panel and the like.

The drive 330 is connected with the information-processing unit 400, which conducts reading processing for reading the information stored on a recording medium detachably mounted and storing processing for storing the information on the recording medium in accordance with a control signal output by the information-processing unit 400. The drive 330 is adapted for above-described various recording media. When the recording medium is an optical disc, the drive 330 includes an optical pickup and when the recording medium is memory card and the like, the drive 330 includes a connector and a processing driver, for instance. Incidentally, it is possible to employ a plurality of the drives 330 for the various recording media instead of providing a single drive 330.

The switch section 340 is coupled with the information-processing unit 400, which outputs a predetermined operation signal in accordance with the input operation by a user to the information-processing unit 400 to set the information-processing condition in the information-processing unit 400. As described above, the switch section 340 includes an eject button 341 (operation member), a mode adjuster 342, a tempo adjuster 343, a cue/loop button 344, a quick return button 345, a search-setting section (search button) 346, a cue button 347, a play/stop button 348, a loop operating section 349 and the like.

The eject button 341 outputs a predetermined operation signal to the information-processing unit 400 by a pressing input operation. In accordance with output of the operation signal, the information-processing unit 400 controls a transfer mechanism (not shown) provided on the drive 330 to unload the recording medium mounted at a clamp position of the drive 330 to the outside of the body case 301 through the insertion slot 302.

The mode adjuster 342 includes a jog-mode button 342A for switching the operation mode of the information-processing device 300, and a speed adjuster 342B for setting acceleration and deceleration of reproducing speed at play-start and play-stop when the jog-mode button 342A is ON. Though described below in detail, the jog-mode button 342A switches the reproducing condition by the press detector 820 of the switch device 500. Specifically, when the jog-mode button 342A is pressed down (ON condition), an operation signal for enabling the input operation by the press detector 820, i.e. information-processing in accordance with the input operation, is output. When the jog-mode button is in OFF condition, an operation signal for disabling the input operation of the press detector 820, i.e. prohibiting the information-processing in accordance with the input operation, is output. The speed adjuster 342B is rotatably provided, which variably sets reproduction-starting speed and deceleration speed during reproduction-stopping process by the rotating operation by a user.

The tempo adjuster 343 variably sets the reproduction tempo of music data to be played by an input operation. The tempo adjuster 343 includes a tempo-adjusting knob 343A, a master tempo button 343B and a tempo range switching button 343C. The tempo-adjusting knob 343A is slidable in accordance with an input operation, which variably sets the reproduction tempo of music data to be played within a predetermined range. The master tempo button 343B variably sets the speed of reproduced sound without changing the pitch thereof in accordance with input operation. The tempo range switching button 343C variably sets the range of the tempo adjusting knob 343A in accordance with input operation.

The cue/loop button 344 actuates the drive 330 for information-processing together with other recording medium such as a memory card, which outputs an operation signal based on data-recording instructions at cue point or loop point for each optical disc (one recording medium) in accordance with press-down by an input operation of a user. The cue/loop button 344 includes a memory button 334A and a call button 334B. The memory button 334A outputs an operation signal for recording information relating to a cue point or a loop point for each optical disc in a memory card and the like in accordance with input operation. The call button 334B outputs an operation signal based on instructions for selectably reading the cue point or the loop point for each optical disc stored in the memory card and the like in accordance with input operation.

The quick return button 345 selects processing contents relating to change in reproducing condition by the switch device 500. For instance, the quick return button 345 selects at least one of processing-start or processing-stop of the information to be reproduced and change in the reproducing position of the information to be reproduced. Specifically, when the jog-mode button 342A is ON and the quick return button 345 is OFF, the processing contents relating to processing-stop or processing-start is set. When the press detector 820 of the switch device 500 detects press or contact in accordance with press or contact input operation on the rotating section 600 by a user, the processing of the information is stopped or started. On the other hand, when the quick return button 345 is ON, processing for changing the reproducing position of the reproduced information to the cue point is set. When the press detector 820 of the switch device 500 detects press or contact in accordance with press or contact input operation on the rotating section 600 by a user, the reproducing position of the reproduced information is moved the cue point.

When both of the jog-mode button 342A and the quick return button 345 are ON, both of the processing for changing the reproducing position of the reproduced information to the cue point and for moving the processing position of the reproduced information forward and backward are set. The processing for moving the reproducing position of the reproduced information to the cue point is set and the processing for moving the processing position of the reproduced position forward and backward is variably set in accordance with the rotating condition of the rotating body 600 detected by the rotary movement detector 820 of the switch device 500, of which details will be described below. More specifically, when the press detector 820 of the switch device 500 detects press or contact in accordance with press or contact input operation on the rotating section 600 by a user, the reproducing position of the reproduced information is moved to the cue point. Further, while keeping the press or contact operation, forward or backward movement (so-called scratch) of the reproducing position of the reproduced information is conducted in accordance with the rotation of the rotating body 600 detected by the rotary movement detector 810. Incidentally, when either the jog-mode button 342A or the quick return button 345 is OFF, both of the processing for changing the reproducing position of the reproduced information to the cue point and for moving the processing position of the reproduced information forward and backward are not set.

The search setting section 346 sets a processing for forward-feeding or backward-feeding the to-be-reproduced position of the information stored in a recording medium by an input operation. The search button 346 includes a track search button 346A and a search button 346B. When a plurality of music data is stored, the track search button 346A sets the music data that is currently reproduced or is currently reproduction-suspended in a reproduction or reproduction-suspension condition from the start point of the preceding or proceeding music data. While the search button 346B is continuously pressed, the currently-reproduced or reproduction-suspended position is altered forward or backward.

The cue button 347 is for mainly registering a predetermined cue point. For instance, when being pressed down by a user while temporarily suspending the reproduction of optical disc, an operation signal based on instructions for a predetermined cue point, i.e. for registering the temporarily suspending position as the cue point, is output.

The play/stop button 348 outputs an operation signal for starting information reproduction processing or stopping the information reproduction in accordance with input operation.

The loop operating section 349 is for setting a processing for repeatedly reproducing the information in accordance with input operation. The loop operating section 349 includes a loop-in/realtime cue button 349A, a loop-out/out-adjust button 349B, a re-loop/exit button 349C and a time-mode/ auto-cue switching button 349D. When being pressed down while reproducing the information, the loop-in/realtime cue button 349A outputs an operation signal based on instructions on start point within repeated reproduction period, i.e. sets the time point of the press-down operation as the start point. When being pressed down while reproducing the information, the loop-out/out-adjust button 349B outputs an operation signal based on instructions on end point within the repeated reproduction period, i.e. sets the time point of the press-down operation as the end point. When being pressed down, the re-loop exit button 349C outputs an operation signal based on instructions on repeated information-reproduction within the time period instructed by the loop-in/ realtime cue button 349A and the loop-out/out-adjust button 349B, i.e. sets to conduct the repeated reproduction or release the repeated reproduction in accordance with the press-down operation. When the time-mode/auto-cue switching button 349D is ON, it is automatically set that silent section at the position where the information-reproduction is started is excised.

As described above, the switch device 500 includes the second display 320, the moving condition recognizing unit 800 including the rotary movement detector 810 and the press detector 820, the rotary drive unit 930 and the vibrating motor 950.

Figure 19:
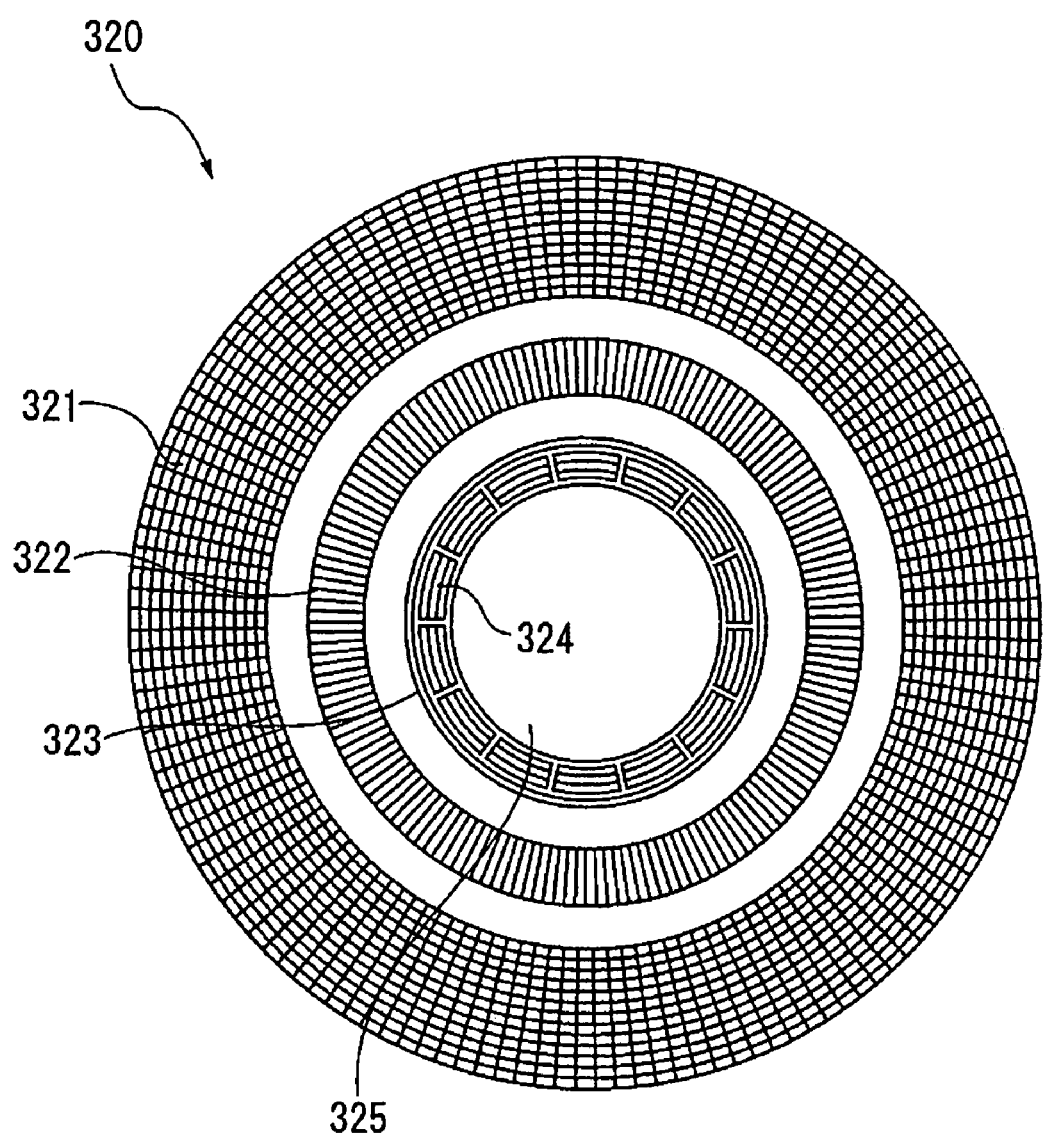
FIG. 19 is an illustration showing an outline of display area of a second display unit in the first embodiment.

The second display unit 320 is coupled with the information-processing unit 400 to display information processing condition in accordance with the control signal output by the information-processing unit 400. Various display devices are used for the second display unit 320 in the same manner as the first display unit 310. As shown in FIG. 19, the second display unit 320 includes a reproducing-position display 321, a cue-point position indicator 322, a sound-memory condition display 323, a jog-touch detection display 324 and a mode display 325.

The reproducing-position display 321 is positioned on the outer circumference of the display area of the second display unit 320, which is arranged in a matrix along a substantially annular virtual locus and shaped in a narrow sector. The reproducing-position display 321 virtually displays reproducing position of recording medium by lighting light-emitting device thereof in a manner similar to rotation speed of an analog record. For instance, the reproducing position repeats rotation along substantially circular virtual locus at the same speed as an analog record that is rotated by 33 rpm.

The cue-point position indicator 322 is positioned inside the display position display 321 within the display area of the second display unit 320, which has a narrow substantially linear sector-shaped light-emitting elements disposed along a substantially circular virtual locus in a manner similar to the reproducing-position display 321. The cue-point position display 322 displays a cue point position in the circumferential direction corresponding to the virtual reproducing position corresponding to an analog record displayed on the reproducing-position display 321 when the cue button 347 of the switch section 340 is pressed down by a user.

The sound-memory condition display 323 is located inside the cue-point position indicator within the display area of the second display unit 320, which is constituted by a substantially ring-shaped light-emitting elements. The sound-memory condition display 323 notifies that the information amount of a reproducing object stored in the below-described storing unit 360 falls below a predetermined amount caused by defects on read information on account of, for instance, damage and dust on a recording surface of an optical disc and partial damage on the stored information.

The jog-touch detection display 324 is located inside the sound-memory condition display 323 within the display area of the second display unit 320, which has a substantially circular arrangement of relatively wide sector-shaped light-emitting elements. The jog-touch detection display 324 exhibits a predetermined display when a user presses or touches the rotating body 600 of the switch device 500. The mode display 325 is shaped in an approximate disc at the center of the display area of the second display unit 320, which displays and notifies to the effect when the operation mode set by the mode adjuster 342 is the jog mode.

As described above, the rotary movement detector 810 of the moving-condition recognizing unit 800 is coupled with the information-processing unit 400 and detects the rotating condition of the rotating body 600 to output a signal corresponding to the rotating condition to the information-processing unit 400. Specifically, when a user rotates the rotating body 600, the rotation-detecting plate 813 is rotated together with the detecting gear 812 engaged with the first gear 623 of the jog table 610, where the rotating condition (rotary speed and rotary direction) of the rotation-detecting plate 813 is detected by the rotation-detecting sensor 814 to output a detection signal relating to the rotating condition to the information-processing unit 400.

As described above, the press detector 820 of the moving condition recognizing unit 800 is coupled with the information-processing unit 400 and detects the pressing and contacting condition of the rotating body 600 by a user to output a signal corresponding to the pressing and contact condition to the information-processing unit 400. Specifically, the pressing and touching operation of the rotating body 600 by a user presses down the rotating section 750 against the restoring force of the coil spring 713H and the cushion member 752 and the pressing bulge 751 of the rotating section 750 closes the switch 821A of the tape switch 821 to output a predetermined detection signal corresponding to the pressing operation to the information-processing unit 400. Incidentally, when a piezoelectric element is also provided and pressing condition (pressing force) can be detected, a detection signal indicating the pressing force is output.

As described above, the rotary drive unit 930 is coupled with the information-processing unit 400 and drives the electric motor 931 under control by the information-processing unit 400 in a manner that applied load alters at a predetermined position when a user conducts input operation on the rotating body 600. Specifically, the output shaft 931B of the electric motor 931 is rotated by electric power supplied from the information-processing unit 400, the rotation of the output shaft 931B of the electric motor 931 being transmitted to the restricting gear 920 through the drive transmitter 932, thereby applying drive force for rotating the rotating body 600 through the first gear 623 to which the restricting gear 920 is engaged. Accordingly, the rotation resistance during the rotation of the rotating body 600 is increased and decreased in accordance with the drive condition of the electric motor 931 driven by the information processing unit 400 and resistance feeling (so-called click-like resistance feeling) differing in accordance with the properties of the information to be processed by the information processing unit 400 is provided to a user in rotating the rotating body 600.

As described above, the vibrating motor 950 is coupled with the information-processing unit 400 and is vibrated when electric power of a predetermined current value is supplied under control by the information-processing unit 400. The vibration is of a magnitude that is felt by a user in conducting an input operation on the rotating body 600 and does not cause misjudgment that the moving condition recognizing unit 800 is operated on account of the vibration.

The communicator 350 is connected with the information-processing unit 400 and is further coupled with a server device storing information in a manner distributable through a network and terminal units such as a personal computer under control by the information-processing unit 400 to acquire the stored information and output the information to the information-processing unit 400. The network includes the Internet based on general-purpose protocol such as TCP (Transmission Control Protocol)/IP (Internet Protocol), intranet, LAN (Local Area Network), network such as communication network and broadcast network including a plurality of base stations capable of transmitting/receiving information through wireless medium, wireless medium itself as a base for directly transmitting/receiving information and the like. The wireless medium is any media including electric wave, light, sound wave, electro-magnetic wave and the like. The information acquired by the communicator 350 and output to the information-processing unit 400 is stored in the storing unit 360 in a readable manner.

The storing unit 360 is a drive unit and a driver in which information is readably recorded in various recording media including magnetic disc such as HD (Hard Disc), optical disc such as DVD (Digital Versatile Disc), memory card and the like, a semiconductor memory and the like. The storing unit 360 also stores various programs executed on an OS (Operating System) for controlling the entire information-processing unit 300. Further, the storing unit 360 temporarily stores the signal to be processed by the information-processing unit 400. In other words, the storing unit 360 functions as a "memory".

The information-processing unit 400 includes a CPU (Central Processing Unit) and various I/O ports (not shown) including a display control port to which the first display unit 310 and the second display unit 320 are connected, a drive control port to which the drive 330 is connected, an input port to which the switch section 340 and the moving condition recognizing unit 800 is coupled, a drive control port to which the rotary movement detector 930 is coupled, a communication port to which the communicator 350 is connected, a storage port to which the storing unit 360 is connected and the like. The information-processing unit 400 includes a information recognizing unit 410, an information-acquiring unit 420, an operation controller 430, a processing unit 440, a display controller 450 and the like, all of which are installed as a program.

The information recognizing unit 410 recognizes input operating condition based on operation signal output by input operation of the switch section 340 and the switch device 500 and properties of the information. The information recognizing unit 410 includes an operation signal recognizer 411 and a property recognizing unit 412.

The operation signal recognizer 411 recognizes various operation signal output by the switch section 340 and detection signal output by the rotary movement detector 810 and the press detector 820 of the moving condition recognizing unit 800, recognizes change instructions of the processing condition input by a user to set processing condition of the information. The signal related to the setting of the processing condition is output to the information acquiring unit 420, the operation controller 430, the processing unit 440 and the display controller 450. Incidentally, when the detection signal related to pressing force from the press detector 820 is recognized, the processing condition is set in a manner corresponding to the magnitude of the pressing force, where, for instance, the reproducing speed is lowered in accordance with the magnitude of the pressing force. When the pressing force is gradually reduced from the temporal suspension of the reproduction by pressing the rotating body 600, the processing condition is set so that the time required for returning to ordinary reproducing speed is shortened in correspondence to the magnitude of the pressing force (faster reduction of the pressing force results in shorter time as compared to slower reduction of the pressing force).

Figure 20:
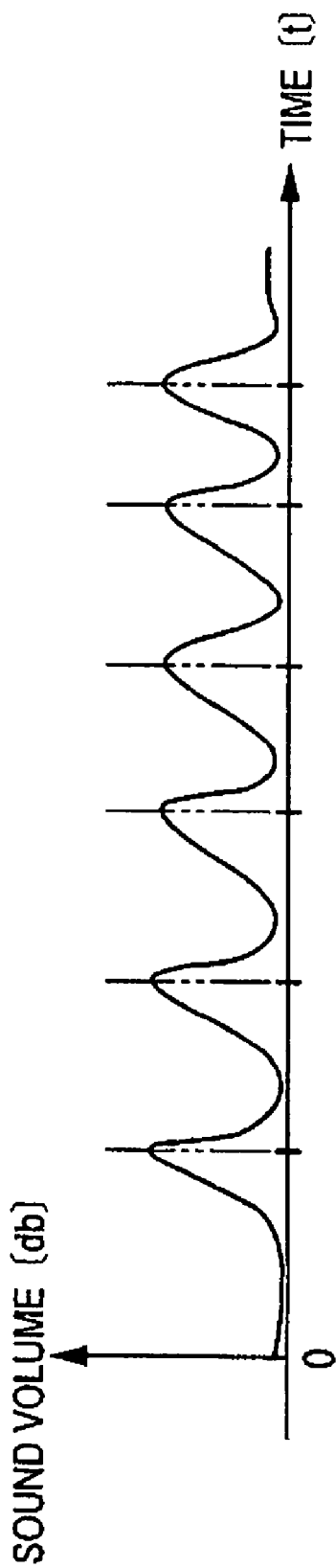
FIG. 20 is a waveform chart showing a change in sound volume in low-pitched sound area of music data according to the first embodiment.
Figure 21:
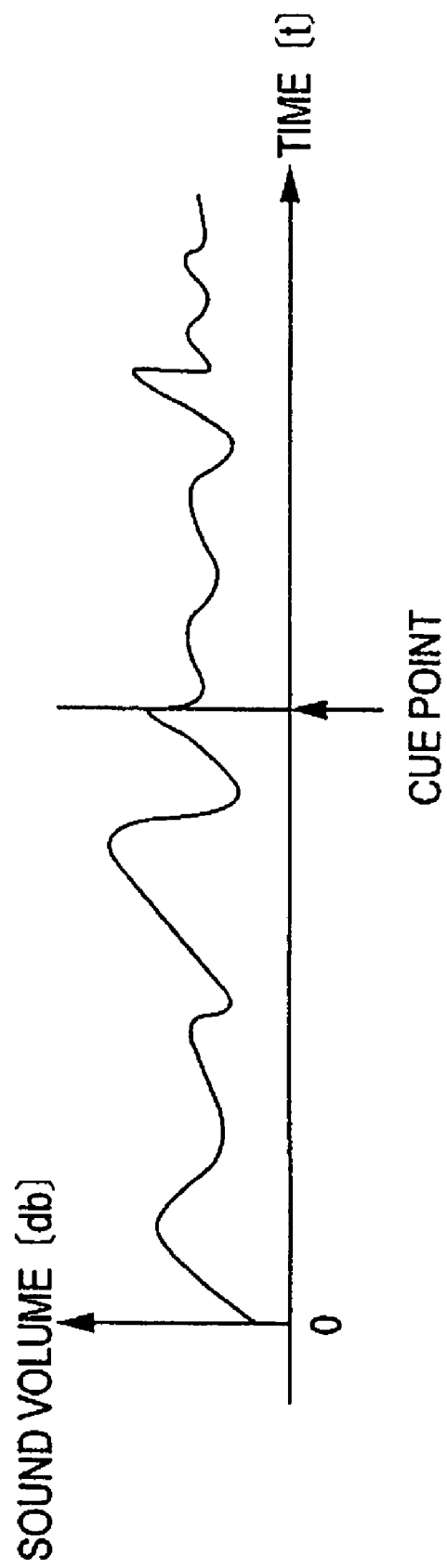
FIG. 21 is a waveform chart showing a setting condition of a cue point of the music data according to the first embodiment.
Figure 23:
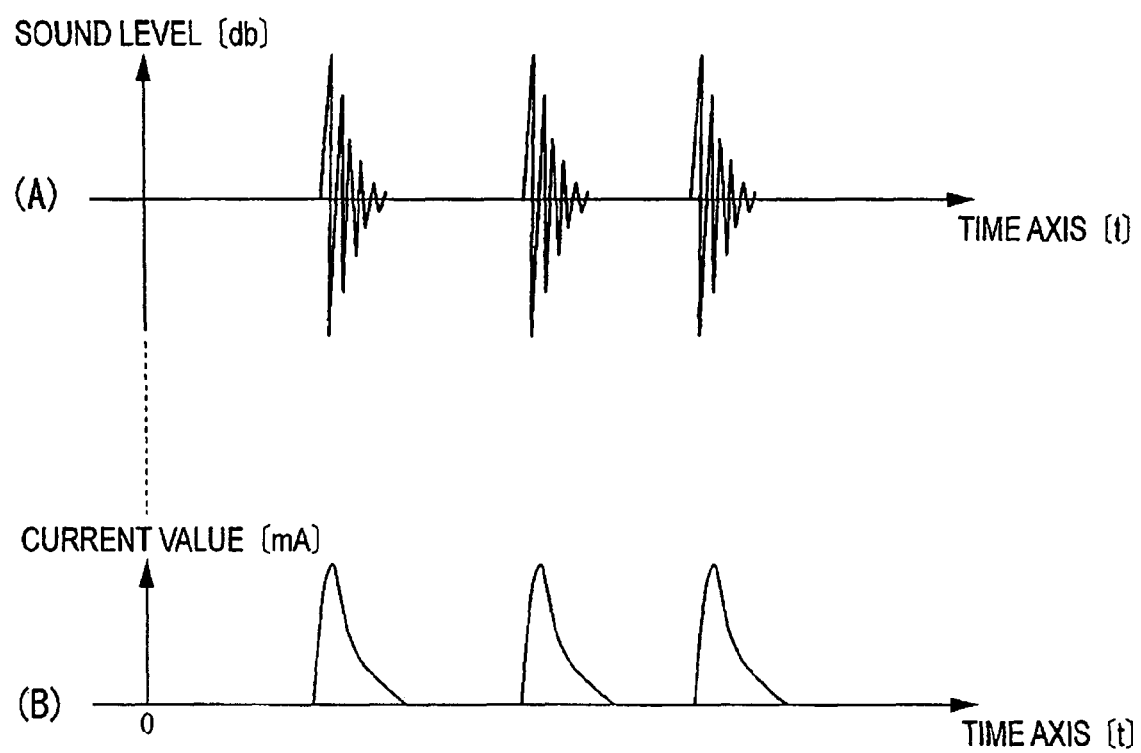

The property recognizing unit 412 recognizes the properties of the information (object to be processed) acquired by the information acquiring unit 420 such as sound volume, pitch, tempo and the like in music data and brightness, contrast, color and the like in image data and acquires the properties as property information. The properties of the information is recognized based on the information related to the information that is associated to the information and stored in a recording medium, and, alternatively, is recognized based on frequencies and the like during processing for reproducing the information by the processing unit 440 to acquire as the property information related to properties. For instance, the property recognizing unit 412 recognizes the sound volume as shown in FIGS. 20, 21 and 23(A) and recognizes the position of the recognized properties with reference to the position of the processing time for processing the information with regard to time axis (i.e. time information [elapsed time] from reproduction start position) on the basis of minutes, seconds and frame number as time information contained in the stored information. The recognized properties and the time information indicating the position thereof are associated to generate the property information. The property recognizing unit 412 acquires a component below a predetermined frequency by a low-pass filter as sound volume of low-pitched range below the predetermined frequency and recognizes a sound volume of more than a predetermined level, especially a peak value, as a property.

Further, the property recognizing unit 412 recognizes the elapsed time as time information from the reproduction-starting position at the position in which the low-pitched peak value as the property exists on the basis of minutes, second as time information and frame number contained in the stored information. Specifically, as shown in FIG. 20, when there are a plurality of peaks of sound volume of more than a predetermined value, identification number is sequentially set corresponding to the respective peaks. Further, elapsed time is sequentially recognized and associated with the peak to generate peak information of the property information. Further, the property recognizing unit 412 sets information relating to cue point based on the operation signal output by the input operation of the above-described cue button 347. In other words, as shown in FIG. 21, the reproducing position at which the reproduction is suspended and input operation is conducted is set as the cue point to generate cue-point information. The generated property information such as the peak information and the cue-point information is sequentially stored in the storing unit 360. The property recognizing unit 412 also outputs property information related to the property of the recognized information to the display controller 450.

The reproducing position is calculated in accordance with the following calculation and recognized. Initially, total frame number reproduced from reproduction start point to the current elapsed track time is calculated. Specifically, time information (minute Min, second Sec and frame number Fn) contained in the stored information is detected and the total frame number N is calculated in accordance with the following Formula 1.

$$N=(Min*60*75)+(Sec*75)+Fn \quad \text{(Formula 1)}$$

The calculated total frame number N is divided by a predetermined coefficient K and remainder A as reproducing position information is calculated. The coefficient K is a preset value determined for each of the discs (optical disc) as recording medium. For instance, it is set that K=135 considering CD's frame number 75 per one second and record player's rotation speed 33 RPM (0.55 rotation per second). Accordingly, the reproducing position on the substantially circular locus corresponding to an analog record player is recognized. Based on the reproducing position, the position of properties of the information in the property information such as the peak position and the cue-point is set. Incidentally, the cue-point information includes rotation number information relating to rotation number of the rotating body 600 from the reproduction starting position as well as the information relating to the reproducing position. When the reproducing position is advanced to some degree from the cue point so that the reproducing position is at a predetermined position after a couple of rotations, the reproducing position does not return to the cue-point position unless the rotation of the rotating body 600 is reversed by the number of advancement. Specifically, the value dividing the total frame number N with the coefficient K is the rotation number from the reproduction start position and the remainder is the position on the rotation locus.

When the information acquiring unit 420 recognizes a signal relating to the setting of a predetermined processing condition output by the operation signal recognizer 411, i.e. an instruction signal instructing to read predetermined information (object to be processed), the information acquiring unit 420 controllably drives the drive 330 and the storing unit 360 to read and acquire desired information stored in the recording medium. The information acquiring unit 420 acquires the record condition of the information stored in the recording medium such as reproduction time, the number of the stored information and the like. The stored information is acquired when, for instance, it is recognized that the recording medium is mounted on the drive 330 based on the signal output from the drive 330 or it is recognized that the to-be-processed object is stored in the storing unit 360 by input operation of the switch section 340, where the drive 330 or the storing unit 360 is controllably driven to read the stored play list and TOC (Table Of Contents) information. The information acquiring unit 420 controllably drive the communicator 350 based on an input operation on the switch section 340 and demand signal output by a terminal coupled to the information-processing device 300 and the like to receive the information that is requested to be retrieved from the server device and terminal device.

The operation controller 430 controls the rotating drive unit 930 and the vibrating motor 950 based on the condition recognized by the information recognizing unit 410, i.e condition of the input operation based on the operation signal and information properties, and notifies the condition recognized by the information recognizing unit 410 by moving the rotating body 600 as vibration of the rotating body 600 or a condition in which a load is applied during rotary movement in rotating operation for input operation. The operation controller 430 includes a restriction controller 431 and a vibration controller 432. The operation controller 430, the above-described attachment base 910, the restricting gear 920 and the rotary drive unit 930 or the vibrating motor 950 constitute the movement generating unit according to the present invention.

The restriction controller 431 controllably drive the rotary drive unit 930 based on the signal relating to the setting of the processing condition output by the operation signal recognizer 411. Specifically, when the operation signal recognizer 411 recognizes the rotary direction and the rotary speed of the rotating body 600 based on a detection signal output by the rotation-detecting sensor 814 of the rotary movement detector 810, the restriction controller 431 rotates the electric motor 931 of the rotary drive unit 930 in a manner that the resistance against rotation in a direction for the rotating body 600 is rotated is increased or decreased in accordance with the rotation speed. Specifically, when the rotating body 600 is slowly rotated, electric power is supplied to the electric motor 931 so that the restricting gear 920 engaged with the first gear 623 of the rotating body 600 is rotated at substantially the same rotary speed as the rotary speed of the first gear 623 in a corresponding rotary direction so as to apply little resistance feeling on a user during rotating operation. When the rotating body 600 is rotated fast, electric power is supplied to the electric motor 931 so that the restricting gear 920 is rotated at a rotary speed slower than the rotary speed of the first gear 623 or electric power is stopped so that the restricting gear 920 is not rotated. Alternatively, a predetermined electric power is supplied to the electric motor 931 so that rotation reverse to the rotary direction of the first gear 623 is generated to provide stronger resistance feeling.

The restriction controller 431 increases the electric power supplied to the electric motor 931 when the rotary direction based on the detection signal output by the rotation-detecting sensor 814 of the rotary movement detector 810 is in reverse direction (i.e. rotation reverse to a forward rotation rotating in rotary direction). In other words, when the rotary direction of the rotating body 600 is in a reverse direction, the restriction controller 431 applies on the rotating body 600 a greater drive force than that applied when the rotary direction is in forward direction. Accordingly, the rotary speeds of the first gear 623 of the rotating body 600 and the restricting gear 920 are differentiated, where the rotating output shaft of the electric motor 9931 is idly rotated by the difference of the rotary speeds without responding to the supplied electric power or the endless belt 932C may be idly rotated by the difference in the rotary speeds, so that the resistance is increased or decreased in accordance with the rotary speed of the rotation of the rotating body 600 by a rotary operation.

Further, the restriction controller 431 controllably drives the rotary drive unit 930 of the restricting unit 900 based on the properties of the information recognized by the property recognizing unit 412. Specifically, the restriction controller 431 rotates the electric motor 931 of the rotary drive unit 930 so that the load against the rotation of the rotating body 600 rotated by an input operation is varied at the position indicating the properties such as the peak position and the cue-point position.

Figure 22:
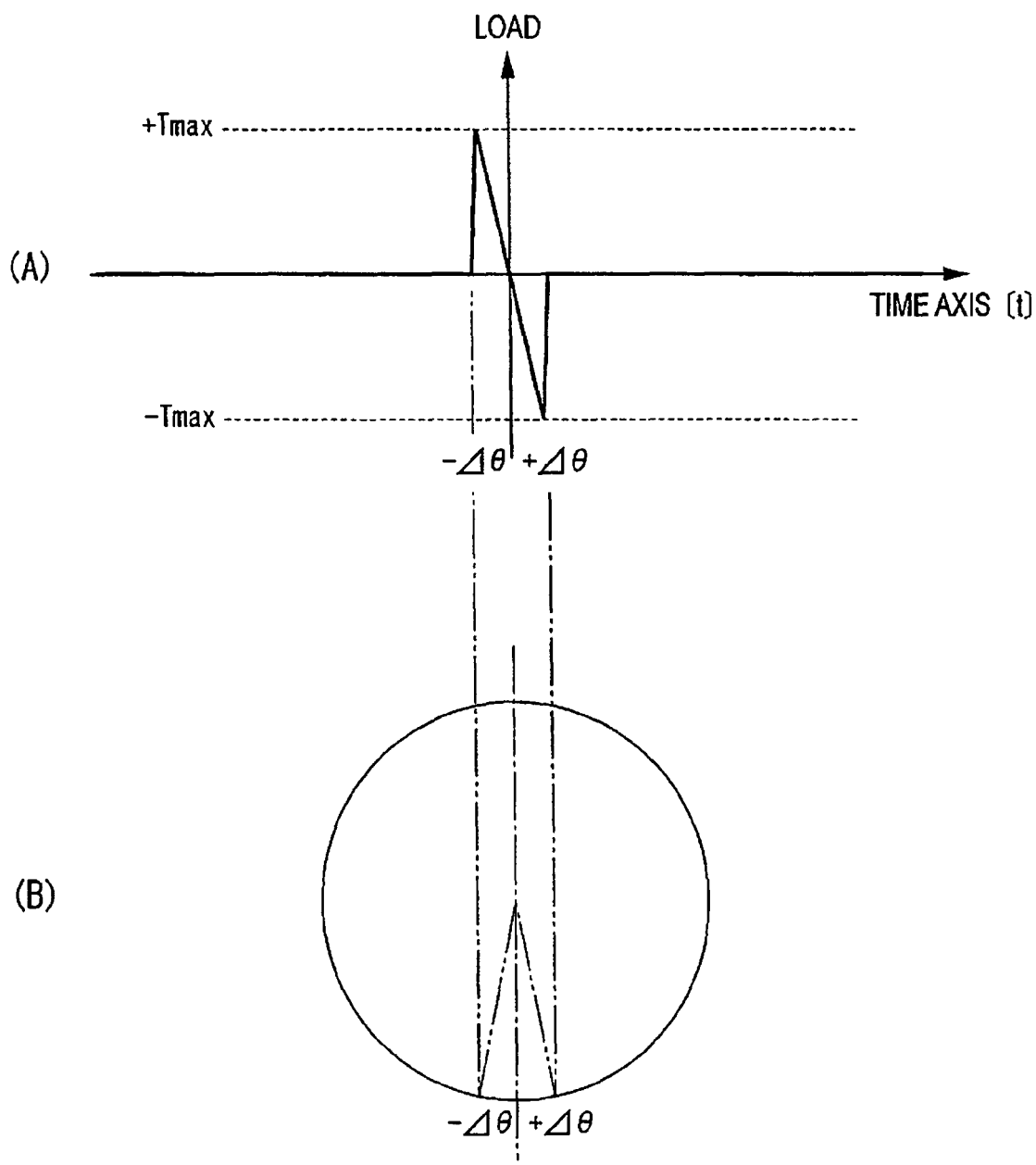

Specifically, as shown in FIG. 22, the drive force of the electric motor 931 is applied to the rotating body 600 so that the rotation resistance of the rotating body 600 is increased or decreased at a position around the position indicating the properties by a predetermined angle $\pm \Delta\theta$ in the rotary direction of the rotating body 600. As shown in FIG. 22(B), a restriction processing for applying resistance against the rotary operation is conducted from the position short of $-\Delta\theta$ from the property position to the property position. On the other hand, an assistance processing is conducted for assisting the rotary operation to reduce resistance against the rotary operation from the property position to the position ahead of $+\Delta\theta$ beyond the property position.

During the restricting processing and assisting processing, as shown in FIG. 22(A), great resistance is applied at the position short of $-\Delta\theta$ from the property position, no load is applied at the property position and the load is gradually reduced so that the rotary operation is assisted at the position ahead of $+\Delta\theta$ beyond the property position. In other words, electric power is applied to drive the electric motor 931 so that the restricting gear 920 is rotated at a predetermined rotary speed in a direction reverse to the rotation of the rotating body 600 at the $-\Delta\theta$ position to apply reverse drive force. Then, the supplied electric power is controlled so that the reverse rotary speed of the restricting gear 920 is gradually reduced to lower the reverse drive force until the rotating position of the rotating section 600 reaches the property position. When the rotating position of the rotating body 600 reaches to the property position, the restricting gear 920 is not rotated, i.e., the drive force is not applied. Then, the rotary speed of the restricting gear 920 is gradually increased to apply drive force until the rotary speeds of the first gear 623 and the restricting gear 920 are approximately the same in a direction corresponding to the rotation of the rotating body 600 when the rotary position of the rotating body 600 is at the property position, until the rotary position of the rotating body 600 passes the property position to the $+\Delta\theta$ position.

Since the drive force is applied to the rotating operation of the rotating body 600 so that resistance-application on the rotation is shifted to rotation-assistance within relatively short rotary angle of $\pm \Delta\theta$, so-called click-like operation feeling can be provided to a user at the property position. Incidentally, in order to control the electric power supplied to the electric motor 931, electric current or voltage for driving the electric motor 931 is controlled, for instance.

Figure 24:
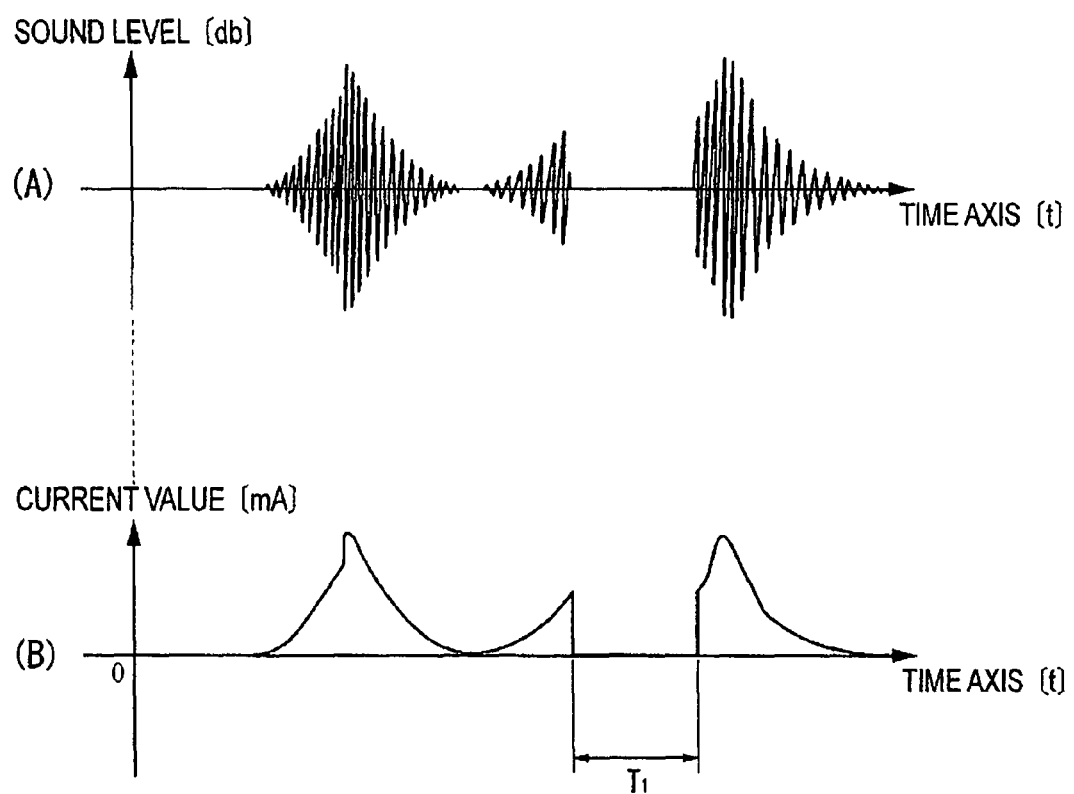
Figure 25:
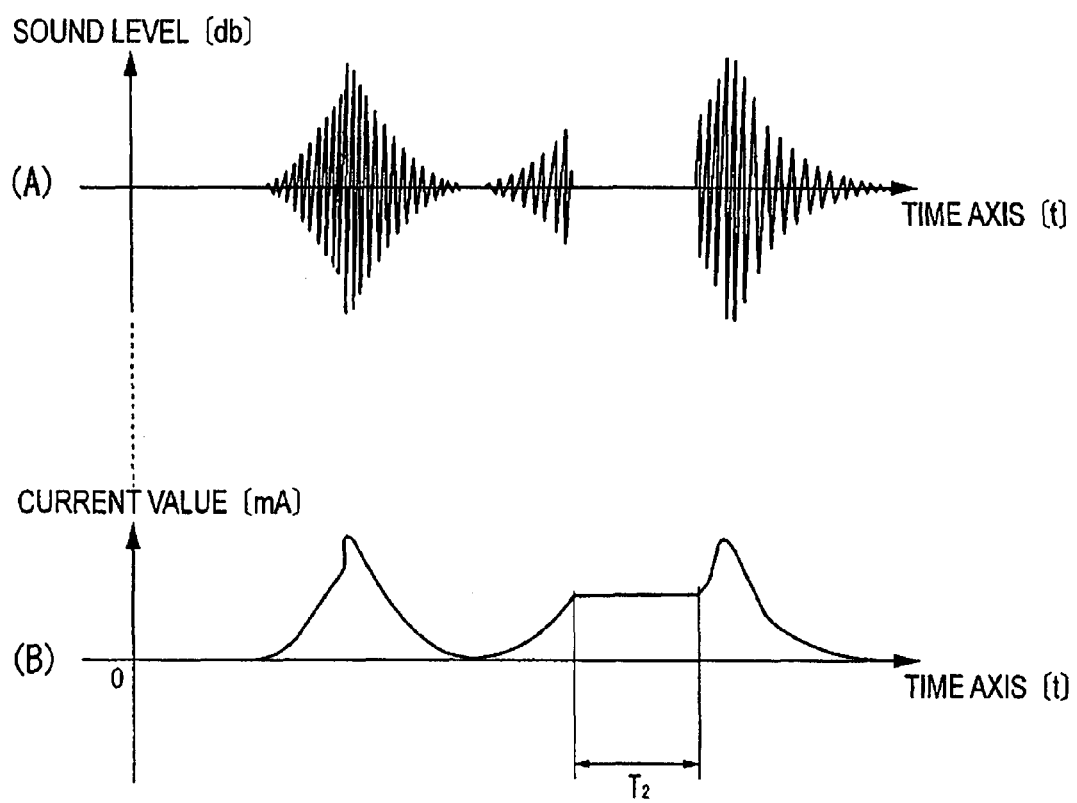

The vibration controller 432 conducts operation control (i.e. vibration) of the vibrating motor 950 based on the property of the information recognized by the property recognizing unit 412. As discussed above, the vibration controller 432 recognizes the property position of the information in the same manner as the recognition of the reproducing position based on the reproducing position recognized by calculation. The vibration controller 432 sets the current value of the supplied electric power in a manner corresponding to the property of the information at the processing position moving in accordance with the rotation of the rotating body 600 rotated by input operation so that, for instance, the magnitude of the vibration of the vibrating motor 950 shown in FIG. 23(B) is changed in response to the sound volume shown in FIG. 23(A). The vibration controller 432 sets the supplied electric power so that current value corresponding to the sound volume based on the property information at the reproducing position (processing position) is supplied to the vibrating motor 950 as shown in FIG. 24 or FIG. 25 by switching the independently provided switch section 340. Specifically, when the rotation is stopped and reproduction is suspended while pressing the rotating body 600, following two processing are switchably employed: during the suspension period T1 (FIG. 24(B)), since music data is not reproduced from the sound-producing section 210, supply of electric power is temporarily suspended to prevent vibration; during the suspension period T2 (FIG. 25(B)), electric current value corresponding to the magnitude of the sound volume at the reproducing position is supplied to cause vibration.

The processing unit 440 includes DSP (Digital Signal Processor) and the like, which processes the information to be processed obtained by the information acquiring unit 420 so that the information to be processed is output by the output unit 200 in accordance with the signal indicating the setting contents of the processing condition output by the operation signal recognizer 411. The processed information is output to the output unit 200 and is reproduced in accordance with the setting contents. Specifically, in addition to normal reproduction, the reproducing position, reproducing speed, tempo, pitch and the like of the information are set or changed in accordance with the setting contents in accordance with the rotation, pressing, contact operation on the rotating body 600 and input operation on the switch section 340.

The display controller 450 controls the first display unit 310 and the second display unit 320 to display the setting contents and information-processing condition in accordance with the signal relating to the setting contents of the processing condition output by the operation signal recognizer 411 and various information relating to the property of the information recognized by the property recognizing unit 412.

[Operation of Reproduction System]

Next, operation for processing the information by the above-described reproduction system 100 will be described below with reference to drawings. Incidentally, the explanation for the operation processing will be described with reference to an arrangement employing an optical disc as a recording medium in which music data is stored, however, the recording medium to be processed is not limited thereto.

Figure 26:
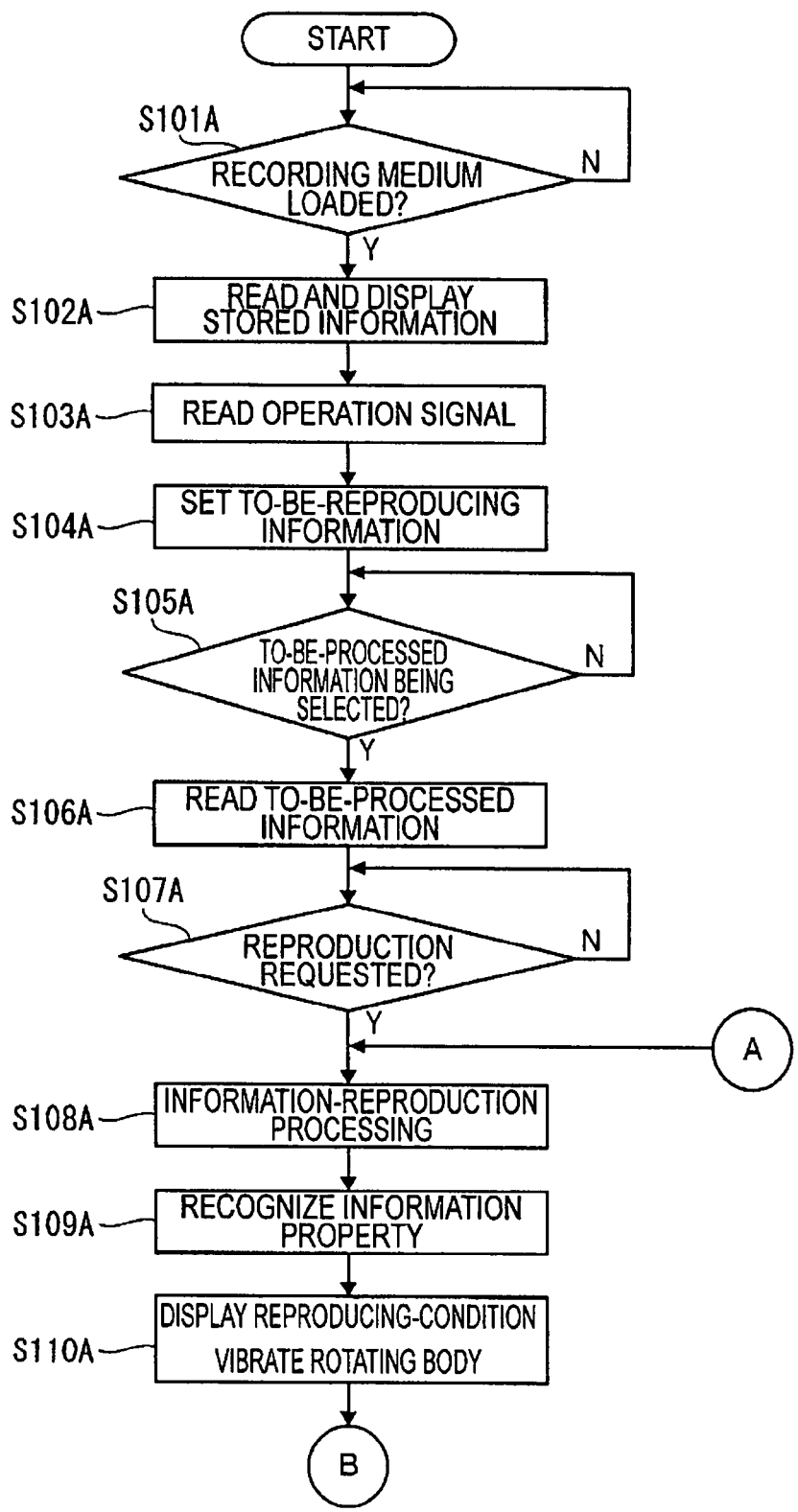
FIG. 26 is a flow chart showing how the reproduction processing is conducted in information-processing operation of the reproduction system according to the first embodiment.

Initially, as shown in FIG. 26, after electric power is supplied to the reproduction system 100 in advance and a recording medium such as an optical disc is inserted into the insertion slot 302 (Step S101A), the information-processing unit 400 controllably drives the drive 330. The recording medium is mounted at a predetermined position in the drive 330 within the body case 301 using an auto-loading mechanism and the like. When recognizing that the recording medium is mounted in the drive 330, the information-processing unit 400 controllably drives the drive 330 by the information acquiring unit 420 to read the record information stored in the recording medium. Further, the first display unit 310 is controlled by the display controller 450 to display the record information (Step S102A). Subsequently, the information-processing unit 400 recognizes with the operation signal recognizer 411 the operation signal output in accordance with input operation on the switch section 340 by a user (Step S103A), and sets the input processing condition (Step S104A). Incidentally, Steps S103A and S104A are conducted in subsequent processing and the processing condition is set based on the operation signal until the reproduction processing is completed.

Subsequently, selection for music data to be processed is in wait (Step S105A). Specifically, whether any music data is selected or not is judged. When selection of the music data to be processed is recognized, the drive 330 and the storing unit 360 are controlled by the information acquiring unit 420 to read the selected music data (Step S106A). The display controller 450 displays the information relating to music data such as reproduction time and track number of the selected music data, the registered number in the play list and the like. Subsequently, reproduction for the music data to be processed is in wait (Step S107A). Specifically, whether the play/stop button 348 is input-operated or not is judged and, when reproduction command by the input operation on the play-stop button 349 is recognized, reproduction processing for processing the music data in a manner capable of outputting by the output unit 200 is conducted by the processing unit 440 and the processed music data is sequentially output to the output unit to be output by the sound-producing section 210 as sound (Step S108A). During the reproduction processing in Step S108A, the property of the music data, i.e. tempo (rhythm), sound volume of low-pitched sound and the like are recognized by the property recognizing unit 412 of the information-processing unit 400 (Step S109A). Further, reproduction processing condition such as reproducing speed and the property recognized in Step S109A is displayed on the first display unit 310 and the second display unit 320, and the vibrating motor 950 is vibrated in accordance with the property (Step S110A).

In Step S110A, in order to display the reproduction processing condition on the second display unit 320, the reproducing position is recognized based on the reproducing position information relating to the remainder A calculated based on the above-described formula 1. Then, the reproducing position is displayed by lighting the light-emitting element located at the position in a clockwise direction corresponding to the calculated reproducing position information with reference to the twelve o'clock position of the reproducing-position display 321 of the second display unit 320 to indicate the reproducing position. Incidentally, since the calculated reproducing-position information shifts in accordance with increase in the frame number, the displayed reproducing position moves in a manner rotating along the substantially circular virtual locus. Further, in order to vibrate the vibrating motor 950, the electric current value of the electric power supplied to the vibrating motor 950 in accordance with the property on the reproducing position currently processed by the processor 440 such as the magnitude of the sound volume is set by the vibration controller 432 based on the reproducing position information and the property information to supply the electric power. Accordingly, even when the rotating body 600 is not in operation, the vibrating motor 950 is vibrated in accordance with the reproducing condition of the output unit 200 to vibrate the rotating body 600. Accordingly, when a user holds a hand over the rotating body 600, it can be recognized that the rotating body 600 is vibrated in accordance with the music data currently reproduced.

Further, when a user presses down the cue button 347 of the switch section 340, the operation signal is recognized by the operation signal recognizer 411 to output a signal for setting the information-processing condition. When recognizing the signal, the display controller 450 sets the reproducing position information at the time the signal is received as the cue-point information and lights the light-emitting elements positioned in clockwise direction corresponding to the cue-point information with reference to the twelve o'clock position on the cue-point position display 322 to display the cue-point. The calculated cue-point information is stored in the storing unit 360.

Figure 27:
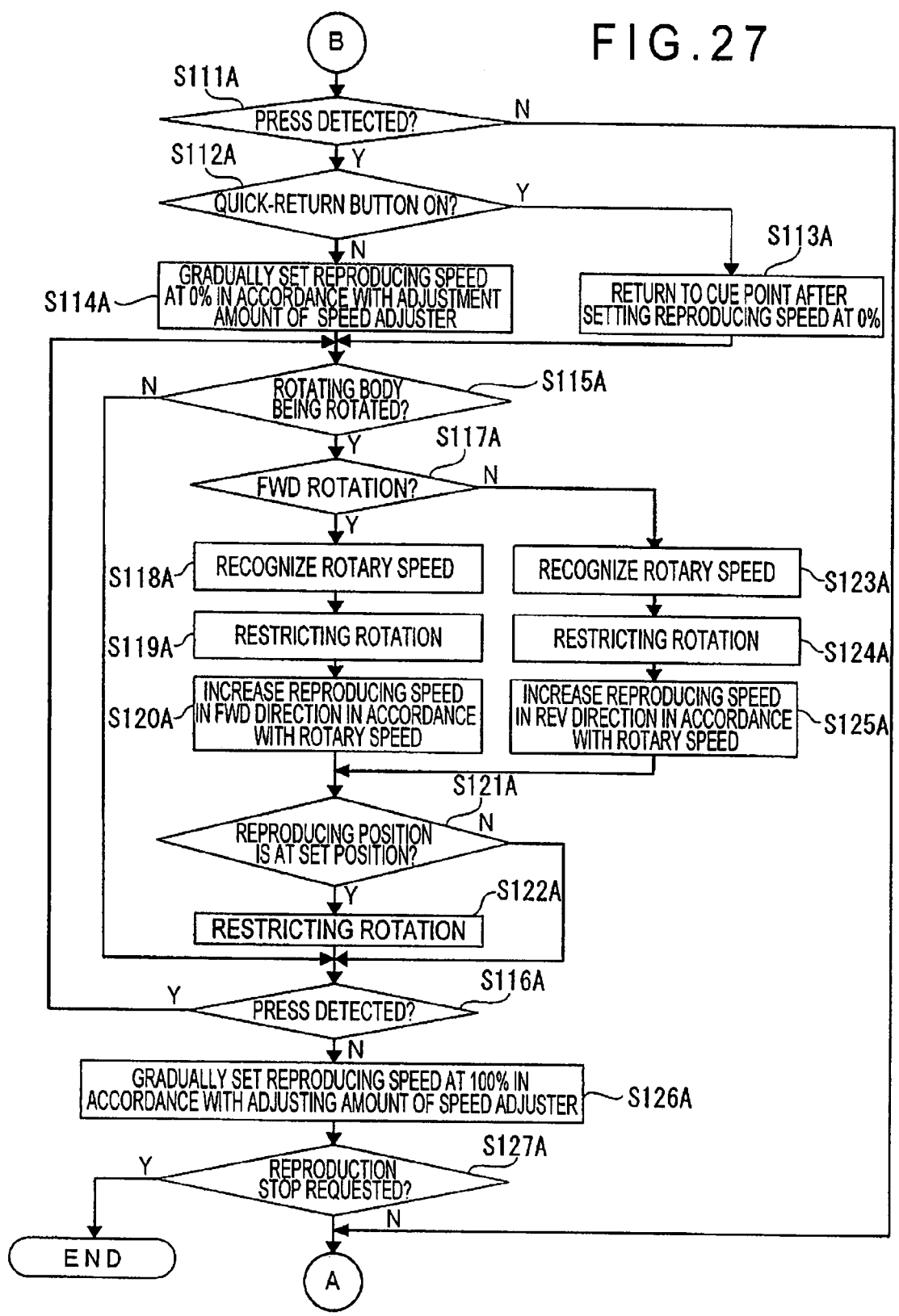
FIG. 27 is a flow chart showing how the reproduction processing is altered in the information-processing operation of the reproduction system according to the first embodiment.

While the processing unit 440 reproduces the music data, whether the rotating body 600 is pressed or not is judged as shown in FIG. 27 (Step S111A). Specifically, the operation signal recognizer 411 judges whether the operation signal is output by the press detector 820 or not. When the pressing operation is not recognized in Step S111A, the reproduction processing is continued back to Step S108A. On the other hand, when the pressing operation is recognized in Step S111A, the operation signal recognizer 411 judges whether the quick return button 345 is ON or not (Step S112A). Specifically, the operation signal recognizer 411 judges which one of change-instructions, i.e. change instructions for play/stop of the processing and change in reproducing position, is indicated by the change in reproducing condition indicated by the detection signal of the pressing operation on the rotating body 600. In Step S112A, judging that the quick return button 345 is pressed to be ON and the change instructions for the reproducing condition indicate the change in the reproducing position, the processing unit 440 sets the reproducing speed at 0% and moves the reproducing position at the cue-point (Step S113A). On the other hand, in Step S112A, when it is judged that the quick return button 345 is not ON (i.e. is OFF) and the change instructions indicate the change in play/stop of the processing in Step S112A, the processing unit 440 stops the reproduction processing by gradually decreasing the reproducing speed to 0% in accordance with the deceleration speed during the reproduction stopping process set by the speed adjuster 342B of the switch section 340 and recognized by the operation signal recognizer 411 (Step S114A).

After Steps S113A and 114A, the operation signal recognizer 411 judges whether the rotating body 600 is rotated or not based on the detection signal from the rotary movement detector 810 of the rotating body 600 (Step S115A). When it is judged that the rotating body 600 is not rotated in Step S115A, the operation signal recognizer 411 judges whether the pressing on the rotating body 600 continues or not (Step S116A). On the other hand, when it is judged that the rotating body 600 is rotated in Step S115A, the operation signal recognizer 411 judges whether the rotary direction is in positive (forward) rotation (FWD) or not based on detection signal (Step S117A). When forward rotation is judged in Step S117A, the rotary speed indicated by the detection signal from the rotary movement detector 810 is recognized (Step S118A). Further, the restriction controller 431 rotates the electric motor 931 in a predetermined direction at predetermined rotary speed based on the rotary direction and rotary speed recognized in Steps S117A and 118A to conduct restriction processing for reducing the rotary speed of the restricting gear 920 as the rotary speed of the rotating body 600 becomes higher to apply greater load on the rotary operation caused by greater speed difference (Step S119A). Subsequently, the processing unit 440 conducts reproduction processing so that the reproducing speed is increased in the forward direction in accordance with the rotary speed (Step S120A).

After Step S120A, whether the reproducing position reached to a predetermined property position at which the low-pitched sound volume is peaked or the cue-point position is set in accordance with the advancement of the reproducing position by the rotary operation on the rotating body 600 or not is judged (Step S121A). Specifically, whether the reproducing position moving in accordance with the rotary operation on the rotating body 600 reached to the ±Δθ position of the property position or not is judged. When it is judged in Step S121A that the reproducing position has not reached to the ±Δθ position of the property position, the processing advances to Step S116A to be continued. On the other hand, when it is judged that the reproducing position has reached to the ±Δθ position of the property position in Step S121A, the rotary operation on the rotating body 600 is restricted so that so-called click-like rotary operation feeling is caused (Step S122A). Specifically, when the reproducing position reached at the −Δθ position relative to the property position in accordance with the rotation of the rotating body 600, electric power is supplied to the electric motor 931 of the restricting unit 900 so that the restricting gear 920 is rotated at a predetermined rotary speed in a direction reverse to the direction corresponding to the rotation of the rotating body 600, thereby applying a drive force in reverse direction. Then, the electric motor 931 is controllably driven so that the reverse rotary speed of the restricting gear 920 is gradually reduced to lower the reverse drive force until the reproducing position reaches to the property position in accordance with the advancement of the rotation of the rotating body 600 on account of rotary operation. Further, when the reproducing position reaches to the property position in accordance with the advancement of the rotary operation on the rotating body 600, the rotation of the restricting gear 920 is stopped (i.e. not applying drive force) and the electric motor 931 is controllably driven so that the rotary speed of the restricting gear 920 is gradually increased to apply drive force until the reproducing position reaches to the +Δθ position after passing the property position in accordance with further rotary operation on the rotating body 600 and the rotary speed of the first gear 623 and the rotary speed of the restricting gear 920 becomes approximately the same. After Step S122A, the process advances to Step S116A.

On the other hand, when no-forward rotation, i.e. reverse rotation (REV), is judged in Step S117A, the rotary speed indicated by the detection signal from the rotary movement detector 810 is recognized (Step S123A). Further, the restriction controller 431 rotates the electric motor 931 in a predetermined direction at predetermined rotary speed based on the rotary direction and rotary speed recognized in Steps S117A and 123A to conduct restriction processing for reducing the rotary speed of the restricting gear 920 as the rotary speed of the rotating body 600 becomes higher to apply greater load on the rotary operation caused by greater speed difference (Step S124A). Incidentally, the restriction processing in Step S124A is stronger than the restriction processing in Step S119A. In other words, the restriction processing is conducted so that greater drive force than that applied when the rotary direction is forward direction is applied on the rotating body 600. Subsequently, the restricting unit 440 conducts reproduction processing so that the reproducing speed is increased in reverse direction corresponding to the rotary speed (Step S125A) and rotation restriction is conducted so that the click-like rotary operation feeling can be given at the predetermined property position in Step S121A.

When it is judged that the pressing on the rotating body 600 is continued in Step S116A, so-called scratch processing is continued back to Step S115A. On the other hand, when it is determined that the pressing condition is no longer conducted in Step S116A, the processing unit 440 conducts processing for setting the reproducing speed as 100% in accordance with the reproduction-starting speed of the speed adjuster 342B set by the operation signal recognizer 411 (Step S126A).

Subsequently, the information processing unit 400 judges whether stop instruction for reproduction processing, i.e. reproduction stop in accordance with the input operation on the play/stop button 348 is recognized or not by the operation signal recognizer 411 (Step S127A). When the reproduction stop is not recognized in Step S127A, the reproduction processing is continued back to Step S108A. On the other hand, when it is judged that the reproduction stop is recognized in Step S127A, the reproduction is stopped to terminate the reproduction processing.

[Effect of Reproduction System]

In the switch device 500 of the reproduction system 100 according to the above-described first embodiment, when the rotating body 600 is rotated, pressed or touched in accordance with the input operation by a user, the detection signal (operation signal) in accordance with the input operation is output to the information processing unit 400 and information such as music data and video data is processed at a predetermined processing condition in accordance with the input operation by the information processing unit 400. Then, based on the information property such as the sound volume and sound volume peak in the low-pitched sound output by the output unit 200 or the setting position such as the cue point that is set by the input operation on the switch section 340 and at which the reproducing position is changed by the processing unit 440 in accordance with the pressing operation on the rotating body 600, the location of the reproducing position that is moved in accordance with the condition of the input operation on the rotating body 600 is recognized. And the rotating body 600 is operated in accordance with output condition corresponding to the condition of the input operation based on the property of the information to operate the rotating body 600 by conducting click-like movement restriction, vibration and the like.

For instance, as described above, the rotating body 600 of the switch device 500 is rotated by the input operation by a user and the rotary movement detector 810 detects the input operating condition of the rotating body 600 to output a detection signal, thereby conducting restricting processing for restricting the rotation of the rotating body 600 by the restricting unit 900. According to the above arrangement, different resistance feeling in, for instance, slow rotary operation and fast operation on the rotating body 600 can be obtained and operational feeling just like rotating a turntable of a record player can be obtained. Accordingly, playing style for reproducing the music data stored in various recording media with the same operational feeling as that of conventional record player can be obtained, thereby improving information processing by an input operation.

Further, as discussed above, the rotating body 600 is operated based on the information property such as sound volume peak of low-pitched sound and the like that is processed based on the detection signal output in accordance with rotation, pressing and contact on the rotating body 600 in accordance with the input operation by a user to be output by the output unit 200, which results in click-like movement restriction. According to the above arrangement, when DJ playing is performed in a relatively large sound volume and under special illumination space to reproduce music data and video data, the position of the property such as the rhythm and low-pitched sound peak and the position at which the property changes such as image-switching position can be sensed by the movement restriction without relying on hearing sense and visual sense. Accordingly, effective reproduction processing by efficiently recognizing the property can be conducted in DJ playing where specific property reproduction, strict reproduction timing and property switching timing and the like for music data, image data and the like are required, thereby obtaining improved information-processing. Further, the information-processing device 300 is configured such that the information property can be recognized by touch and processing condition can be set and changed in accordance with input operation. Accordingly, the condition for information-processing can be set without visually checking the switch device 500 and the information-processing device 300 can be operated as an electronic musical instrument, thereby easily improving general versatility.

Further, as described above, when the reproducing position of the processing of the processing unit 440 is located in accordance with the operation signal by the rotary input operation on the rotating body 600 at the cue point set by the input operation on the switch section 340 for changing the reproducing position by the processing unit 440 in accordance with the pressing operation on the rotating body 600, the rotating body 600 is operated for conducting the click-like movement restriction and the like. According to the above arrangement, irrespective of the environment for outputting the processed information, the setting position such as the cue-point that is set by the input operation on the switch section 340 can be recognized by the movement restriction without relying on hearing sense and visual sense. Accordingly, since the setting position can be recognized by touch, effective reproduction processing by efficiently recognizing set position can be conducted in DJ playing where reproduction at a specific set position, strict reproduction timing and property switching timing and the like are required, thereby obtaining improved information-processing. Accordingly, since the set position can be recognized by touch, the condition for information-processing can be set without visually checking the switch device 500 and the information-processing device 300 can be operated as an electronic musical instrument, thereby easily improving general versatility.

Further, as described above, the rotating body 600 is vibrated in accordance with information property processed by the information-processing unit 400 based on the detection signal output in accordance with the rotation, press and touch input operation on the rotating body 600 by the input operation by a user and output by the output unit 200, such as sound volume peak of low-pitched sound. According to the above arrangement, irrespective of the environment in which the processed information is output, the position of the property such as the rhythm of music data and the peak in the low-pitched sound and the position at which the property is changed such as image-switching position can be sensed by the vibration without relying on hearing sense and visual sense. Accordingly, since the information-processing condition can be easily recognized, effective reproduction processing by recognizing efficient property recognition can be conducted in DJ playing where specific property reproduction and reproduction timing for music data and video data and property switching timing and the like are strictly required, thereby obtaining improved information-processing by input operation.

Further, as described above, the rotating body 600 is vibrated in accordance with information property and operation signal processed by the information-processing unit 400 based on the detection signal output in accordance with the rotation, press and touch input operation on the rotating body 600 by the input operation by a user and output by the output unit 200, such as sound volume of low-pitched sound. According to the above arrangement, since the rotating body 600 is vibrated in accordance with the output condition irrespective of the environment in which the processed information is output, the information-output condition can be sensed without relying on hearing sense and visual sense. Accordingly, since the information-processing condition can be easily recognized, effective reproduction processing by recognizing efficient property recognition can be conducted in DJ playing where specific property reproduction and reproduction timing for music data and video data, property switching timing and the like are strictly required, thereby obtaining improved information-processing by input operation.

A turntable of a record player for reproducing a phonorecord is simulated, which is applied for an arrangement for restricting the rotary movement of the rotating body 600 in which the reproducing condition is changed in accordance with the rotating condition of the rotary operation. The switch device 500 is used for DJ playing for a disc jockey in which the reproducing condition is changed in accordance with the input operation in music and video reproduction. Since input operation feeling is of an important issue for such a switch device, more appropriate and improved playing style can be achieved. Further, the information-processing unit 400 for conducting information-processing and the switch device 500 for setting the processing condition of the information-processing are integrally provided. Accordingly, no connection is required for information-processing and information-processing can be immediately performed. Further, the rotating body 600 can be designed in a shape simulating a turntable of a record player and the designability can be improved.

Further, the information-processing unit 400 of the information-processing device 300 includes: the information recognizing unit 410 including the operation signal recognizer 411 for recognizing condition of the input operation and the property recognizing unit 412 for recognizing the information property, the information recognizing unit recognizing the acquired information property and the condition of the input operation; the information acquiring unit 420 for acquiring the information; and the processor 440 for processing the information in response to the operation signal output by the switch device 500 and the switch section 340 in a manner capable of predetermined output by the output unit 200. Accordingly, the information can be processed based on the operation signal for setting the processing condition of the information and the information property and setting recognition to provide easy sensing of the information contents and information processing condition can be easily attained with a simple arrangement. The information recognizing unit 410 is thus arranged.

Further, the information-processing unit 400 includes the restriction controller 431 for controlling the restricting unit 900 for restricting the movement in response to the information property and the setting and the vibration controller 432 for controlling the vibrating motor 950 for vibrating the rotating body 600 in response to the information property and the setting. Accordingly, an arrangement for providing the sense in response to information processing and information property can be achieved with a single arrangement of circuit board and CPU with the use of program, thereby easily simplifying the configuration.

Further, the information-processing unit 400 achieves various functions as program. Accordingly, by incorporating the program on personal computer, CPU and the like, or by using a recording medium storing the program, the above arrangement for processing can be easily attained, thereby easily improving productivity and enlarging usage.

The setting point for the information property recognized by the property recognizing unit 412 and the cue point is recognized corresponding to the position (reproducing position) on a time axis of the reproduction time for processing the information by the processing unit 440 and outputting the information by the output unit 200. When the property position of the property-changing position is located in the movement area of the reproducing position (processing condition for the processing by the processing unit 440) according to the rotary operation on the rotating body 600, the click-like movement restriction is conducted each time the reproducing position passes the property position of the property-changing position. Accordingly, the property position and the setting position are recognized based on the recognition of the reproducing position based on the reproduction time, the touch can be securely provided at the property position and the setting position with a simple and easy calculation, thereby easily providing the touch corresponding to the property of the information to be processed.

In order to provide vibration sensing for the recognized property position corresponding to output condition (i.e. reproducing position), electric current of current value corresponding to the information property such as the magnitude of the peak of the low-pitched sound and sound volume is flown to the vibrating motor 950 disposed on the rotating body 600 to vibrate the rotating body 600 in accordance with the magnitude of the property. Accordingly, an arrangement for providing a sense corresponding to the property can be easily provided with a simple structure. Further, a vibrating motor used for small electrical equipment such as cellular phone can be used, so that size-reduction can be easily achieved.

In order to output the operation signal corresponding to the rotating, pressing or touching operation on the rotating body 600 of the switch device 500, the switch device 500 is provided with the rotary movement detector 810 and the press detector 820. Accordingly, in the same manner as the operation for a record player during the above-described DJ playing, the switch device 500 that is capable of changing the reproducing position and temporarily suspending the reproducing position can be easily provided. Further, in order to move a pickup to a predetermined position during DJ playing, the cue point can be set and the reproducing position can be moved to the cue point by pressing operation. Accordingly, usability can be further enhanced, and the movement toward the cue point can be more easily and speedily conducted as compared with a conventional DJ playing by digital processing of music data and video data.

The rotary movement detector 810 includes the rotation-detecting sensor 814 including the above-described optical sensor 814A to detect the rotary operation. Accordingly, the rotary operation can be easily detected with a simple structure. Especially, since the rotation of the rotation-detecting plate 813 integrally provided on the detecting gear 812 engaged with the first gear 623, light resistance that is not felt heavy during the rotary operation can be felt to provide improved operation feeling, and an input operation that rapidly changes during DJ playing such as reverse rotation can be securely detected.

Further, the press detector 820 employs the tape switch 821. Accordingly, the pressing operation can be easily detected with a simple structure. Further, the tape switch is circumferentially disposed around the periphery of the rotating body 600. Accordingly, the pressing operation can be sensed irrespective of the position at which the rotating body 600 is pressed, and a little pressing sense in addition to mere touch can be obtained, thereby providing enhanced operational feeling. When both of the pressing operation and rotary operation are sensed to set the information processing in diverse conditions, an information-processing corresponding only to rotary operation can be performed and various processing can be set by different input operations and the combination thereof, thereby improving versatility.

As the movement restriction for generating a touch corresponding to the input operation and corresponding to the information property, the load applied on the movement of the rotating body 600, i.e. the load during the rotary operation, to which the input operation is conducted, is controlled to be changed. Accordingly, the sense corresponding to the property such as increase and decrease in the resistance during rotation can be easily obtained with a simple arrangement.

When the load changes, the restriction processing for restricting the rotary movement of the rotating body 600 and assisting processing for assisting the rotary movement are selectively conducted to change the load. Accordingly, as the touch corresponding to the input operation and the information property, different sense can be provided in accordance with different processing such as the movement restriction and movement assistance, thereby easily improving versatility and usability. Further, as described above, so-called click-like touch can be easily provided by the control of short-time movement restriction and subsequent movement assistance. In other words, without providing physical arrangement such as to-be-overridden rib, the same click-like touch as the rib can be provided, and the click-like touch is provided by control, the same click-like touch as physical structure can be provided at any desired position.

The resistance for the rotary movement is increased as the restriction processing. Accordingly, the same operational feeling corresponding to the input operation and the touch corresponding to property or setting as a record player can be effectively provided, and an arrangement for efficiently providing the touch can be easily constructed.

The assistance for the rotary movement is decreased to apply increasing load during the assisting processing. Accordingly, the touch is transmitted while assisting the input operation, thereby providing facilitated input operation.

In order to change the load, the rotation of the restricting gear 920 engaged with the first gear 623 is controlled by the rotary drive 930. Accordingly, the load during the rotary input operation can be easily changed with a simple structure and, since the first gear 623 for detecting the rotary condition is used, the arrangement can be further simplified.

Further, the information property that provides the touch, condition of the rotary input operation and the information-processing condition are displayed. Specifically, the properties such as sound volume, peak condition of low-pitched sound volume, tempo and the like are displayed on the first display unit 310; the rotary condition of the input operation such as the setting position, the reproducing position and the like are displayed on the second display unit 320; and processing condition such as the reproduction time, speed and the like are displayed on the first display unit 310. Accordingly, visual check can be supplied to a user in addition to the touch sense, so that the processing condition for reproducing the information can be easily set, where the rotating, pressing and touching operation of the rotating body 600 and the input operation on the switch section 340 can be easily conducted.

The reproduction system 100 is arranged by connecting the output unit 200 with the information-processing device 300 to output the processed information. Accordingly, various devices can be selectively used as the output unit 200, so that the reproduction can be performed in accordance with the environment in which the information is output including outdoors, indoors, large and small space, thereby improving versatility.

Effect of First Embodiment in the first embodiment, the operation signal corresponding to the input operation on the rotating body 600 by the user is output to the information-processing unit 400, where information such as music data and video data is processed in a predetermined process condition in accordance with condition of the input operation by the information-processing unit 400. Then, based on the property of the information such as the sound volume and the low-pitched sound volume peak output by the output unit 200 and cue-point setting position at which the reproducing position is changed by the processing unit 440 in accordance with the pressing operation on the rotating body 600, the location of the reproducing position that is moved in accordance with the input operation on the rotating body 600 is recognized, or, the rotating body is operated (e.g. click-like restriction movement and vibration) in accordance with the output condition corresponding to the condition of the input operation based on the information property. Accordingly, the touch feeling such as movement restriction and vibration can be sensed in accordance with the input operation and information property, thereby achieving efficient information processing by input operation.

Further, the switch device 500 that is operated in accordance with property is used for the information-processing device 300. Accordingly, effective information processing by recognizing efficient property recognition can be conducted in DJ playing where specific property reproduction, strict reproduction timing and property switching timing and the like for music data, image data and the like are required, thereby obtaining improved information-processing.

Second Embodiment

An arrangement of a reproduction system (reproducing device) in accordance with second embodiment of the present invention will be described below. Incidentally, the switch device of the invention may be used in any switch arrangement other than those used for a reproduction system and those for processing any information.

The basic arrangement (reproduction system 100, output unit 200 and information-processing device 300) of the present embodiment is the same as the above-described first embodiment (see FIGS. 2-19). Accordingly, repeated description thereof will be omitted.

On the other hand, though the information-processing device 300 of the present embodiment includes the switch device 500 and the information-processing unit 400 similar to the above-described first embodiment, a part of the respective components differs from those in the first embodiment. Accordingly, the switch device 500 and the information-processing unit 400 according to the present embodiment will be described below.

(Arrangement of Switch Device)

Figure 28:
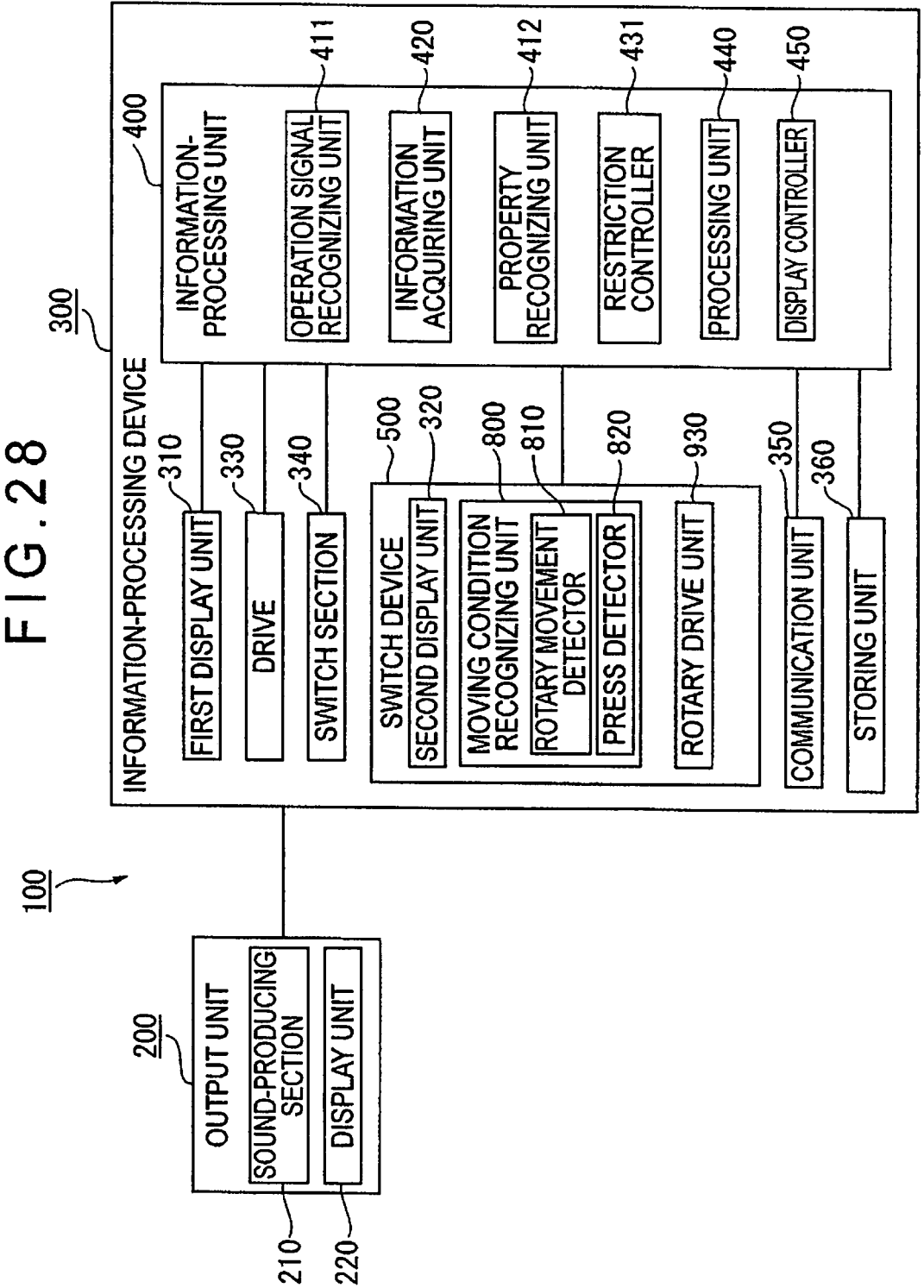
FIG. 28 is a block diagram showing a reproduction system according to second and third embodiments of a reproduction device of the invention.

In FIG. 28, the switch device 500 includes a rotating body 600 (operation unit constituting operating device), a support base 700, a moving condition recognizing unit 800 and a rotary drive 930 (restricting unit 900: see FIGS. 13 and 14) constituting a movement generating unit. In other words, the vibrating motor 950 is omitted from the switch device 500 of the first embodiment.

(Information-Processing Unit)

In FIG. 28, the information-processing unit 400 includes a CPU (Central Processing Unit) and various I/O ports (not shown) including a display control port to which the first display unit 310 and the second display unit 320 are connected, a drive control port to which the drive 330 is connected, an input port to which the switch section 340 and the moving condition recognizing unit 800 is coupled, a drive control port to which the rotary movement detector 930 is coupled, a communication port to which the communicator 350 is connected, a storage port to which the storing unit 360 is connected and the like. The information-processing unit 400 includes an operation signal recognizer 411, an information-acquiring unit 420, an operation controller 412, a restriction controller 431, a processing unit 440, a display controller 450 and the like, all of which are installed as various programs.

The operation signal recognizer 411 recognizes various operation signal output by the switch section 340 and detection signal output by the rotary movement detector 810 and the press detector 820 of the moving condition recognizing unit 800, recognizes change instructions of the processing condition input by a user to set processing condition of the information. The signal related to the setting of the processing condition is output to the information acquiring unit 420, the restriction controller 431, the processing unit 440 and the display controller 450. Incidentally, when the detection signal related to pressing force from the press detector 820 is recognized, the processing condition is set in a manner corresponding to the magnitude of the pressing force, where, for instance, the reproducing speed is lowered in accordance with the magnitude of the pressing force. When the pressing force is gradually reduced from the temporal suspension of the reproduction by pressing the rotating body 600, the processing condition is set so that the time required for returning to ordinary reproducing speed is shortened in correspondence to the magnitude of the pressing force (faster reduction of the pressing force results in shorter time as compared to slower reduction of the pressing force).

When the information acquiring unit 420 recognizes a signal relating to the setting of a predetermined processing condition output by the operation signal recognizer 411, i.e. an instruction signal instructing to read predetermined information (object to be processed), the information acquiring unit 420 controllably drives the drive 330 and the storing unit 360 to read and acquire desired information stored in the recording medium. The information acquiring unit 420 acquires the record condition of the information stored in the recording medium such as reproduction time, the number of the stored information and the like. The stored information is acquired when, for instance, it is recognized that the recording medium is mounted on the drive 330 based on the signal output from the drive 330 or it is recognized that the to-be-processed object is stored in the storing unit 360 by input operation of the switch section 340, where the drive 330 or the storing unit 360 is controllably driven to read the stored play list and TOC (Table Of Contents) information. The information acquiring unit 420 controllably drive the communicator 350 based on an input operation on the switch section 340 and demand signal output by a terminal coupled to the information-processing device 300 and the like to receive the information that is requested to retrieve from the server device and terminal device.

The property recognizing unit 412 recognizes the properties of the information (object to be processed) acquired by the information acquiring unit 420 such as sound volume, pitch, tempo and the like in music data and brightness, contrast, color and the like in image data and acquires the properties as property information. The properties of the information is recognized based on the information related to the information that is associated to the information and stored in a recording medium, and, alternatively, is recognized based on frequencies and the like during processing for reproducing the information by the processing unit 440 to acquire as the property information related to properties. For instance, the property recognizing unit 412 acquires a component below a predetermined frequency by a low-pass filter as sound volume of low-pitched range below the predetermined frequency and recognizes a sound volume of more than a predetermined level, especially a peak value, as a property. Further, the property recognizing unit 412 recognizes the elapsed time as time information from the reproduction-starting position at the position in which the low-pitched peak value as the property exists on the basis of minutes, second as time information and frame number contained in the stored information. Specifically, as shown in FIG. 20, when there are a plurality of peaks of sound volume of more than a predetermined value, identification number is sequentially set corresponding to the respective peaks. Further, elapsed time is sequentially recognized and associated with the peak to generate peak information of the property information. The calculated peak information is sequentially stored in the storing unit 360. The property recognizing unit 412 also outputs property information related to the property of the recognized information to the display controller 450.

The restriction controller 431 controllably drives the rotary drive unit 930 of the restricting unit 900 based on the properties of the information recognized by the property recognizing unit 412. Initially, the restriction controller 431 calculates the total frame number reproduced from reproduction start point to the current elapsed track time.

The process for calculating the total frame number is the same as those described in the formula 1, FIG. 22 and the description thereof, of which repeated explanation will be omitted.

The processing unit 440 includes DSP (Digital Signal Processor) and the like, which processes the information to be processed obtained by the information acquiring unit 420 so that the information to be processed is output by the output unit 200 in accordance with the signal indicating the setting of the processing condition output by the operation signal recognizer 411. The processed information is output to the output unit 200 and is reproduced in accordance with the setting contents. Specifically, in addition to normal reproduction, the reproducing position, reproducing speed, tempo, pitch and the like of the information is set or changed in accordance with the setting contents in accordance with the rotation, pressing, contact operation on the rotating body 600 and input operation on the switch section 340.

The display controller 450 controls the first display unit 310 and the second display unit 320 to display the setting contents and information-processing condition in accordance with the signal relating to the setting contents of the processing condition output by the operation signal recognizer 411 and various information relating to the property of the information recognized by the property recognizing unit 412.

[Operation of Reproduction System]

Figure 29:
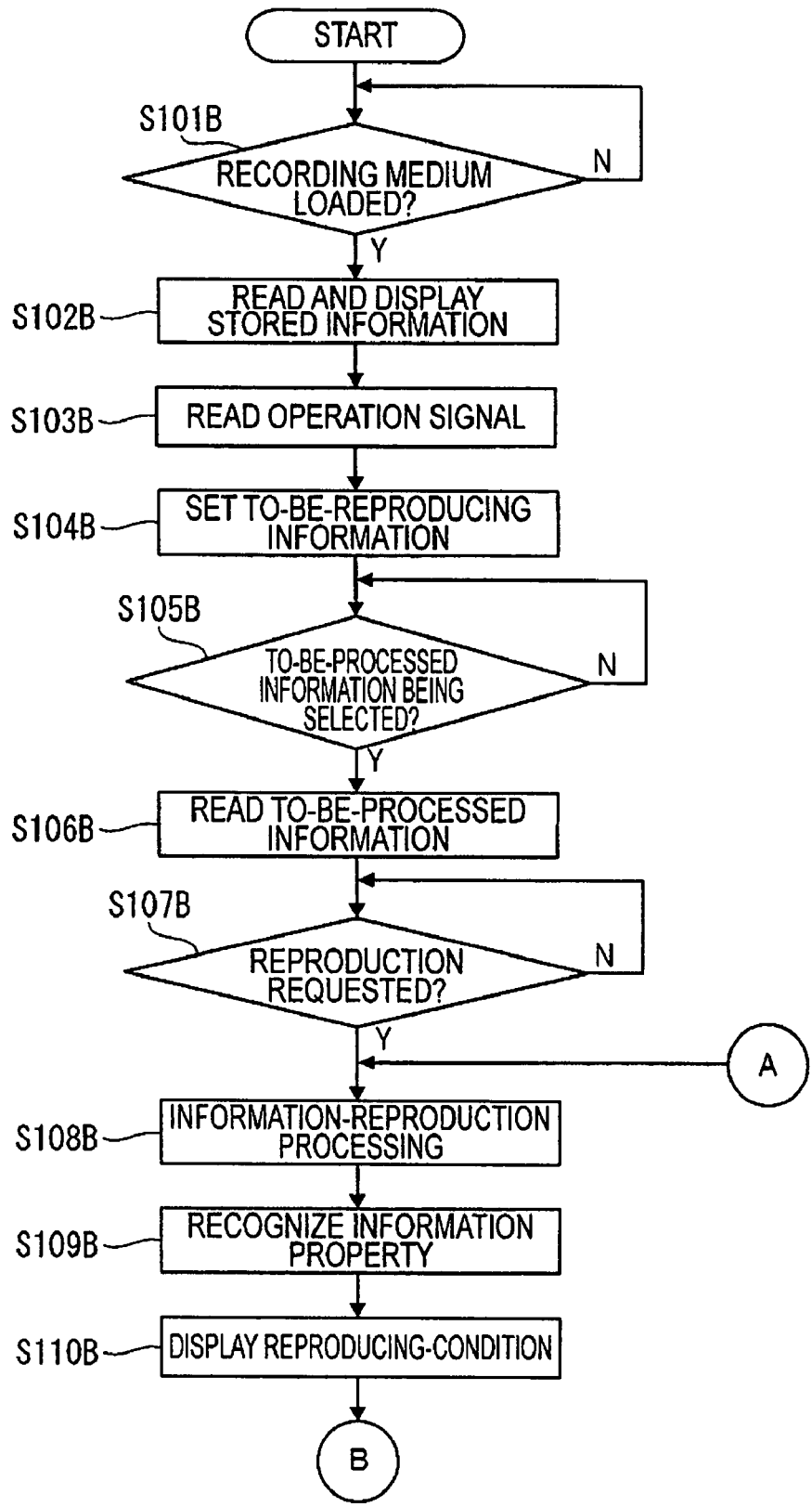
FIG. 29 is a flow chart showing how the reproduction processing is conducted in the information-processing operation of the reproduction system according to the second and the third embodiments.
Figure 30:
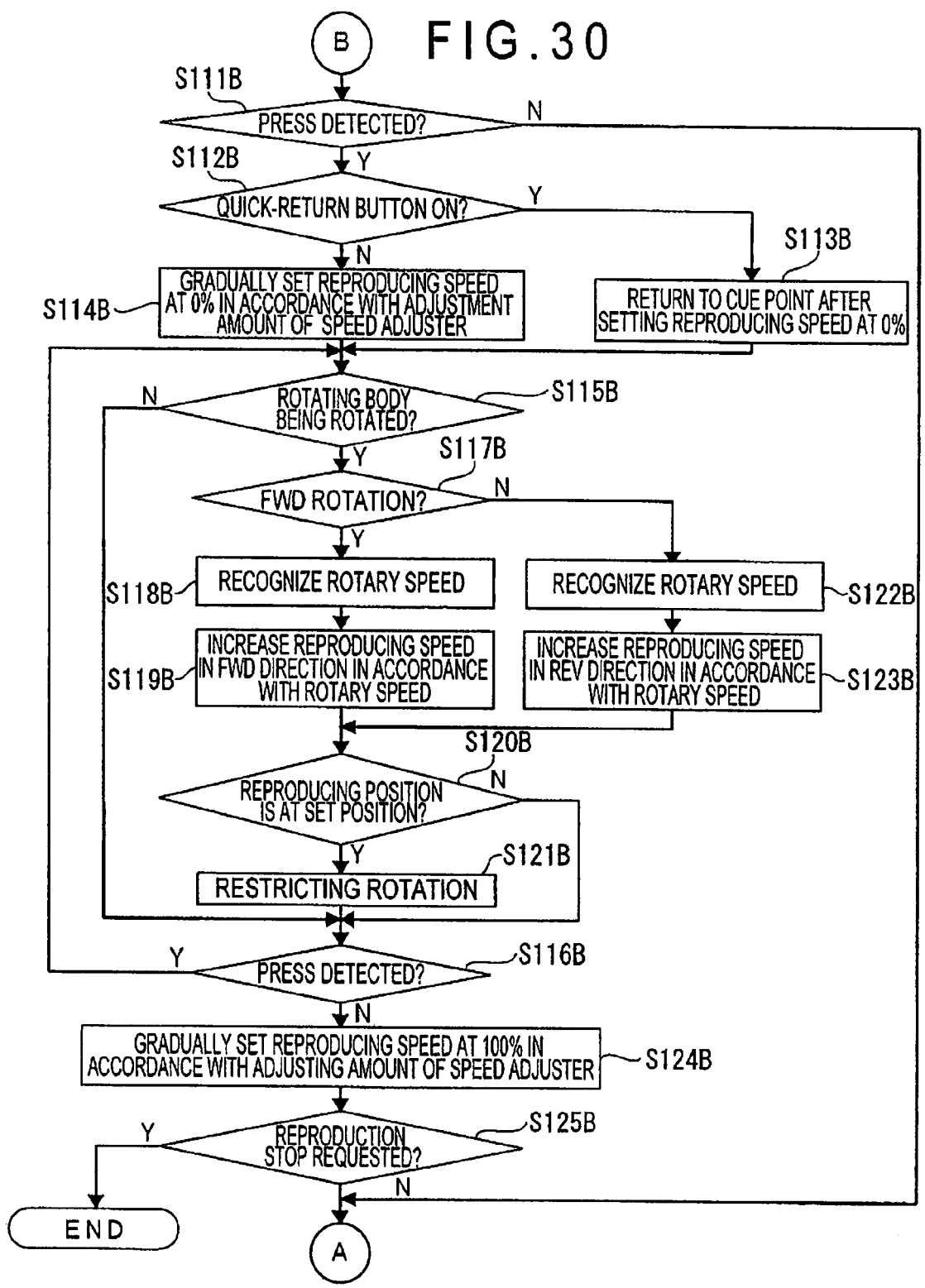
FIG. 30 is a flow chart showing how the reproduction processing is altered in the information-processing operation of the reproduction system according to the second embodiment.

Next, operation for processing the information by the reproduction system 100 according to the second embodiment will be described below with reference to drawings. Incidentally, the explanation for the operation processing will be described with reference to an arrangement employing an optical disc as a recording medium in which music data is stored, however, the recording medium to be processed is not limited thereto. FIG. 29 is a flow chart showing how the reproduction processing is conducted in information-processing operation of the reproduction system. FIG. 30 is a flow chart showing how the reproduction processing is changed in information-processing operation of the reproduction system.

Initially, as shown in FIG. 29, after electric power is supplied to the reproduction system 100 in advance and a recording medium such as an optical disc is inserted into the insertion slot 302 (Step S101B), the information-processing unit 400 controllably drives the drive 330. The recording medium is mounted at a predetermined position in the drive 330 within the body case 301 using an auto-loading mechanism and the like. When recognizing that the recording medium is mounted in the drive 330, the information-processing unit 400 controllably drives the drive 330 by the information acquiring unit 420 to read the record information stored in the recording medium. Further, the first display unit 310 is controlled by the display controller 450 to display the record information (Step S102B). Subsequently, the information-processing unit 400 recognizes with the operation signal recognizer 411 the operation signal output in accordance with input operation on the switch section 340 by a user (Step S103B), and sets the input processing condition (Step S104B). Incidentally, Steps S103B and S104B are conducted in subsequent processing and the processing condition is set based on the operation signal until the reproduction processing is completed.

Subsequently, selection for music data to be processed is in wait (Step S104B). Specifically, whether any music data is selected or not is judged. When selection of the music data to be processed is recognized, the drive 330 and the storing unit 360 are controlled by the information acquiring unit 420 to read the selected music data (Step S106B). The display controller 450 displays the information relating to music data such as reproduction time and track number of the selected music data, the registered number in the play list and the like. Subsequently, reproduction for the music data to be processed is in wait (Step S107B). Specifically, whether the play/stop button 348 is input-operated or not is judged and, when reproduction command by the input operation on the play-stop button 349 is recognized, reproduction processing for processing the music data in a manner capable of outputting by the output unit 200 is conducted and the processed music data is sequentially output to the output unit to be output by the sound-producing section 210 as sound (Step S108B). During the reproduction processing in Step S108B, the property of the music data, i.e. tempo (rhythm), sound volume of low-pitched sound and the like are recognized by the property recognizing unit 412 of the information-processing unit 400 (Step S109B). Further, reproduction processing condition such as reproducing speed and the property recognized in Step S109B is displayed on the first display unit 310 and the second display unit 320 (Step S110B). In order to display the reproduction processing condition on the second display unit 320, the reproducing position is recognized based on the reproducing position information relating to the remainder A calculated based on the above-described formula 1. Then, the reproducing position is displayed by lighting the light-emitting element located at the position in a clockwise direction corresponding to the calculated reproducing position information with reference to the twelve o'clock position of the reproducing-position display 321 of the second display unit 320 to indicate the reproducing position. Incidentally, since the calculated reproducing-position information shifts in accordance with increase in the frame number, the displayed reproducing position moves in a manner rotating along the substantially circular virtual locus.

Further, when a user presses down the cue button 347 of the switch section 340, the operation signal is recognized by the operation signal recognizer 411 to output a signal for setting the information-processing condition. When recognizing the signal, the display controller 450 sets the reproducing position information at the time the signal is received as the cue-point information and lights the light-emitting elements positioned in clockwise direction corresponding to the cue-point information with reference to the twelve o'clock position on the cue-point position display 322 to display the cue-point. The calculated cue-point information is stored in the storing unit 360.

While the processing unit 440 reproduces the music data, whether the rotating body 600 is pressed or not is judged as shown in FIG. 30 (Step S111B). Specifically, the operation signal recognizer 411 judges whether the operation signal is output by the press detector 820 or not. When the pressing operation is not recognized in Step S111B, the reproduction processing is continued back to Step S108B. On the other hand, when the pressing operation is recognized in Step S111B, the operation signal recognizer 411 judges whether the quick return button 345 is ON or not (Step S112B). Specifically, the operation signal recognizer 411 judges which one of change-instructions, i.e. change instructions for play/stop of the processing and change in reproducing position, is indicated by the change in reproducing condition indicated by the detection signal of the pressing operation on the rotating body 600. In Step S112B, judging that the quick return button 345 is pressed to be ON and the change instructions for the reproducing condition indicate the change in the reproducing position, the processing unit 440 sets the reproducing speed at 0% and moves the reproducing position at the cue-point (Step S113B). On the other hand, in Step S112B, when it is judged that the quick return button 345 is not ON (i.e. is OFF) and the change instructions indicate the change in play/stop of the processing, the processing unit 440 stops the reproduction processing by gradually decreasing the reproducing speed to 0% in accordance with the deceleration speed during the reproduction stopping process set by the speed adjuster 342B of the switch section 340 and recognized by the operation signal recognizer 411 (Step S114B).

After Steps S113B and 114B, the operation signal recognizer 411 judges whether the rotating body 600 is rotated or not based on the detection signal from the rotary movement detector 810 of the rotating body 600 (Step S115B). When it is judged that the rotating body 600 is not rotated in Step S115B, the operation signal recognizer 411 judges whether the pressing on the rotating body 600 continues or not (Step S116B). On the other hand, when it is judged that the rotating body 600 is rotated in Step S115B, the operation signal recognizer 411 judges whether the rotary direction is in positive (forward) rotation (FWD) or not based on detection signal (Step S117B). When forward rotation is judged in Step S117B, the rotary speed indicated by the detection signal from the rotary movement detector 810 is recognized (Step S118B). Subsequently, the processing unit 440 conducts reproduction processing so that the reproducing speed is increased in the forward direction in accordance with the rotary speed (Step S119B).

After Step S119B, whether the reproducing position reached to a predetermined property position at which the low-pitched sound volume is peaked in accordance with the advancement of the reproducing position by the rotary operation on the rotating body 600 or not is judged (Step S120B). Specifically, whether the reproducing position moving in accordance with the rotary operation on the rotating body 600 reached to the $\pm\Delta\theta$ position of the property position or not is judged. When it is judged in Step S120B that the reproducing position has not reached to the $\pm\Delta\theta$ position of the property position, the processing advances to Step S116B to be continued. On the other hand, when it is judged that the reproducing position has reached to the $\pm\Delta\theta$ position of the property position in Step S120B, the rotary operation on the rotating body 600 is restricted so that so-called click-like rotary operation feeling is caused (Step S121B). Specifically, when the reproducing position reached at the $-\Delta\theta$ position relative to the property position in accordance with the rotation of the rotating body 600, electric power is supplied to the electric motor 931 of the restricting unit 900 so that the restricting gear 920 is rotated at a predetermined rotary speed in a direction reverse to the direction corresponding to the rotation of the rotating body 600, thereby applying a drive force in reverse direction. Then, the electric motor 931 is controllably driven so that the reverse rotary speed of the restricting gear 920 is gradually reduced to lower the reverse drive force until the reproducing position reaches to the property position in accordance with the advancement of the rotation of the rotating section 600 on account of rotary operation. Further, when the reproducing position reaches to the property position in accordance with the advancement of the rotary operation on the rotating body 600, the rotation of the restricting gear 920 is stopped (i.e. not applying drive force) and the electric motor 931 is controllably driven so that the rotary speed of the restricting gear 920 is gradually increased to apply drive force until the reproducing position reaches to the $+\Delta\theta$ position after passing the property position in accordance with further rotary operation on the rotating body 600 and the rotary speed of the first gear 623 and the rotary speed of the restricting gear 920 becomes approximately the same. After Step S121B, the process advances to Step S116B.

On the other hand, when no-forward rotation, i.e. reverse rotation (REV), is judged in Step S117B, the rotary speed indicated by the detection signal from the rotary movement detector 810 is recognized (Step S122B). Subsequently, the restricting unit 440 conducts reproduction processing so that the reproducing speed is increased in reverse direction corresponding to the rotary speed (Step S123B) and rotation restriction is conducted so that the click-like rotary operation feeling can be given at the property position in Step S120B.

When it is judged that the pressing on the rotating body 600 is continued in Step S116B, so-called scratch processing is continued back to Step S115B. On the other hand, when it is determined that the pressing condition is no longer conducted in Step S116B, the processing unit 440 conducts processing for setting the reproducing speed as 100% in accordance with the reproduction-starting speed of the speed adjuster 342B set by the operation signal recognizer 411 (Step S124B).

Subsequently, the information processing unit 400 judges whether stop instruction for reproduction processing, i.e. reproduction stop in accordance with the input operation on the play/stop button 348 is recognized or not by the operation signal recognizer 411 (Step S125B). When the reproduction stop is not recognized in Step S125B, the reproduction processing is continued back to Step S108B. On the other hand, when it is judged that the reproduction stop is recognized in Step S125B, the reproduction is stopped to terminate the reproduction processing.

[Effect of Reproduction System]

In the switch device 500 of the reproduction system 100 according to the second embodiment, when the rotating body 600 is rotated, pressed or touched by an input operation of a user, the detection signal (operation signal) corresponding to the input operation is output to the information-processing unit 400. The information-processing unit 400 processes the information such as the music data and video data in accordance with the condition of the input operation in a predetermined processing condition and operates the rotating body 600 (e.g. provides click-like movement restriction thereto) in accordance with the information property such as low-pitched sound volume output by the output unit 200 being processed based on the detection signal. According to the above arrangement, when DJ playing is performed in a relatively large sound volume and under special illumination space to reproduce music data and video data, the position of the property such as the rhythm and low-pitched sound peak and the position at which the property changes such as image-switching position can be sensed by the movement restriction without relying on hearing sense and visual sense. Accordingly, effective reproduction processing by recognizing efficient property recognition can be conducted in DJ playing where specific property reproduction, strict reproduction timing and property switching timing and the like are required. Further, the information-processing device 300 is configured such that the information property can be recognized by touch and processing condition can be set and changed in accordance with input operation. Accordingly, the condition for information-processing can be set without visually checking the switch device 500 and the information-processing device 300 can be operated as electronic musical instrument, thereby easily improving general versatility.

The switch device 500 is provided on the information-processing device 300 for processing information and reproducing-position changing processing (processing condition corresponding to input condition) is conducted by the rotary operation on the rotating body 600 that is capable of rotary operation. Accordingly, when the rotating body 600 is rotated for changing the reproducing position, the property corresponding to the reproducing position can be easily recognized by a touch (movement restriction), so that the property position can be easily recognized. Accordingly, the property can be easily recognized during the reproduction processing by DJ playing, thereby achieving improved DJ playing. Further, the information-processing unit 400 for conducting information-processing and the switch device 500 for setting the processing condition of the information-processing are integrally provided. Accordingly, no connection is required for information-processing and information-processing can be immediately performed. Further, the rotating body 600 can be designed in a shape simulating a turntable of a record player and the designability can be improved.

The information-processing unit 400 of the information-processing device 300 includes the information acquiring unit 420 for acquiring information, the property recognizing unit 412 for recognizing the property of the acquired information, and a processing unit 440 for processing the information in response to the operation signal output by the switch device 500 and the switch section 340 in a manner capable of predetermined outputting by the output unit 200. Accordingly, while the information can be processed based on the operation signal for setting the processing condition of the information, the property of the information to be processed for providing the sense for facilitating the recognition of the contents of the information can be easily obtained with a simple arrangement.

The information-processing unit 400 includes the restriction controller 431 for controlling the restricting unit 900 for restricting the movement in accordance with the information property. Accordingly, an arrangement for providing the sense in response to information processing and information property can be achieved with a single arrangement of circuit board and CPU with the use of program, thereby easily simplifying the configuration.

The setting point for the information property recognized by the property recognizing unit 412 is recognized corresponding to the position (reproducing position) on a time axis of the reproduction time for processing the information by the processing unit 440 and outputting the information by the output unit 200. When the property position of the property-changing position is located in the movement area of the reproducing position (processing condition for the processing by the processing unit 440) according to the rotary operation on the rotating body 600, the click-like movement restriction is conducted each time the reproducing position passes the property position of the property-changing position. Accordingly, the property position is recognized based on the recognition of the reproducing position based on the reproduction time, the touch can be securely provided at the property position with a simple and easy calculation, thereby easily providing the touch corresponding to the property of the information to be processed.

As the touch corresponding to the information property, the load applied on the movement of the rotating body 600, i.e. the load during the rotary operation, to which the input operation is conducted, is controlled to be changed. Accordingly, the sense corresponding to the property such as increase and decrease in the resistance during rotation can be easily obtained with a simple arrangement.

When the load changes, the restriction processing for restricting the rotary movement of the rotating body 600 and assisting processing for assisting the rotary movement are selectively conducted to change the load. Accordingly, as the touch corresponding to the property, different sense can be provided in accordance with different processing such as the movement restriction and movement assistance, thereby easily improving versatility and usability. Further, as described above, so-called click-like touch can be easily provided by the control of short-time movement restriction and subsequent movement assistance. In other words, without providing physical arrangement such as to-be-overridden rib, the same click-like touch as the rib can be provided, and the click-like touch is provided by control, the same click-like touch as physical structure can be provided at any desired position.

The resistance for the rotary movement is increased as the restriction processing. Accordingly, the touch corresponding to property can be effectively provided, and an arrangement for efficiently providing the touch can be easily constructed Further, the information property that provides the touch, condition of the rotary input operation and the information-processing condition are displayed. Specifically, the properties such as peak condition of low-pitched sound volume, tempo and the like are displayed on the first display unit 310; the rotary condition of the input operation such as the setting position, the reproducing position and the like are displayed on the second display unit 320; and processing condition such as the reproduction time, speed and the like are displayed on the first display unit 310. Accordingly, visual check can be supplied to a user in addition to the touch sense, so that the processing condition for reproducing the information can be easily set, where the rotating, pressing and touching operation of the rotating body 600 and the input operation on the switch section 340 can be easily conducted.

Effect of Second Embodiment

In the second embodiment, the operation signal corresponding to the input operation on the rotating body 600 by a user is output to the information-processing unit 400. The information-processing unit 400 processes the information such as the music data and video data in accordance with the condition of the input operation in a predetermined processing condition and operates the rotating body 600 in accordance with the information property such as low-pitched sound volume output by the output unit 200 being processed based on the operation signal. According to the above arrangement, when DJ playing is performed in a relatively large sound volume and under special illumination space to reproduce music data and video data, the position of the property such as the rhythm and low-pitched sound peak and the position at which the property changes such as image-switching position can be sensed by the movement restriction without relying on hearing sense and visual sense, thereby providing effective input operation in the information-processing in accordance with the input operation.

Further, the switch device 500 that is operated in accordance with property is used for the information-processing device 300. Accordingly, effective information processing by recognizing efficient property recognition can be conducted in DJ playing where specific property reproduction, strict reproduction timing and property switching timing and the like for music data, image data and the like are required, thereby obtaining improved information-processing.

Third Embodiment

An arrangement of a reproduction system (reproducing device) in accordance with third embodiment of the present invention will be described below. Incidentally, the switch device of the invention may be used in any switch arrangement other than those used for a reproduction system and those for processing any information.

The basic arrangement (reproduction system 100, output unit 200 and information-processing device 300) of the present embodiment is the same as the above-described first embodiment (see FIGS. 2-19) and the switch device 500 and the information-processing unit 400 are basically the same as the above-described second embodiment (see FIG. 28). Accordingly, repeated description thereof will be omitted.

On the other hand, a part of the switch device 500 and the information-processing unit 400 in the present embodiment is different from those in the second embodiment. Accordingly, the switch device 500 and the information-processing unit 400 according to the present embodiment will be described below.

(Arrangement of Switch Device)

The switch device 500 of the present embodiment differs in the following items from those in the second embodiment.

The switch section 340 is coupled with the information-processing unit 400, which outputs a predetermined operation signal in accordance with the input operation by a user to the information-processing unit 400 to set the information-processing condition in the information-processing unit 400. As described above, the switch section 340 includes an eject button 341 (operation member), a mode adjuster 342, a tempo adjuster 343, a cue/loop button 344, a quick return button 345, a search-setting section 346, a cue button 347 (second operation unit), a play/stop button 348, a loop operating section 349 and the like.

The cue button 347 is for mainly registering a predetermined cue point at a specified position of the information. For instance, when being pressed down by a user while temporarily suspending the reproduction of optical disc, an operation signal based on instructions for a predetermined cue point, i.e. for registering the temporarily suspending position as the cue point, is output.

(Arrangement of Information-Processing Unit)

The information-processing unit 400 of the present embodiment differs in the following items from those in the second embodiment.

The property recognizing unit 412 recognizes the properties of the information (object to be processed) acquired by the information acquiring unit 420 such as sound volume, pitch, tempo and the like in music data and brightness, contrast, color and the like in image data and acquires the properties as property information. The properties of the information is recognized based on the information related to the information that is associated to the information and stored in a recording medium, and, alternatively, is recognized based on frequencies and the like during processing for reproducing the information by the processing unit 440 to acquire as the property information related to properties. For instance, the property recognizing unit 412 acquires a component below a predetermined frequency by a low-pass filter as sound volume of low-pitched range below the predetermined frequency and recognizes a sound volume of more than a predetermined level, especially a peak value, as a property. Further, the property recognizing unit 412 recognizes the elapsed time as time information from the reproduction-starting position at the position in which the low-pitched peak value as the property exists on the basis of minutes, second as time information and frame number contained in the stored information. Further, the property recognizing unit 412 sets information relating to cue point based on the operation signal output by the input operation of the above-described cue button 347. In other words, as shown in FIG. 21, the reproducing position at which the reproduction is suspended and input operation is conducted is set as the cue point to generate cue-point information. The generated cue point information is stored in the storing unit 360 and is output to the display controller 450. The reproducing position is calculated in accordance with the following calculation and recognized. Initially, total frame number reproduced from reproduction start point to the current elapsed track time is calculated.

Specifically, time information (minute Min, second Sec and frame number Fn) contained in the stored information is detected and the total frame number N is calculated in accordance with the formula 1 described in the first embodiment.

The calculated total frame number N is divided by a predetermined coefficient K and remainder A as reproducing position information is calculated. The coefficient K is a preset value determined for each of the discs (optical disc) as recording medium. For instance, it is set that K=135 considering CD's frame number 75 per one second and record player's rotation speed 33 RPM (0.55 rotation per second). Accordingly, the reproducing position on the substantially circular locus corresponding to an analog record player is recognized. The cue point is set based on the reproducing position. Incidentally, the cue-point information includes rotation number information relating to rotation number of the rotating body 600 from the reproduction starting position as well as the information relating to the reproducing position. When the reproducing position is advanced to some degree from the cue point so that the reproducing position is at a predetermined position after a couple of rotations, the reproducing position does not return to the cue-point position unless the rotation of the rotating body 600 is reversed by the number of advancement. Specifically, the value dividing the total frame number N with the coefficient K is the rotation number from the reproduction start position and the remainder is the position on the rotation locus.

The restriction controller 431 controllably drives the rotary drive unit 930 of the restricting unit 900 based on the properties of the information (i.e. the cue-point information) recognized by the property recognizing unit 412. Specifically, the restriction controller 431 rotates the electric motor 931 of the rotary drive unit 930 so that the load against the rotation of the rotating body 600 rotated by an input operation is changed at the cue-point position.

Specifically, as shown in FIG. 22, the drive force of the electric motor 931 is applied to the rotating body 600 so that the rotation resistance of the rotating body 600 is increased or decreased at a position around the position indicating the properties by a predetermined angle $\pm\Delta\theta$ in the rotary direction of the rotating body 600. As shown in FIG. 22(B), a restriction processing for applying resistance against the rotary operation is conducted from the position short of $-\Delta\theta$ from the cue-point position to the cue-point position. On the other hand, an assistance processing is conducted for assisting the rotary operation to reduce resistance against the rotary operation from the cue-point position to the position ahead of $+\Delta\theta$ beyond the cue-point position.

During the restricting processing and assisting processing, as shown in FIG. 22(A), great resistance is generated at the position short of $-\Delta\theta$ from the cue-point position, no load is generated at the cue-point position and the load is gradually reduced so that the rotary operation is assisted at the position ahead of $+\Delta\theta$ beyond the cue-point position. In other words, electric power is applied to drive the electric motor 931 so that the restricting gear 920 is rotated at a predetermined rotary speed in a direction reverse to the rotation of the rotating body 600 at the $-\Delta\theta$ position to apply reverse drive force. Then, the supplied electric power is controlled so that the reverse rotary speed of the restricting gear 920 is gradually reduced to lower the reverse drive force until the rotating position of the rotating section 600 reaches the cue-point position. When the rotating position of the rotating body 600 reaches to the cue-point position, the restricting gear 920 is not rotated, i.e., the drive force is not applied. Then, the rotary speed of the restricting gear 920 is increased to apply drive force until the rotary speeds of the first gear 623 and the restricting gear 920 are approximately the same in a direction corresponding to the rotation of the rotating body 600 when the rotary position of the rotating body 600 is at the cue-point position, until the rotary position of the rotating body 600 passes the cue-point position to the $+\Delta\theta$ position. Since the drive force is applied to the rotating operation of the rotating body 600 so that resistance-applying on the rotation is shifted to rotation-assistance within relatively short rotary angle of $\pm\Delta\theta$, so-called click-like operation feeling can be provided to a user at the cue-point position. Incidentally, in order to control the electric power supplied to the electric motor 931, electric current or voltage for driving the electric motor 931 is controlled, for instance.

[Operation of Reproduction System]

Next, operation for processing the information by the reproduction system 100 according to the third embodiment will be described below with reference to drawings.

The operation in the present embodiment is basically the same as the operation in the above-described second embodiment (see FIG. 29). However, the changing process of the reproducing condition in the information-processing operation of the reproduction system differs from that in the second embodiment.

Figure 31:
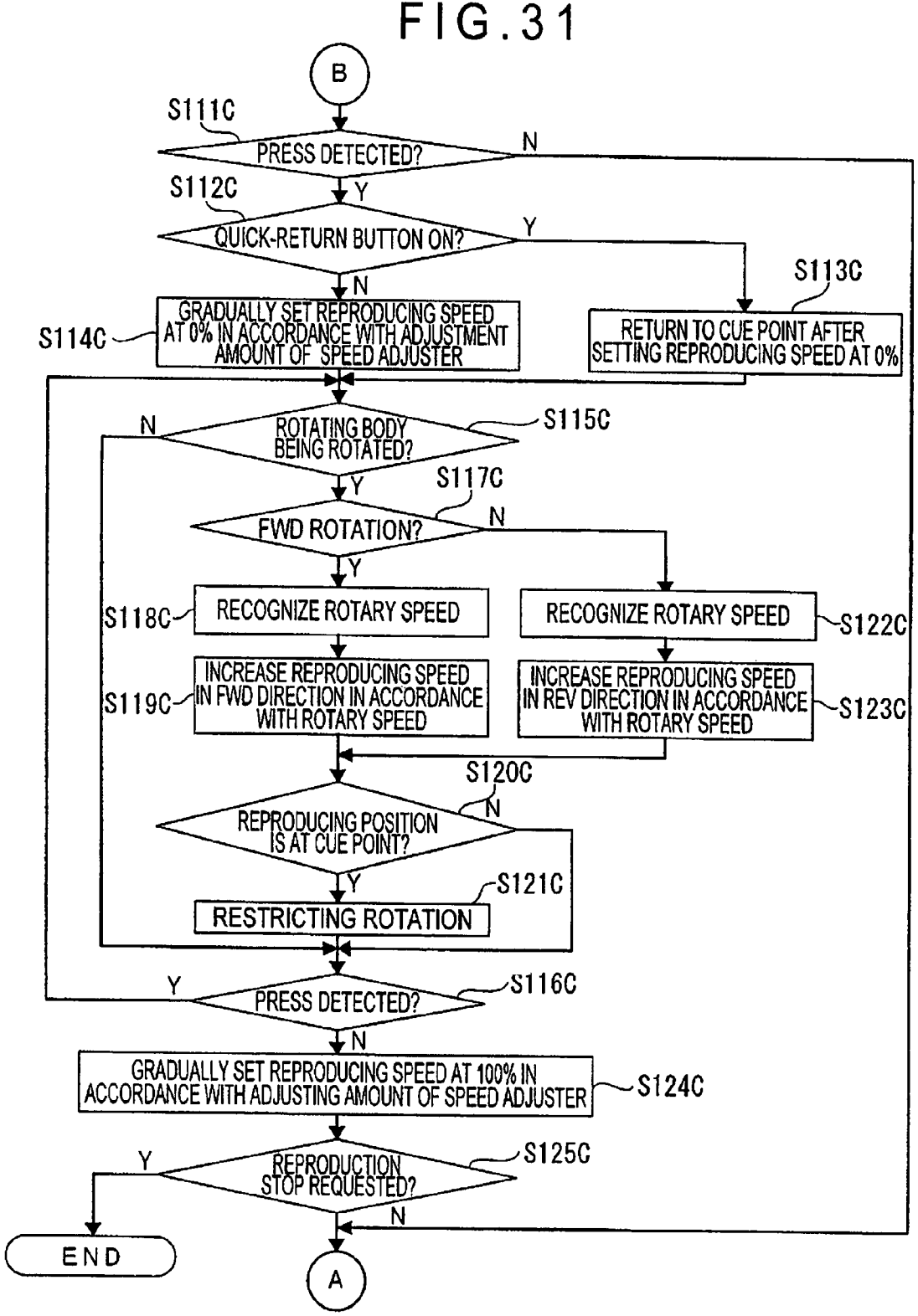
FIG. 31 is a flow chart showing how the reproduction processing is altered in the information-processing operation of the reproduction system according to the third embodiment.

While the processing unit 440 reproduces the music data, whether the rotating body 600 is pressed or not is judged as shown in FIG. 31 (Step S111C). Specifically, the operation signal recognizer 411 judges whether the operation signal is output by the press detector 820 or not. When the pressing operation is not recognized in Step S111C, the reproduction processing is continued back to Step S108B. On the other hand, when the pressing operation is recognized in Step S111C, the operation signal recognizer 411 judges whether the quick return button 345 is ON or not (Step S112C). Specifically, the operation signal recognizer 411 judges which one of change-instructions, i.e. change instructions for play/stop of the processing and change in reproducing position, is indicated by the change in reproducing condition indicated by the detection signal of the pressing operation on the rotating body 600. In Step S112C, judging that the quick return button 345 is pressed to be ON and the change instructions for the reproducing condition indicate the change in the reproducing position, the processing unit 440 sets the reproducing speed at 0% and moves the reproducing position at the cue-point (Step S113C). On the other hand, when it is judged that the quick return button 345 is not ON (i.e. is OFF) and the change instructions indicate the change in play/stop of the processing in Step S112C, the processing unit 440 stops the reproduction processing by gradually decreasing the reproducing speed to 0% in accordance with the deceleration speed during the reproduction stopping process set by the speed adjuster 342B of the switch section 340 and recognized by the operation signal recognizer 411 (Step S114C).

After Steps S113C and 114C, the operation signal recognizer 411 judges whether the rotating body 600 is rotated or not based on the detection signal from the rotary movement detector 810 of the rotating body 600 (Step S115C). When it is judged that the rotating body 600 is not rotated in Step S115C, the operation signal recognizer 411 judges whether the pressing on the rotating body 600 continues or not (Step S116C). On the other hand, when it is judged that the rotating body 600 is rotated in Step S115C, the operation signal recognizer 411 judges whether the rotary direction is in positive (forward) rotation (FWD) or not based on detection signal (Step S117C). When forward rotation is judged in Step S117C, the rotary speed indicated by the detection signal from the rotary movement detector 810 is recognized (Step S118C). Subsequently, the processing unit 440 conducts reproduction processing so that the reproducing speed is increased in the forward direction in accordance with the rotary speed (Step S119C).

After Step S119C, whether the reproducing position reached to the cue-point position in accordance with the advancement of the reproducing position by the rotary operation on the rotating body 600 or not is judged (Step S120C). Specifically, whether the reproducing position moving in accordance with the rotary operation on the rotating body 600 reached to the $\pm\Delta\theta$ position of the property position or not is judged. When it is judged in Step S120C that the reproducing position has not reached to the $\pm\Delta\theta$ position of the cue-point position, the processing advances to Step S116C to be continued. On the other hand, when it is judged that the reproducing position has reached to the $\pm\Delta\theta$ position of the cue-point position in Step S120C, the rotary operation on the rotating body 600 is restricted so that so-called click-like rotary operation feeling is caused (Step S121C). Specifically, when the reproducing position reached at the $-\Delta\theta$ position relative to the cue-point position in accordance with the rotation of the rotating body 600, electric power is supplied to the electric motor 931 of the restricting unit 900 so that the restricting gear 920 is rotated at a predetermined rotary speed in a direction reverse to the direction corresponding to the rotation of the rotating body 600, thereby applying a drive force in reverse direction. Then, the electric motor 931 is controllably driven so that the reverse rotary speed of the restricting gear 920 is gradually reduced to lower the reverse drive force until the reproducing position reaches to the cue-point position in accordance with the advancement of the rotation of the rotating section 600 on account of rotary operation. Further, when the reproducing position reaches to the cue-point position in accordance with the advancement of the rotary operation on the rotating body 600, the rotation of the restricting gear 920 is stopped (i.e. not applying drive force) and the electric motor 931 is controllably driven so that the rotary speed of the restricting gear 920 is gradually increased to apply drive force until the reproducing position reaches to the $+\Delta\theta$ position after passing the cue-point position in accordance with further rotary operation on the rotating body 600 and the rotary speed of the first gear 623 and the rotary speed of the restricting gear 920 becomes approximately the same. After Step S121C, the process advances to Step S116C.

On the other hand, when no-forward rotation, i.e. reverse rotation (REV), is judged in Step S117C, the rotary speed indicated by the detection signal from the rotary movement detector 810 is recognized (Step S122C). Subsequently, the restricting unit 440 conducts reproduction processing so that the reproducing speed is increased in reverse direction corresponding to the rotary speed (Step S123C) and rotation restriction is conducted so that the click-like rotary operation feeling can be given at the cue-point position in Step S120C.

When it is judged that the pressing on the rotating body 600 is continued in Step S116C, so-called scratch processing is continued back to Step S115C. On the other hand, when it is determined that the pressing condition is no longer conducted in Step S116C, the processing unit 440 conducts processing for setting the reproducing speed as 100% in accordance with the reproduction-starting speed of the speed adjuster 342B set by the operation signal recognizer 411 (Step S124C).

Subsequently, the information processing unit 400 judges whether stop instruction for reproduction processing, i.e. reproduction stop in accordance with the input operation on the play/stop button 348 is recognized or not by the operation signal recognizer 411 (Step S125C). When the reproduction stop is not recognized in Step S125C, the reproduction processing is continued back to Step S108B. On the other hand, when it is judged that the reproduction stop is recognized in Step S125C, the reproduction is stopped to terminate the reproduction processing.

[Effect of Reproduction System]

In the information-processing device 300 of the reproduction system 100 of the third embodiment, when different operation signals are output in accordance with input operation on the switch section 340 and the rotating body 600 of the switch device 500, information such as music data and video data is processed by the processing unit 440 so as to output the information in a different output mode by the output unit 200 in accordance with the different operation signals. Further, when the reproducing position of the processing of the processing unit 440 is located in accordance with the operation signal by the rotary input operation on the rotating body 600 at the cue point set by the input operation on the switch section 340 for changing the reproducing position by the processing unit 440 in accordance with the pressing operation on the rotating body 600, the rotating body 600 is operated for conducting the click-like movement restriction and the like. Accordingly, when DJ playing is conducted with relatively great sound volume and in a special illumination space to reproduce music data and video data, the setting position such as the cue-point that is set by the input operation on the switch 340 can be recognized by the movement restriction without relying on hearing sense and visual sense. Accordingly, effective reproduction processing by efficiently recognizing set position can be conducted in DJ playing where reproduction at a specific set position, strict reproduction timing and property switching timing and the like are required. Further, the information-processing device 300 is configured such that the setting position can be recognized by touch and processing condition can be set and changed in accordance with input operation. Accordingly, the condition for information-processing can be set without visually checking the switch device 500 and the information-processing device 300 can be operated as electronic musical instrument, thereby easily improving general versatility.

The switch device 500 is provided on the information-processing device 300 for processing information and reproducing-position changing processing (processing condition corresponding to input condition) is conducted by the rotary operation on the rotating body 600 that is capable of rotary operation. Accordingly, when the rotating body 600 is rotated for changing the reproducing position, the setting position corresponding to the reproducing position can be easily recognized by a touch (movement restriction), so that the setting position can be easily recognized. Accordingly, during reproduction processing in DJ playing, the setting position at which the reproduction processing is set can be easily recognized, so that efficient DJ playing can be achieved. Further, the information-processing unit 400 for conducting information-processing and the switch device 500 for setting the processing condition of the information-processing are integrally provided. Accordingly, no connection is required for information-processing and information-processing can be immediately performed. Further, the rotating body 600 can be designed in a shape simulating a turntable of a record player and the designability can be improved.

Further, the information-processing unit 400 of the information-processing device 300 achieves various functions as program. Accordingly, by incorporating the program on personal computer, CPU and the like, or by using a recording medium storing the program, the above arrangement for processing can be easily attained, thereby easily improving productivity and enlarging usage. The information-processing unit 400 includes the processing unit 431 for controlling the restricting unit 900 for restricting the movement in accordance with the rotary input operation. Accordingly, an arrangement for providing the sense in response to information processing and movement restriction corresponding to the input operation for setting the processing condition of the information can be achieved with a single arrangement of circuit board and CPU with the use of program, thereby easily simplifying the configuration.

The information-processing unit 400 includes the restriction controller 431 for controlling the restricting unit 900 for restricting the movement in accordance with the setting position corresponding to the processing condition based on the operation signal. Accordingly, an arrangement for providing the sense in response to information processing and information property can be achieved with a single arrangement of circuit board and CPU with the use of program, thereby easily simplifying the configuration.

The setting point for the information property recognized by the property recognizing unit 412 is recognized corresponding to the position (reproducing position) on a time axis of the reproduction time for processing the information by the processing unit 440 and outputting the information by the output unit 200. When the setting position is located in the movement area of the reproducing position (processing condition for the processing by the processing unit 440) according to the rotary operation on the rotating body 600, the click-like movement restriction is conducted each time the reproducing position passes the setting position of the property-changing position. Accordingly, the setting position is recognized based on the recognition of the reproducing position based on the reproduction time, the touch can be securely provided at the setting position with a simple and easy calculation, thereby easily providing the touch corresponding to the setting of the processing condition of the information to be processed.

As the touch corresponding to the setting of the processing condition of the information, the load applied on the movement of the rotating body 600, i.e. the load during the rotary operation, to which the input operation is conducted, is controlled to be changed. Accordingly, the sense corresponding to the setting position such as increase and decrease in the resistance during rotation can be easily obtained with a simple arrangement.

When the load changes, the restriction processing for restricting the rotary movement of the rotating body 600 and assisting processing for assisting the rotary movement are selectively conducted to change the load. Accordingly, as the touch corresponding to the setting position, different sense can be provided in accordance with different processing such as the movement restriction and movement assistance, thereby easily improving versatility and usability. Further, as described above, so-called click-like touch can be easily provided by the control of short-time movement restriction and subsequent movement assistance. In other words, without providing physical arrangement such as to-be-overridden rib, the same click-like touch as the rib can be provided, and the click-like touch is provided by control, the same click-like touch as physical structure can be provided at any desired position.

The resistance for the rotary movement is increased as the restriction processing. Accordingly, the touch corresponding to setting position can be effectively provided, and an arrangement for efficiently providing the touch can be easily constructed Further, the setting position at which the touch is provided, condition of the input operation and the information-processing condition are displayed. Specifically, the properties such as peak condition of low-pitched sound volume, tempo and the like are displayed on the first display unit 310; the condition of the input operation such as the setting position, the reproducing position and the like are displayed on the second display unit 320; and processing condition such as the reproduction time, speed and the like are displayed on the first display unit 310. Accordingly, visual check can be supplied to a user in addition to the touch sense, so that the processing condition for reproducing the information can be easily set, where the rotating, pressing and touching operation of the rotating body 600 and the input operation on the switch section 340 can be easily conducted.

Effect of Third Embodiment

In the third embodiment, when different operation signals are output in accordance with input operation on the switch section 340 and the rotating body 600 of the switch device 500, information such as music data and video data is processed by the processing unit 440 so as to output the information in a different output mode by the output unit 200 in accordance with the different operation signals. When the reproducing position of the processing of the processing unit 440 is located in accordance with the operation signal by the rotary input operation on the rotating body 600 at the cue point set by the input operation on the switch section 340 for changing the reproducing position by the processing unit 440 in accordance with the pressing operation on the rotating body 600, the rotating body 600 is operated for conducting the click-like movement restriction and the like. Accordingly, since the setting position can be recognized by movement restriction (sense other than hearing sense and visual sense), effective reproduction processing by efficiently recognizing set position can be conducted in DJ playing where reproduction at a specific set position, strict reproduction timing and property switching timing and the like are required.

Fourth Embodiment

An arrangement of a reproduction system as a reproduction device according to fourth embodiment of the invention will be described below with reference to FIG. 32. Incidentally, the switch device of the invention may be used in any switch arrangement other than those used for a reproduction system and those for processing any information.

The basic arrangement (reproduction system 100, output unit 200 and information-processing device 300) of the present embodiment is the same as the above-described first embodiment (see FIGS. 2-19). Accordingly, repeated description thereof will be omitted.

On the other hand, though the information-processing device 300 of the present embodiment includes the switch device 500 and the information-processing unit 400 similar to the above-described first embodiment, a part of the respective components differs from those in the first embodiment. Accordingly, the switch device 500 and the information-processing unit 400 according to the present embodiment will be described below.

(Arrangement of Switch Device)

Figure 32:
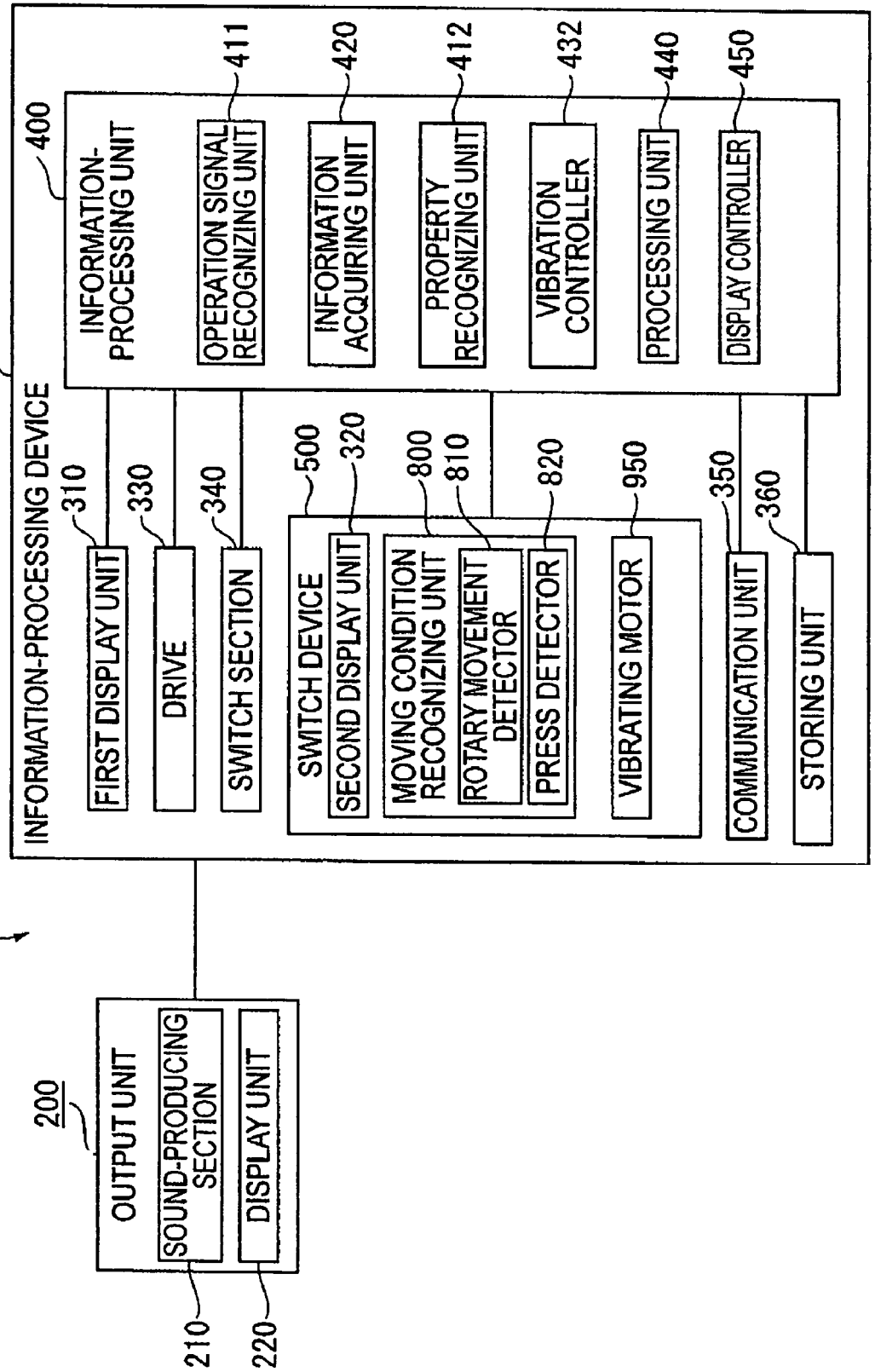
FIG. 32 is a block diagram showing a reproduction system according to fourth and fifth embodiments of a reproduction device of the invention.

In FIG. 32, the switch device 500 includes a rotating body 600 (operation unit constituting operating device), a support base 700, a moving condition recognizing unit 800 and a vibrating motor 950 constituting a vibrating unit. In other words, the rotary drive unit 930 is omitted from the switch device 500 of the first embodiment.

(Arrangement of Information-Processing Unit)

In FIG. 32, the information-processing unit 400 includes a CPU (Central Processing Unit) and various I/O ports (not shown) including a display control port to which the first display unit 310 and the second display unit 320 are connected, a drive control port to which the drive 330 is connected, an input port to which the switch section 340 and the moving condition recognizing unit 800 is coupled, a drive control port to which the rotary drive unit 930 is coupled, a communication port to which the communicator 350 is connected, a storage port to which the storing unit 360 is connected and the like. The information-processing unit 400 includes a information recognizing unit 411, an information-acquiring unit 420, an operation controller 412, a vibration controller 432, a processing unit 440, a display controller 450 and the like, all of which are installed as a program.

The operation signal recognizer 411 recognizes various operation signal output by the switch section 340 and detection signal output by the rotary movement detector 810 and the press detector 820 of the moving condition recognizing unit 800, recognizes change instructions of the processing condition input by a user to set processing condition of the information. The signal related to the setting of the processing condition is output to the information acquiring unit 420, the vibration controller 432, the processing unit 440 and the display controller 450. Incidentally, when the detection signal related to pressing force from the press detector 820 is recognized, the processing condition is set in a manner corresponding to the magnitude of the pressing force, where, for instance, the reproducing speed is lowered in accordance with the magnitude of the pressing force. When the pressing force is gradually reduced from the temporal suspension of the reproduction by pressing the rotating body 600, the processing condition is set so that the time required for returning to ordinary reproducing speed is shortened in correspondence to the magnitude of the pressing force (faster reduction of the pressing force results in shorter time as compared to slower reduction of the pressing force).

When the information acquiring unit 420 recognizes a signal relating to the setting of a predetermined processing condition output by the operation signal recognizer 411, i.e. an instruction signal instructing to read predetermined information (object to be processed), the information acquiring unit 420 controllably drives the drive 330 and the storing unit 360 to read and acquire desired information stored in the recording medium. The information acquiring unit 420 acquires the record condition of the information stored in the recording medium such as reproduction time, the number of the stored information and the like. The stored information is acquired when, for instance, it is recognized that the recording medium is mounted on the drive 330 based on the signal output from the drive 330 or it is recognized that the to-be-processed object is stored in the storing unit 360 by input operation of the switch section 340, where the drive 330 or the storing unit 360 is controllably driven to read the stored play list and TOC (Table Of Contents) information. The information acquiring unit 420 controllably drive the communicator 350 based on an input operation on the switch section 340 and demand signal output by a terminal coupled to the information-processing device 300 and the like to receive the information that is requested to retrieve from the server device and terminal device.

The property recognizing unit 412 recognizes the properties of the information (object to be processed) acquired by the information acquiring unit 420 such as sound volume, pitch, tempo and the like in music data and brightness, contrast, color and the like in image data and acquires the properties as property information. The properties of the information is recognized based on the information related to the information that is associated to the information and stored in a recording medium, and, alternatively, is recognized based on frequencies and the like during processing for reproducing the information by the processing unit 440 to acquire as the property information related to properties. For instance, the sound volume is recognized as shown in FIG. 23(A). Further, the property recognizing unit 412 recognizes the position of the recognized property based on the position of the processing time for processing the information, i.e. the elapsed time as time information from the reproduction-starting position, on the basis of minutes, second as time information and frame number contained in the stored information. The property recognizing unit 412 sequentially stores property information in the storing unit 360 in which the recognized property and the time information (position thereof) are associated. The property recognizing unit 412 also outputs property information related to the property of the recognized information to the display controller 450.

The vibration controller 432 conducts operation control (i.e. vibration) of the vibrating motor 950 based on the property of the information recognized by the property recognizing unit 412. Initially, the vibration controller 432 calculates the total frame number reproduced from reproduction start point to the current elapsed track time.

Specifically, time information (minute Min, second Sec and frame number Fn) contained in the stored information is detected and the total frame number N is calculated in accordance with the formula 1 described in the first embodiment.

The calculated total frame number N is divided by a predetermined coefficient K and remainder A as reproducing position information is calculated. The coefficient K is a preset value determined for each of the discs (optical disc) as recording medium. For instance, it is set that K=135 considering CD's frame number 75 per one second and record player's rotation speed 33 RPM (0.55 rotation per second). Accordingly, the reproducing position on the substantially circular locus corresponding to an analog record player is recognized. Accordingly, the position of the information property in the property information acquired by the property recognizing unit 412 is recognized by calculation in the same manner as the recognition of the reproducing position.

The vibration controller 432 sets the current value of the supplied electric power in a manner corresponding to the property of the information at the processing position moving in accordance with the rotation of the rotating body 600 rotated by input operation so that, for instance, the magnitude of the vibration of the vibrating motor 950 is changed in response to the sound volume. Specifically, as shown in FIG. 23(B), the supplied electric power is set based on the property information at the reproducing position (processing position) so that current value corresponding to the sound volume flows to the vibrating motor 950. When the rotation is stopped and reproduction is suspended while pressing the rotating body 600, during the suspension period T2 (FIG. 25(B)), electric current value corresponding to the magnitude of the sound volume at the reproducing position is supplied to cause vibration.

The processing unit 440 includes DSP (Digital Signal Processor) and the like, which processes the information to be processed obtained by the information acquiring unit 420 so that the information to be processed is output by the output unit 200 in accordance with the signal indicating the setting of the processing condition output by the operation signal recognizer 411. The processed information is output to the output unit 200 and is reproduced in accordance with the setting contents. Specifically, in addition to normal reproduction, the reproducing position, reproducing speed, tempo, pitch and the like of the information is set or changed in accordance with the setting contents in accordance with the rotation, pressing, contact operation on the rotating body 600 and input operation on the switch section 340.

The display controller 450 controls the first display unit 310 and the second display unit 320 to display the setting contents and information-processing condition in accordance with the signal relating to the setting contents of the processing condition output by the operation signal recognizer 411 and various information relating to the property of the information recognized by the property recognizing unit 412.

[Operation of Reproduction System]

Figure 33:
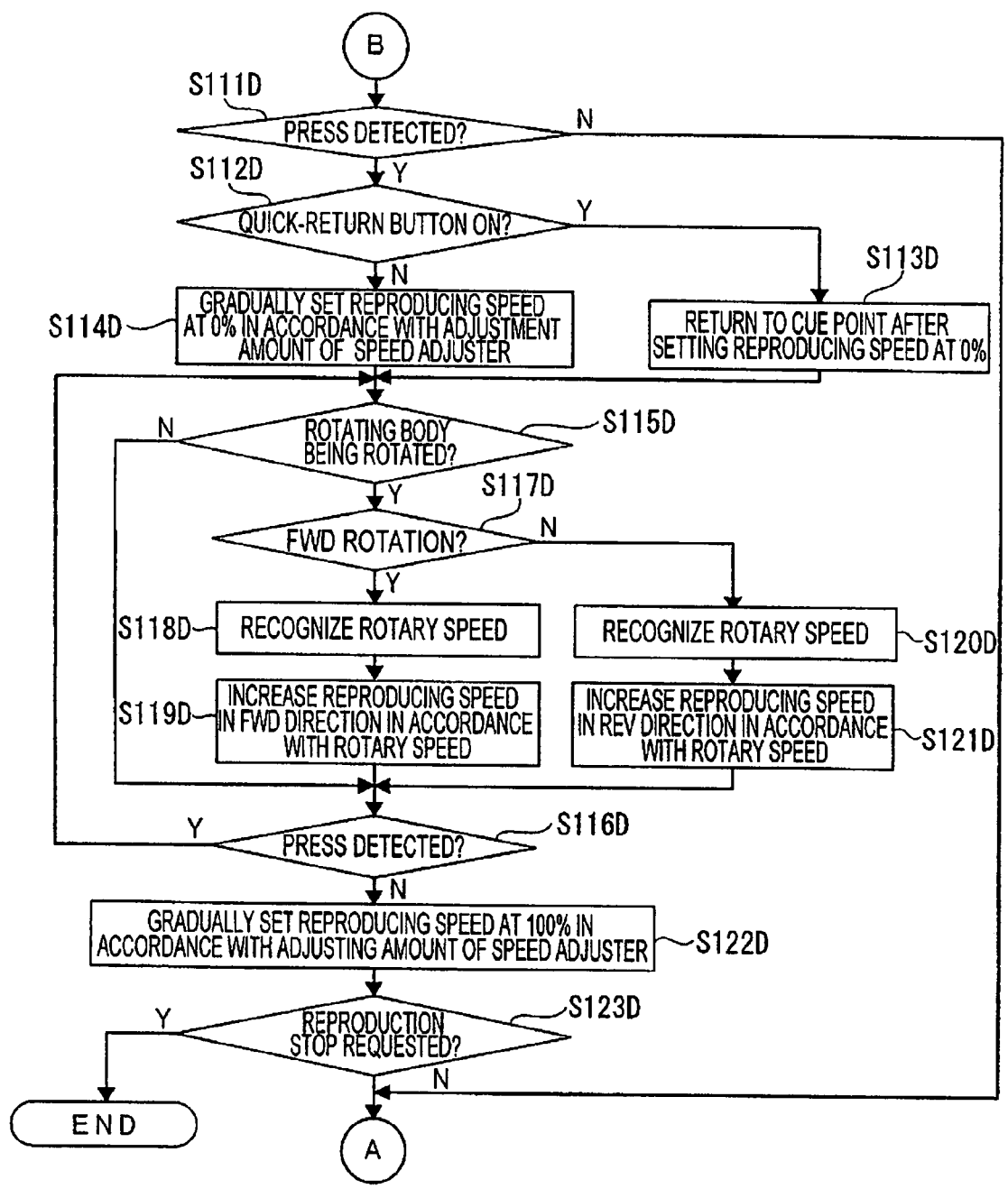
FIG. 33 is a flow chart showing how the reproduction processing is altered in the information-processing operation of the reproduction system according to the fourth and the fifth embodiments.

Next, operation for processing the information by the reproduction system 100 according to the fourth embodiment will be described below with reference to drawings. Incidentally, the explanation for the operation processing will be described with reference to an arrangement employing an optical disc as a recording medium in which music data is stored, however, the recording medium to be processed is not limited thereto. FIG. 26 is a flow chart showing how the reproduction processing is conducted in information-processing operation of the reproduction. FIG. 33 is a flow chart showing how the reproduction processing is changed in information-processing operation of the reproduction system.

Initially, as shown in FIG. 26, after electric power is supplied to the reproduction system 100 in advance and a recording medium such as an optical disc is inserted into the insertion slot 302 (Step S101A), the information-processing unit 400 controllably drives the drive 330. The recording medium is mounted at a predetermined position in the drive 330 within the body case 301 using an auto-loading mechanism and the like. When recognizing that the recording medium is mounted in the drive 330, the information-processing unit 400 controllably drives the drive 330 by the information acquiring unit 420 to read the record information stored in the recording medium. Further, the first display unit 310 is controlled by the display controller 450 to display the record information (Step S102A). Subsequently, the information-processing unit 400 recognizes with the operation signal recognizer 411 the operation signal output in accordance with input operation on the switch section 340 by a user (Step S103A), and sets the input processing condition (Step S104A). Incidentally, Steps S103A and S104A are conducted in subsequent processing and the processing condition is set based on the operation signal until the reproduction processing is completed.

Subsequently, selection for music data to be processed is in wait (Step S105A). Specifically, whether any music data is selected or not is judged. When selection of the music data to be processed is recognized, the drive 330 and the storing unit 360 are controlled by the information acquiring unit 420 to read the selected music data (Step S106A). The display controller 450 displays the information relating to music data such as reproduction time and track number of the selected music data, the registered number in the play list and the like. Subsequently, reproduction for the music data to be processed is in wait (Step S107A). Specifically, whether the play/stop button 348 is input-operated or not is judged and, when reproduction command by the input operation on the play-stop button 349 is recognized, reproduction processing for processing the music data in a manner capable of outputting by the output unit 200 is conducted and the processed music data is sequentially output to the output unit to be output by the sound-producing section 210 as sound (Step S108A). During the reproduction processing in Step S108A, the property of the music data, i.e. tempo (rhythm), sound volume of low-pitched sound and the like are recognized by the property recognizing unit 412 of the information-processing unit 400 (Step S109A). Further, reproduction processing condition such as reproducing speed and the property recognized in Step S109A is displayed on the first display unit 310 and the second display unit 320, and the vibrating motor 950 is vibrated in accordance with the property (Step S110A).

In Step S110A, in order to display the reproduction processing condition on the second display unit 320, the reproducing position is recognized based on the reproducing position information relating to the remainder A calculated based on the above-described formula 1. Then, the reproducing position is displayed by lighting the light-emitting element located at the position in a clockwise direction corresponding to the calculated reproducing position information with reference to the twelve o'clock position of the reproducing-position display 321 of the second display unit 320 to indicate the reproducing position. Incidentally, since the calculated reproducing-position information shifts in accordance with increase in the frame number, the displayed reproducing position moves in a manner rotating along the substantially circular virtual locus. Further, in order to vibrate the vibrating motor 950, the electric current value of the electric power supplied to the vibrating motor 950 in accordance with the property on the reproducing position currently processed by the processor 440 such as the magnitude of the sound volume is set by the vibration controller 432 based on the reproducing position information and the property information to supply the electric power. Accordingly, even when the rotating body 600 is not in operation, the vibrating motor 950 is vibrated in accordance with the reproducing condition of the output unit 200 to vibrate the rotating body 600. Accordingly, when a user holds a hand over the rotating body 600, it can be recognized that the rotating body 600 is vibrated in accordance with the music data currently reproduced.

Further, when a user presses down the cue button 347 of the switch section 340, the operation signal is recognized by the operation signal recognizer 411 to output a signal for setting the information-processing condition. When recognizing the signal, the display controller 450 sets the reproducing position information at the time the signal is received as the cue-point information and lights the light-emitting elements positioned in clockwise direction corresponding to the cue-point information with reference to the twelve o'clock position on the cue-point position display 322 to display the cue-point. The calculated cue-point information is stored in the storing unit 360.

While the processing unit 440 reproduces the music data, whether the rotating body 600 is pressed or not is judged as shown in FIG. 33 (Step S111D). Specifically, the operation signal recognizer 411 judges whether the operation signal is output by the press detector 820 or not. When the pressing operation is not recognized in Step S111D, the reproduction processing is continued back to Step S108A. On the other hand, when the pressing operation is recognized in Step S111D, the operation signal recognizer 411 judges whether the quick return button 345 is ON or not (Step S112D). Specifically, the operation signal recognizer 411 judges which one of change-instructions, i.e. change instructions for play/stop of the processing and change in reproducing position, is indicated by the change in reproducing condition indicated by the detection signal of the pressing operation on the rotating body 600. In Step S112D, judging that the quick return button 345 is pressed to be ON and the change instructions for the reproducing condition indicate the change in the reproducing position, the processing unit 440 sets the reproducing speed at 0% and moves the reproducing position at the cue-point (Step S113D). On the other hand, when it is judged that the quick return button 345 is not ON (i.e. is OFF) and the change instructions indicate the change in play/stop of the processing in Step S112D, the processing unit 440450 stops the reproduction processing by gradually decreasing the reproducing speed to 0% in accordance with the deceleration speed during the reproduction stopping process set by the speed adjuster 342B of the switch section 340 and recognized by the operation signal recognizer 411 (Step S114D).

After Steps S113D and 114D, the operation signal recognizer 411 judges whether the rotating body 600 is rotated or not based on the detection signal from the rotary movement detector 810 of the rotating body 600 (Step S115D). When it is judged that the rotating body 600 is not rotated in Step S115D, the operation signal recognizer 411 judges whether the pressing on the rotating body 600 continues or not (Step S116D). On the other hand, when it is judged that the rotating body 600 is rotated in Step S115D, the operation signal recognizer 411 judges whether the rotary direction is in positive (forward) rotation (FWD) or not based on detection signal (Step S117D). When forward rotation is judged in Step S117D, the rotary speed indicated by the detection signal from the rotary movement detector 810 is recognized (Step S118D). Subsequently, the processing unit 440 conducts reproduction processing so that the reproducing speed is increased in the forward direction in accordance with the rotary speed (Step S119D) and the process advances to Step S116D.

On the other hand, when no-forward rotation, i.e. reverse rotation (REV), is judged in Step S117D, the rotary speed indicated by the detection signal from the rotary movement detector 810 is recognized (Step S120D). Subsequently, the processing unit 440 conducts reproduction processing so that the reproducing speed is increased in the reverse direction in accordance with the rotary speed (Step S121D) and the process advances to Step S116. Since the vibration control of the vibrating motor 950 in accordance with the sound volume at the reproducing position set in Step S110A continues during the pressing and contact operation and rotary operation on the rotating body 600 in Steps S115D to 119D and Step S121D, a user can recognize the sound volume at the reproducing position that is moved in response to the input operation by the vibration.

When it is judged that the pressing on the rotating body 600 is continued in Step S116D, so-called scratch processing is continued back to Step S115D. On the other hand, when it is determined that the pressing condition is no longer conducted in Step S116D, the processing unit 440 conducts processing for setting the reproducing speed as 100% in accordance with the reproduction-starting speed of the speed adjuster 342B set by the operation signal recognizer 411 (Step S122D).

Subsequently, the information processing unit 400 judges whether stop instruction for reproduction processing, i.e. reproduction stop in accordance with the input operation on the play/stop button 348 is recognized or not by the operation signal recognizer 411 (Step S123D). When the reproduction stop is not recognized in Step S123D, the reproduction processing is continued back to Step S108A. On the other hand, when it is judged that the reproduction stop is recognized in Step S123D, the reproduction is stopped to terminate the reproduction processing.

[Effect of Reproduction System]

In the switch device 500 of the reproduction system 100 according to the fourth embodiment, when the rotating body 600 is rotated, pressed or touched by an input operation of a user, the detection signal (operation signal) corresponding to the input operation is output to the information-processing unit 400. The information-processing unit 400 processes the information such as the music data and video data in accordance with the condition of the input operation in a predetermined processing condition and vibrates the rotating body 600 in response to the output condition processed by the information-processing unit 400 and output by the output unit 200 in accordance with the information property such as low-pitched sound volume output by the output unit 200 being processed based on the detection signal. According to the above arrangement, when DJ playing is performed in a relatively large sound volume and under special illumination space to reproduce music data and video data, the position of the property such as the rhythm and low-pitched sound peak and the position at which the property changes such as image-switching position can be sensed by the vibration without relying on hearing sense and visual sense. Accordingly, since the information-processing condition can be easily recognized, effective reproduction processing by recognizing efficient property recognition can be conducted in DJ playing where specific property reproduction, strict reproduction timing and property switching timing and the like are required. Further, the information-processing device 300 is configured such that the information property can be recognized by touch and processing condition can be set and changed in accordance with input operation. Accordingly, the condition for information-processing can be set without visually checking the switch device 500 and the information-processing device 300 can be operated as electronic musical instrument, thereby easily improving general versatility.

The switch device 500 is provided on the information-processing device 300 for processing information and reproducing-position changing processing (processing condition corresponding to input condition) is conducted by the rotary operation on the rotating body 600 that is capable of rotary operation. Accordingly, when the rotating body 600 is rotated for changing the reproducing position, the setting position corresponding to the reproducing position can be easily recognized by a touch (movement restriction), so that the setting position can be easily recognized. Accordingly, during reproduction processing in DJ playing, the setting position at which the reproduction processing is set can be easily recognized, so that efficient DJ playing can be achieved. Further, the information-processing unit 400 for conducting information-processing and the switch device 500 for setting the processing condition of the information-processing are integrally provided. Accordingly, no connection is required for information-processing and information-processing can be immediately performed. Further, the rotating body 600 can be designed in a shape simulating a turntable of a record player and the designability can be improved.

The information-processing unit 400 of the information-processing device 300 includes the information acquiring unit 420 for acquiring information, the property recognizing unit 412 for recognizing the property of the acquired information, and a processing unit 440 for processing the information in response to the operation signal output by the switch device 500 and the switch section 340 in a manner capable of predetermined outputting by the output unit 200. Accordingly, while the information can be processed based on the operation signal for setting the processing condition of the information, the property of the information to be processed for providing the sense for facilitating the recognition of the contents of the information can be easily obtained with a simple arrangement.

The information-processing unit 400 includes the vibration controller 432 for controlling the vibrating motor 950 for vibrating the rotating body 600 in accordance with the information property. Accordingly, an arrangement for providing the sense in response to information processing and information property can be achieved with a single arrangement of circuit board and CPU with the use of program, thereby easily simplifying the configuration.

The setting point for the information property recognized by the property recognizing unit 412 is recognized corresponding to the position (reproducing position) on a time axis of the reproduction time for processing the information by the processing unit 440450 and outputting the information by the output unit 200. When the property position of the property-changing position is located in the movement area of the reproducing position (processing condition for the processing by the processing unit 440) according to the rotary operation on the rotating body 600, the vibration control is conducted each time the reproducing position passes the property position of the property-changing position. Accordingly, the property position is recognized based on the recognition of the reproducing position based on the reproduction time, the touch can be securely provided by the property position with a simple and easy calculation, thereby easily providing the touch corresponding to the property of the information to be processed.

In order to provide the touch corresponding to the information property, the rotating body 600 is vibrated in accordance with the magnitude of the property by flowing electric current of current value corresponding to the magnitude of the information property to the vibrating motor 950 provided on the rotating body 600. Accordingly, an arrangement for providing a sense corresponding to the property can be easily provided with a simple structure. Further, a vibrating motor used for small electrical equipment such as cellular phone can be used, so that size-reduction can be easily achieved.

Further, the information property that provides the touch, condition of the rotary input operation and the information-processing condition are displayed. Specifically, the properties such as peak condition of low-pitched sound volume, tempo and the like are displayed on the first display unit 310; the rotary condition of the input operation such as the setting position, the reproducing position and the like are displayed on the second display unit 320; and processing condition such as the reproduction time, speed and the like are displayed on the first display unit 310. Accordingly, visual check can be supplied to a user in addition to the touch sense, so that the processing condition for reproducing the information can be easily set, where the rotating, pressing and touching operation of the rotating body 600 and the input operation on the switch section 340 can be easily conducted.

Effect of Fourth Embodiment

As described above, in the above-described embodiment: an operation signal corresponding to the input operation on the rotating body 600 by a user is output to the information-processing unit 400; the information such as music data and video data is processed in a predetermined processing condition in accordance with condition of the input operation by the information-processing unit 400; and the rotating body 600 is vibrated in accordance with the output condition of the output unit 200 after being processed by the information-processing unit 400 based on the information property such as the sound volume processed based on the operation signal and output by the output unit 200. According to the above arrangement, when DJ playing is performed in a relatively large sound volume and under special illumination space to reproduce music data and video data, the position of the property such as the rhythm and low-pitched sound peak and the position at which the property changes such as image-switching position can be sensed by the vibration without relying on hearing sense and visual sense, thereby easily recognizing the information-processing condition.

Further, the switch device 500 that is vibrated in accordance with property is used for the information-processing device 300. Accordingly, effective information processing by recognizing efficient property recognition can be conducted in DJ playing where specific property reproduction, strict reproduction timing and property switching timing and the like for music data, image data and the like are required, thereby obtaining improved information-processing.

Fifth Embodiment

An arrangement of a reproduction system (reproducing device) in accordance with fifth embodiment of the present invention will be described below. Incidentally, the switch device of the invention may be used in any switch arrangement other than those used for a reproduction system and those for processing any information.

The basic arrangement (reproduction system 100, output unit 200 and information-processing device 300) of the present embodiment is the same as the above-described first embodiment (see FIGS. 2-19) and the switch device 500 and the information-processing unit 400 are basically the same as the above-described fourth embodiment (see FIG. 32). Accordingly, repeated description thereof will be omitted.

On the other hand, a part of the information-processing unit 400 in the present embodiment is different from that in the fourth embodiment. Accordingly the information-processing unit 400 of the present embodiment will be described below.

(Arrangement of Information-Processing Unit)

The information-processing unit 400 of the present embodiment differs in the following items from those in the second embodiment.

Figure 34:
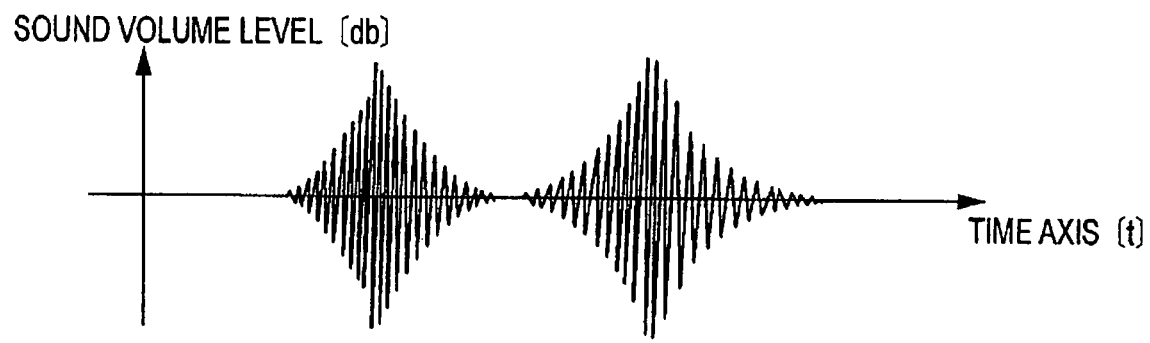
FIG. 34 is a waveform chart showing a change in sound volume of music data according to the fifth embodiment.
Figure 35:
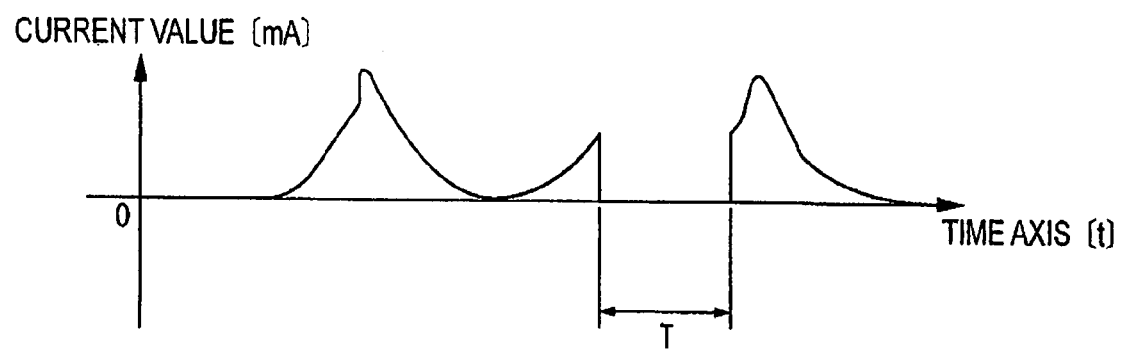
FIG. 35 is a waveform chart showing a change in electric current value of electric power supplied to a vibrating motor according to the fifth embodiment.

The property recognizing unit 412 recognizes the properties of the information (object to be processed) acquired by the information acquiring unit 420 such as sound volume, pitch, tempo and the like in music data and brightness, contrast, color and the like in image data and acquires the properties as property information. The properties of the information is recognized based on the information related to the information that is associated to the information and stored in a recording medium, and, alternatively, is recognized based on frequencies and the like during processing for reproducing the information by the processing unit 440 to acquire as the property information related to properties. For instance, the sound volume is recognized as shown in FIG. 34. Further, the property recognizing unit 412 recognizes the position of processing time for processing the information, i.e. the elapsed time as time information from the reproduction-starting position at the position on the basis of minutes, second as time information and frame number contained in the stored information. The property recognizing unit 412 sequentially stores property information in the storing unit 360 in which the recognized property and the time information (position thereof) are associated. The property recognizing unit 412 also outputs property information related to the property of the recognized information to the display controller 450.

[Operation of Reproduction System]

Next, operation for processing the information by the reproduction system 100 according to the fifth embodiment will be described below with reference to drawings. Incidentally, the explanation for the operation processing will be described with reference to an arrangement employing an optical disc as a recording medium in which music data is stored, however, the recording medium to be processed is not limited thereto. FIG. 26 is a flow chart showing how the reproduction processing is conducted in information-processing operation of the reproduction. FIG. 33 is a flow chart showing how the reproduction processing is changed in information-processing operation of the reproduction system.

Initially, as shown in FIG. 26, after electric power is supplied to the reproduction system 100 in advance and a recording medium such as an optical disc is inserted into the insertion slot 302 (Step S101A), the information-processing unit 400 controllably drives the drive 330. The recording medium is mounted at a predetermined position in the drive 330 within the body case 301 using an auto-loading mechanism and the like. When recognizing that the recording medium is mounted in the drive 330, the information-processing unit 400 controllably drives the drive 330 by the information acquiring unit 420 to read the record information stored in the recording medium. Further, the first display unit 310 is controlled by the display controller 450 to display the record information (Step S102A). Subsequently, the information-processing unit 400 recognizes with the operation signal recognizer 411 the operation signal output in accordance with input operation on the switch section 340 by a user (Step S103A), and sets the input processing condition (Step S104A). Incidentally, Steps S103A and S104A are conducted in subsequent processing and the processing condition is set based on the operation signal until the reproduction processing is completed.

Subsequently, selection for music data to be processed is in wait (Step S105A). Specifically, whether any music data is selected or not is judged. When selection of the music data to be processed is recognized, the drive 330 and the storing unit 360 are controlled by the information acquiring unit 420 to read the selected music data (Step S106A). The display controller 450 displays the information relating to music data such as reproduction time and track number of the selected music data, the registered number in the play list and the like. Subsequently, reproduction for the music data to be processed is in wait (Step S107A). Specifically, whether the play/stop button 348 is input-operated or not is judged and, when reproduction command by the input operation on the play-stop button 349 is recognized, reproduction processing for processing the music data in a manner capable of outputting by the output unit 200 is conducted and the processed music data is sequentially output to the output unit to be output by the sound-producing section 210 as sound (Step S108A). During the reproduction processing in Step S108A, the property of the music data, i.e. tempo (rhythm), sound volume of low-pitched sound and the like are recognized by the property recognizing unit 412 of the information-processing unit 400 (Step S109A). Further, reproduction processing condition such as reproducing speed and the property recognized in Step S109A is displayed on the first display unit 310 and the second display unit 320, and the vibrating motor 950 is vibrated in accordance with the property (Step S110A).

In Step S110A, in order to display the reproduction processing condition on the second display unit 320, the reproducing position is recognized based on the reproducing position information relating to the remainder A calculated based on the above-described formula 1. Then, the reproducing position is displayed by lighting the light-emitting element located at the position in a clockwise direction corresponding to the calculated reproducing position information with reference to the twelve o'clock position of the reproducing-position display 321 of the second display unit 320 to indicate the reproducing position. Incidentally, since the calculated reproducing-position information shifts in accordance with increase in the frame number, the displayed reproducing position moves in a manner rotating along the substantially circular virtual locus. Further, in order to vibrate the vibrating motor 950, the electric current value of the electric power supplied to the vibrating motor 950 in accordance with the property on the reproducing position currently processed by the processor 440 such as the magnitude of the sound volume is set by the vibration controller 432 based on the reproducing position information and the property information to supply the electric power. Accordingly, even when the rotating body 600 is not in operation, the vibrating motor 950 is vibrated in accordance with the reproducing condition of the output unit 200 to vibrate the rotating body 600. Accordingly, when a user holds a hand over the rotating body 600, it can be recognized that the rotating body 600 is vibrated in accordance with the music data currently reproduced.

Further, when a user presses down the cue button 347 of the switch section 340, the operation signal is recognized by the operation signal recognizer 411 to output a signal for setting the information-processing condition. When recognizing the signal, the display controller 450 sets the reproducing position information at the time the signal is received as the cue-point information and lights the light-emitting elements positioned in clockwise direction corresponding to the cue-point information with reference to the twelve o'clock position on the cue-point position display 322 to display the cue-point. The calculated cue-point information is stored in the storing unit 360.

While the processing unit 440 reproduces the music data, whether the rotating body 600 is pressed or not is judged as shown in FIG. 33 (Step S111D). Specifically, the operation signal recognizer 411 judges whether the operation signal is output by the press detector 820 or not. When the pressing operation is not recognized in Step S111D, the reproduction processing is continued back to Step S108A. On the other hand, when the pressing operation is recognized in Step S111D, the operation signal recognizer 411 judges whether the quick return button 345 is ON or not (Step S112D). Specifically, the operation signal recognizer 411 judges which one of change-instructions, i.e. change instructions for play/stop of the processing and change in reproducing position, is indicated by the change in reproducing condition indicated by the detection signal of the pressing operation on the rotating body 600. In Step S112D, judging that the quick return button 345 is pressed to be ON and the change instructions for the reproducing condition indicate the change in the reproducing position, the processing unit 440 sets the reproducing speed at 0% and moves the reproducing position at the cue-point (Step S113D). During the process in Step S113D, the reproducing speed becomes 0%, so that the vibration controller 432 suspends the electric power supplied to the vibrating motor 950 in response to the suspension where the reproducing speed is 0%. In other words, as shown in FIG. 19, the electric current value of the supplied electric power becomes 0 in accordance with the period T during which the reproduction is stopped.

On the other hand, when it is judged that the quick return button 345 is not ON (i.e. is OFF) and the change instructions indicate the change in play/stop of the processing in Step S112D, the processing unit 440 stops the reproduction processing by gradually decreasing the reproducing speed to 0% in accordance with the deceleration speed during the reproduction stopping process set by the speed adjuster 342B of the switch section 340 and recognized by the operation signal recognizer 411 (Step S114D). During the processing of Step S114D, the vibrating motor 950 is vibrated in accordance with the sound volume at the reproducing position at which the reproducing speed is slowed, and the vibration of the vibrating motor 950 is temporarily stopped in accordance with the temporary suspension of the reproduction at the reproducing speed of 0%. In other words, as described above, the electric current value of the electric power supplied to the vibrating motor 950 is set to 0.

After Steps S113D and 114D, the operation signal recognizer 411 judges whether the rotating body 600 is rotated or not based on the detection signal from the rotary movement detector 810 of the rotating body 600 (Step S115D). When it is judged that the rotating body 600 is not rotated in Step S115D, the operation signal recognizer 411 judges whether the pressing on the rotating body 600 continues or not (Step S116D). On the other hand, when it is judged that the rotating body 600 is rotated in Step S115D, the operation signal recognizer 411 judges whether the rotary direction is in positive (forward) rotation (FWD) or not based on detection signal (Step S117D). When forward rotation is judged in Step S117D, the rotary speed indicated by the detection signal from the rotary movement detector 810 is recognized (Step S118D). Subsequently, the processing unit 440 conducts reproduction processing so that the reproducing speed is increased in the forward direction in accordance with the rotary speed (Step S119D) and the process advances to Step S116D. During the processing of Step S119D, the electric current value of the electric power supplied to the vibrating motor 950 is controlled so that the vibrating motor 950 is vibrated in accordance with the sound volume at the reproducing position where the reproducing speed is accelerated.

On the other hand, when no-forward rotation, i.e. reverse rotation (REV), is judged in Step S117D, the rotary speed indicated by the detection signal from the rotary movement detector 810 is recognized (Step S120D). Subsequently, the processing unit 440 conducts reproduction processing so that the reproducing speed is increased in the reverse direction in accordance with the rotary speed (Step S121D) and the process advances to Step S116. During the processing of Step S121D, the electric current value of the electric power supplied to the vibrating motor 950 is controlled so that the vibrating motor 950 is vibrated in accordance with the sound volume at the reproducing position. The vibration control of the vibrating motor 950 in accordance with the sound volume at the reproducing position set in Step S110A continues during the pressing and contact operation and rotary operation on the rotating body 600 in Steps S115D to 119D and Step S121D if the reproducing position moves in accordance with the rotary operation. Accordingly, a user can recognize the sound volume at the reproducing position that is moved in response to the input operation by the vibration. Further, the vibration is stopped when the reproduction is suspended (temporarily stopped), the vibration changes in accordance with the reproduction condition that changes in accordance with input operation as in playing an electric musical instrument, so that reproducing condition can be easily recognized.

When it is judged that the pressing on the rotating body 600 is continued in Step S116D, so-called scratch processing is continued back to Step S115D. On the other hand, when it is determined that the pressing condition is no longer conducted in Step S116D, the processing unit 440 conducts processing for setting the reproducing speed as 100% in accordance with the reproduction-starting speed of the speed adjuster 342B set by the operation signal recognizer 411 (Step S122D).

Subsequently, the information processing unit 400 judges whether stop instruction for reproduction processing, i.e. reproduction stop in accordance with the input operation on the play/stop button 348 is recognized or not by the operation signal recognizer 411 (Step S123D). When the reproduction stop is not recognized in Step S123D, the reproduction processing is continued back to Step S108A. On the other hand, when it is judged that the reproduction stop is recognized in Step S123D, the reproduction is stopped to terminate the reproduction processing.

[Effect of Reproduction System]

In the switch device 500 of the reproduction system 100 according to the fifth embodiment, when the rotating body 600 is rotated, pressed or touched by an input operation of a user, the detection signal (operation signal) corresponding to the input operation is output to the information-processing unit 400. The information-processing unit 400 processes the information such as the music data and video data in accordance with the condition of the input operation in a predetermined processing condition and vibrates the rotating body 600 in response to the output condition processed by the information-processing unit 400 and output by the output unit 200 in accordance with the information property such as sound volume the information output by the output unit 200 and the operation signal being processed based on the detection signal. Accordingly, when DJ playing is performed in a relatively large sound volume and under special illumination space to reproduce music data and video data, the rotating body 600 is vibrated in accordance with the output condition, so that the information output condition can be sensed without relying on hearing sense and visual sense. Accordingly, since the information-output condition can be easily recognized, effective reproduction processing by recognizing efficient output-position recognition can be conducted in DJ playing where specific property reproduction, strict reproduction timing and property switching timing and the like are required. Further, the information-processing device 300 is configured such that the information output condition can be recognized by touch and processing condition can be set and changed in accordance with input operation. Accordingly, the condition for information-processing can be set without visually checking the switch device 500 and the information-processing device 300 can be operated as electronic musical instrument, thereby easily improving general versatility.

The switch device 500 is provided on the information-processing device 300 for processing information and reproducing-position changing processing (processing condition corresponding to input condition) is conducted by the rotary operation on the rotating body 600 that is capable of rotary operation. Accordingly, when the rotating body 600 is rotated for changing the reproducing position, the setting position corresponding to the reproducing position can be easily recognized by a touch (movement restriction), so that the setting position can be easily recognized. Accordingly, during reproduction processing in DJ playing, the setting position at which the reproduction processing is set can be easily recognized, so that efficient DJ playing can be achieved. Further, the information-processing unit 400 for conducting information-processing and the switch device 500 for setting the processing condition of the information-processing are integrally provided. Accordingly, no connection is required for information-processing and information-processing can be immediately performed. Further, the rotating body 600 can be designed in a shape simulating a turntable of a record player and the designability can be improved.

The information-processing unit 400 of the information-processing device 300 includes the information acquiring unit 420 for acquiring information, the property recognizing unit 412 for recognizing the property of the acquired information, and a processing unit 440 for processing the information in response to the operation signal output by the switch device 500 and the switch section 340 in a manner capable of predetermined outputting by the output unit 200. Accordingly, while the information can be processed based on the operation signal for setting the processing condition of the information, the property of the information to be processed for providing the sense for facilitating the recognition of the output condition of the information can be easily obtained with a simple arrangement.

The information-processing unit 400 includes the vibration controller 432 for controlling the vibrating motor 950 for vibrating the rotating body 600 in accordance with the information property. Accordingly, an arrangement for providing the sense in response to information processing and information property can be achieved with a single arrangement of circuit board and CPU with the use of program, thereby easily simplifying the configuration.

The property of the information is recognized by the property recognizing unit 412 in accordance with the position on a time axis of the reproduction time processed by the processing unit 440 and output by the output unit 200, and the vibration control is conducted in accordance with the property at the reproducing position as the processing condition of the processing unit 440 by the rotary operation on the rotating body 600. Accordingly, since the property at the reproducing position is recognized based on the recognition of the reproducing position according to the reproduction time, the information property for providing the touch in response to the information output condition in accordance with the reproducing position that is changed by the rotary operation can be easily recognized with a simple and easy calculation.

In order to provide the touch corresponding to the information output condition, the rotating body 600 is vibrated in accordance with the magnitude of the property by flowing electric current of current value corresponding to the magnitude of the sound volume (information property) to the vibrating motor 950 provided on the rotating body 600. Accordingly, an arrangement for providing a sense corresponding to the output condition can be easily provided with a simple structure. Further, a vibrating motor used for small electrical equipment such as cellular phone can be used, so that size-reduction can be easily achieved.

Effect of Fifth Embodiment

As described above, in the above-described embodiment: an operation signal corresponding to the input operation on the rotating body 600 by a user is output to the information-processing unit 400; the information such as music data and video data is processed in a predetermined processing condition in accordance with condition of the input operation by the information-processing unit 400; and the rotating body 600 is vibrated in accordance with the output condition of the output unit 200 after being processed by the information-processing unit 400 based on the information property such as the sound volume processed based on the operation signal and output by the output unit 200 and the condition of the input operation of the operation signal. Accordingly, when DJ playing is performed in a relatively large sound volume and under special illumination space to reproduce music data and video data, the rotating body 600 is vibrated in accordance with the output condition, so that the information output condition can be sensed without relying on hearing sense and visual sense, thereby efficiently recognizing the output condition of the information.

Further, the switch device 500 that is vibrated in accordance with property is used for the information-processing device 300. Accordingly, effective information processing by recognizing efficient property recognition can be conducted in DJ playing where specific property reproduction, strict reproduction timing and property switching timing and the like for music data, image data and the like are required, thereby obtaining improved information-processing.

Modification of Embodiment

Though preferred embodiments of the present invention have been exemplified so far, the scope of the present invention is not limited to the above embodiments, but includes various improvements and alteration of design as long as an object of the present invention can be achieved.

Though the switch device 500 simulates the shape of a turntable of a record player for reproducing a phonorecord, any configuration may be used. For instance, the jog table 610 may not be disc-shaped, but may be configured in a rectangular column or star-shaped, or may be shaped in the motif of various characters.

Though the reproduction system 100 or the information-processing device 300 suitable for DJ playing is for processing music information, the information to be processed includes not only music information but also other information such as image information and character information. Further, the device is not limited to those used for DJ player, the reproduction device may be used for reproducing any other information.

Though the reproduction system 100 has the information-processing device 300 connected with the output unit 200, the information-processing device 300 and the output unit 200 may be integrally provided.

Though the load is changed in accordance with the rotary operation on the rotating body 600, the movement may be restricted so that the load is changed in accordance with the pressing operation and the like on the rotating body 600. Further, the movement restriction may be conducted according to the movement condition of the input operation on the switch section 340 other than the rotating body 600. The present invention may be applied to switch devices of any devices other than the above-described information-processing device 300.

Further, the operation unit may not be controlled so that the load is changed in increasing or decreasing manner. Specifically, the operation unit may be vibrated in accordance with the information property such as the sound volume peak of low-pitched sound, rhythm and tempo. More specifically, sound volume peak within a specific frequency or frequency band such as low-pitched sound peak, or more than a predetermined sound volume may be used as an object of the property. Further, not only audio information, but also a chapter of video data may be used as the property, where switching position as well as the chapter of video scene may be used.

Incidentally, when video is processed as the information, difference in video preceding and proceeding to the to-be-processed position or still images is detected, and the scene switching and chapter switching may be recognized when more than a predetermined amount of difference as a threshold of the scene and chapter switching is obtained to cause vibration. Alternatively, accessory information indicating the scene switching position is associated with the video data, based on which the scene switching is recognized to cause vibration.

Though click-like operation control as the movement restriction corresponding to the property and the setting as the operation of the rotating body 600 is taken as an example, the rotating body 600 may be vibrated at the reproducing position corresponding to the property using the vibrating motor as described above. Further, not only movement restriction, any arrangement for conducting any operation that can be sensed as a touch by a user may be employed, where, for instance, air is blown out of the rotating body at the cue-point position to inform the position to a user in a recognizable manner. Incidentally, the vibration as an example of the operation of the present invention includes periodic vibration as well as single movement such as click sense. The movement of the operation unit may not accompany both of increase and decrease in the load, but may be only one of increase and decrease.

The movement restriction is not limited to the click-like restriction, but any movement restriction may be applied. Though the click-like movement control is conducted so that movement resistance is applied from $-\Delta\theta$ position to the property position and movement is assisted from the property position to $+\Delta\theta$ position, only movement resistance may be applied, where movement resistance is decreased from $-\Delta\theta$ position or $+\Delta\theta$ position to the property position. Alternatively, the movement resistance may be gradually increased from $-\Delta\theta$ position to the property position of $+\Delta\theta$ position and the movement resistance may be gradually decreased from the property position to the $+\Delta\theta$ position. Further alternatively, only the movement assistance may be applied, where the movement assistance is gradually increased from $-\Delta\theta$ position to the property position and the movement assistance is gradually decreased from the property position to $+\Delta\theta$ position, for instance.

Further, information-processing unit and the processing controller may be constructed by installing a predetermined program on a computer, and the switch device 500 may be connected to the computer for information-processing by the computer, or the switch device 500 may be installed on a game machine or a controller connected to a game machine. In other words, the present invention may be applied not only to an arrangement for processing music data and video data, but may be applied to an arrangement for processing application software of game software.

Though the output unit 200 for reproducing (outputting) the information includes both of the sound-producing section 210 and the display unit 220, the output unit 200 may include only one of the components.

Though the drive force of the electric motor 931 is transmitted to the restricting gear 920 through the drive transmitter 932 in the restricting unit 900, the load for movement restriction may be controlled in an alternative manner. For instance, the restricting gear 920 may be directly provided on the output shaft of the electric motor 931 without using the drive transmitter 932; so-called direct drive mechanism where the drive force of the electric motor 931 is transmitted to a rotary shaft for rotatably supporting the rotating body 600 may be employed; without providing the restricting gear 920 and the first gear 623, the drive force is applied on a roller (contact member) to be in contact with the circumference of the guide rib 621 and the jog ring 650; the resistance during rotation is changed by changing the frictional force in rotating the rotating body 600 by altering the contacting degree of the contact member having friction member such as rubber using solenoid instead of the electric motor 931; non-contact mechanism may be used, where a magnet is provided on the backside (lower side) of the rotating body 600 and magnetism-generating unit is provided for partially generating magnetism or changing polarity at a position opposing to the movement locus of the magnet by rotary movement of the rotating body 600, the repulsive or attractive function between the magnet and the magnetism generating unit according to the generated or change polarity changing the resistance during the rotation of the rotating body 600. The non-contact mechanism allows smooth resistance change during rotation.

Though the vibrating motor 950 is exemplified as an arrangement for vibration, a piezoelectric element may be used and the rotating body 600 or the jog table 610 may be solely vibrated by applying voltage of voltage value thereto corresponding to the magnitude of the information property. A speaker may be provided on the rotating body 600 and the rotating body 600 and the jog table 610 may be vibrated by vibrating a vibrating plate of the speaker by outputting sound from the speaker. In other words, any arrangement may be used and located at any position as long as the property can be notified by vibration.

The rotary movement detector 810 may not use the optical sensor 814A as described above, but a magnetic sensor may be used. Alternatively, a power generator may be connected to a rotary shaft of a roller and a gear touching the rotating body 600 to read the current value and voltage generated by rotation.

A tape switch may not be used for the press detector 820 as in the above, but any arrangement such as pressure-sensitive sensor and piezoelectric element may be used as long as pressing and contact can be detected. Further, the press detector may not be provided on the flange 713 but may be disposed at any position (e.g. the top board 711) as long as pressing and contact can be detected.

When the rotating body 600 is rotated and reproduction processing is conducted in steps S119A-D and 122A-D, the restricting unit 900 may be controlled so that the rotating body 600 is vibrated during rotary operation in accordance with, for instance, the low-pitched sound volume at the reproducing position of music data. According to the above arrangement, even when the reproduction of music data reproduced by input operation by a user cannot be heard, reproducing condition can be easily recognized and efficient input operation (playing) can be conducted.

The rotary drive unit 930 may be arranged so that the movement amount (i.e. rotary angle) of the rotating body 600 is recognized based on the detection signal from the rotary movement detector 810 and the drive force in accordance with the movement amount of the rotating body 600 is applied on the rotating body 600. According to the above arrangement, when the movement amount is increased in accordance with the movement amount of the rotating body 600, a drive force approximately proportional to the movement amount is applied on the rotating body 600 in a direction reverse to the rotation of the rotating body 600. Accordingly, the drive force in accordance with the movement amount is applied on the rotating body 600 and a user can sense a resistance force in accordance with the drive force. An example of the above arrangement includes a biasing unit such as a spring connecting a part of the rotating body 600 and the mount 710. According to the above arrangement, resistance force reverse to the rotation of the rotating body 600 can be applied to the rotating body 600 in accordance with the movement amount of the rotating body 600, so that the arrangement of the restricting unit 900 can be simplified.

Further, the restricting unit 900 may control the drive force applied on the rotating body 600 in accordance with specific type of the information recognized by the property recognizing unit 412. For instance: when the property recognizing unit 412 recognizes music data, the restricting unit 900 applies drive force in accordance with the rotary operation on the rotating body 600 as described above; on the other hand, when the property recognizing unit 412 recognizes image data, the restricting unit 900 does not apply drive force on the rotating body 600. According to the above arrangement, when a user tries to play music data in playing style of a disc jockey for instance, the restricting unit 900 improves the rotary operability of the rotating body 600 by applying a predetermined drive force. When a user operates the rotating body 600 for editing and browsing image data and the like, since the drive force by the restricting unit 900 is not applied, the user can freely rotate the rotating body 600.

Further, the restricting unit 900 may apply drive force on the other various switch sections 340. For instance, the restricting unit 900 may apply drive force in accordance with the moving distance of the tempo adjusting knob 343A of the tempo adjuster 343. According to the above arrangement, drive force is applied in a direction for the tempo adjusting knob 343A to return to an initial position (i.e. approximate center of the variable range of the tempo adjusting knob 343A) so that the drive force is proportional to the movement distance for the initial position. Further, the drive force may be applied in accordance with the movement speed of the movement of the tempo adjusting knob 343A. According to the above arrangement, a user can feel resistance force by the drive force when the tempo adjusting knob 343A is moved, so that the movement amount and movement speed of the tempo adjusting knob 343A can be recognized by the resistance force.

The restricting unit 900 may not be the above-described rotary or slide switch, but may be a hold-down switch to which the drive force is applied. For instance, the restricting unit 900 may apply the drive force in accordance with the hold-down condition of the search button 346B. The restricting unit applies strong drive force when the search button 346B is firmly pressed and weak drive force when being softly pressed. According to the above arrangement, different processing is conducted according to the press condition of the search button 346B, where high-speed search is conducted by the information-processing unit 400 when the search button 346B is firmly pressed and low-speed search is conducted when being softly pressed. In the above, a user can recognize the press condition with reference to the resistance force when the search button 346B is held down, thereby easily conducting desired processing by the information-processing unit 400.

Further, when the information is judged to be music data by the property recognizing unit 412, the rotary drive unit 930 may constantly rotate the rotating body 600 with a predetermined drive force transmitted via the electric motor 931 while the music data is reproduced. At this time, the rotary direction and the rotary speed is set approximately the same as a conventional record player. According to the above arrangement, a user can feel the same operation feeling as an operation on a rotary turntable of conventional record player by operating the rotating body 600 rotated by a predetermined drive force.

The information property is not limited to the above-described low-pitched sound peak, but may be rhythm-related information such as tempo, sound volume peak at predetermined frequency or within frequency band and sound volume of more than a predetermined level, in accordance with which vibration is applied or the amplitude of the vibration is changed. Further, the information property is not limited to that of audio information but the switching position as well as chapter of video data may be used, where vibration is applied in accordance with the properties and amplitude of the vibration is changed in accordance with the speed of the change in the contrast of the video.

Though the cue-point position (target position to which the reproducing position is jumped by input operation) is exemplified as the setting position, the position for changing the reproducing speed or repeating position may be employed.

Specific arrangement and steps for implementing the present invention may be changed in the other arrangement as long as an object of the present invention can be achieved.

INDUSTRIAL APPLICABILITY

The present invention is applicable to a switch device, an information processing device and reproduction device, the switch device having an operation unit to which input operation is conducted, the input operation changing output condition of information and setting the processing condition of the information.

The invention claimed is:

1. An information-processing device for processing information to be output by an output unit, the device comprising:
an information acquiring unit for acquiring the information;
an operating device having a first operation unit movable by an input operation, the operating device outputting an operation signal in accordance with the input operation on the first operation unit;
an information recognizing unit for recognizing at least one of a property of the acquired information and a condition of the input operation based on the operation signal of the first operation unit;
a processing unit for reproduction-processing the information so that an output condition of the information output by the output unit is changed in accordance with the operation signal of the first operation unit;
a movement generating unit for actively driving the first operation unit of the operating device in accordance with at least one of the property of the recognized information and the condition of the input operation based on the operation signal of the first operation unit; and
a movement controller for actively controlling a drive of the first operation unit by the movement generating unit based on the property of the information in a movement corresponding to the property to notify an operational feeling to a user operating the first operation unit when the reproduction-processing of the information is temporarily suspended.

2. An information-processing device for processing information to be output by an output unit, the device comprising:
an operating device having a first operation unit movable by an input operation, the operating device outputting an operation signal in accordance with an input operation on the first operation unit, the operation signal being received by the information-processing unit so that the information is capable of being reproduction-processed by the information-processing unit in a predetermined processing condition;
a movement generating unit that actively drives the first operation unit in accordance with at least one of a property of the information that is processed by the information-processing unit based on the operation signal of the first operation unit and output by the output unit and a condition of the input operation based on the operation signal of the first operation unit;

a movement controller for actively controlling a drive of the first operation unit by the movement generating unit based on the property of the information in a movement corresponding to the property to notify an operational feeling to a user operating the first operation unit when the reproduction-processing of the information is temporarily suspended; and an information-processing unit that processes the information in a predetermined output condition of the output unit in accordance with the operation signal, wherein the information-processing unit comprises:

an information acquiring unit for acquiring the information;

an information recognizing unit for recognizing at least one of the property of the acquired information and the condition of the input operation based on the operation signal; and a processing unit for processing the information in accordance with the operation signal so that the information is output by the output unit in a predetermined output condition, and the information recognizing unit recognizes the property of the information in association with time information from a reproduction-start position of the information, and wherein the movement generating unit associates the movement condition of the first operation unit with the reproduction-processing condition of the information by the processing unit based on the time information, and the movement generating unit actively drives the first operation unit when the reproducing position of the information under reproduction-processing based on the operation signal of the first operation unit moves on a property position corresponding to at least one of the position of the property and a position at which the property changes.

3. An information-processing device for processing information to be output by an output unit, the device comprising:

an operating device having a first operation unit movable by an input operation, the operating device outputting an operation signal in accordance with an input operation on the first operation unit, the operation signal being received by the information-processing unit so that the information is capable of being reproduction-processed by the information-processing unit in a predetermined processing condition;

a movement generating unit that actively drives the first operation unit in accordance with at least one of a property of the information that is processed by the information-processing unit based on the operation signal of the first operation unit and output by the output unit and a condition of the input operation based on the operation signal of the first operation unit;

a movement controller for actively controlling a drive of the first operation unit by the movement generating unit based on the property of the information in a movement corresponding to the property to notify an operational feeling to a user operating the first operation unit when the reproduction-processing of the information is temporarily suspended; and an information-processing unit that processes the information in a predetermined output condition of the output unit in accordance with the operation signal, wherein the movement generating unit drives the operation unit in accordance with the property of the information that is processed by the information-processing unit and output by the output unit based on the operation signal, wherein the information-processing unit comprises:

an information acquiring unit for acquiring music data as the information; and a property recognizing unit for recognizing a rhythm of the music data as the property of the acquired information, wherein the information-processing unit reproduction-processes the acquired information so that the output condition of the output unit changes based on the operation signal output by the operating device, and the movement generating unit actively drives the operation unit when the first operation unit moves over the property position corresponding to the rhythm by the input operation.

4. An information-processing device for processing information to be output by an output unit, the device comprising:

an operating device having a first operation unit movable by an input operation, the operating device outputting an operation signal in accordance with an input operation on the first operation unit, the operation signal being received by the information-processing unit so that the information is capable of being reproduction-processed by the information-processing unit in a predetermined processing condition;

a movement generating unit that actively drives the first operation unit in accordance with at least one of a property of the information that is processed by the information-processing unit based on the operation signal of the first operation unit and output by the output unit and a condition of the input operation based on the operation signal of the first operation unit;

a movement controller for actively controlling a drive of the first operation unit by the movement generating unit based on the property of the information in a movement corresponding to the property to notify an operational feeling to a user operating the first operation unit when the reproduction-processing of the information is temporarily suspended; and an information-processing unit that processes the information in a predetermined output condition of the output unit in accordance with the operation signal, wherein the movement generating unit drives the operation unit in accordance with a property of the information that is processed by the information-processing unit and output by the output unit based on the operation signal, wherein the information-processing unit comprises:

an information acquiring unit for acquiring music data as the information; and a property recognizing unit for recognizing the property of the music data in which sound volume of less than a predetermined frequency exceeds a predetermined value as the acquired information, wherein the information-processing unit reproduction-processes the acquired information so that the output condition of the output unit changes based on the operation signal output by the operating device, and the movement generating unit actively drives the first operation unit when the operation unit moves over the property position corresponding to the position in which the sound volume of less than a predetermined frequency exceeds a predetermined value by the input operation.

5. An information-processing device for processing information to be output by an output unit, the device comprising:

an operating device having a first operation unit movable by an input operation, the operating device outputting an operation signal in accordance with an input operation on the first operation unit, the operation signal being received by the information-processing unit so that the information is capable of being reproduction-processed by the information-processing unit in a predetermined processing condition;

a movement generating unit that actively drives the first operation unit in accordance with at least one of a property of the information that is processed by the information-processing unit based on the operation signal of the first operation unit and output by the output unit and a condition of the input operation based on the operation signal of the first operation unit;

a movement controller for actively controlling a drive of the first operation unit by the movement generating unit based on the property of the information in a movement corresponding to the property to notify an operational feeling to a user operating the first operation unit when the reproduction-processing of the information is temporarily suspended; and an information-processing unit that processes the information in a predetermined output condition of the output unit in accordance with the operation signal, wherein the movement generating unit drives the operation unit in accordance with a property of the information that is processed by the information-processing unit and output by the output unit based on the operational signal, wherein the information-processing unit comprises:

an information acquiring unit for acquiring video data as the information; and a property recognizing unit for specifying and for recognizing a video-switching position in the video data as the property of the acquired information, wherein the information-processing unit reproduction-processes the acquired information so that the output condition of the output unit changes based on the operation signal output by the operating device, and the movement generating unit actively drives the operation unit when the first operation unit moves over the property position corresponding to the video-switching position by the input operation.

6. A reproduction device for a disc jockey for processing information to be output by an output unit, the device comprising:

an operating device having a first operation unit movable by an input operation, the operating device outputting an operation signal in accordance with an input operation on the first operation unit, the operation signal being received by the information-processing unit so that the information is capable of being reproduction-processed by the information-processing unit in a predetermined processing condition;

a movement generating unit that actively drives the first operation unit in accordance with at least one of a property of the information that is processed by the information-processing unit based on the operation signal of the first operation unit and output by the output unit and a condition of the input operation based on the operation signal of the first operation unit;

a movement controller for actively controlling a drive of the first operation unit by the movement generating unit based on the property of the information in a movement corresponding to the property to notify an operational feeling to a user operating the first operation unit when the reproduction-processing of the information is temporarily suspended; and an information-processing unit that processes the information in a predetermined output condition of the output unit in accordance with the operation signal output by the operating device, wherein the movement generating unit drives the operation unit in accordance with a property of the information that is processed by the information-processing unit and output by the output unit based on the operation signal, wherein the operation unit of the operating device is a rotating body rotatably provided by a rotary operation, and the movement generating unit vibrates the rotating body in accordance with at least one of properties including tempo, rhythm and sound volume of the information at a position of the information processed by the information-processing unit and output by the output unit specified by the rotary operation of the rotating body.

7. A reproduction device for a disc jockey for processing information to be output by an output unit, the device comprising:

an information acquiring unit for acquiring the information;

an operating device having a second operation unit on which an input operation is conducted and a first operation unit capable of rotary operation, the operating device outputting different operation signals in accordance with the input operation on the first operation unit and the second operation unit, a processing unit that processes the acquired information so that the information is output by the output unit in different predetermined output conditions in response to the respective operation signals;

a movement generating unit for driving the first operation unit in accordance with the processing condition of the information by the processing unit based on the respective operation signals; and a movement controller that controls the drive of the first operation unit by the movement generating unit, wherein the processing unit specifies a predetermined position of the information based on the operation signal in response to the input operation on the second operation unit and changes the position for reproducing the information to be output by the output unit based on the operation signal in response to the rotary operation of the first operation unit, wherein the movement generating unit vibrates the first operation unit when the reproducing position of the information changed by the processing unit is the specified predetermined position of the information, and wherein the movement controller drives the first operation unit by the movement generating unit based on the recognized property of the information when the reproduction-processing of the information is temporarily suspended.

* * * * *